April 13, 1965 D. W. MASTERS ET AL 3,178,690

DATA TRANSFER SYSTEM

Filed June 5, 1961 17 Sheets-Sheet 1

INVENTOR.
HENRY L. HEROLD
DAVID W. MASTERS

BY

[signature]

CENTRAL PROCESSOR DATA TRANSFER CHANNELS FIG. 4

April 13, 1965 D. W. MASTERS ET AL 3,178,690

DATA TRANSFER SYSTEM

Filed June 5, 1961 17 Sheets-Sheet 4

CENTRAL PROCESSOR COMMAND REGISTER

CENTRAL PROCESSOR A-REGISTER READOUT

CLOCK CIRCUIT

April 13, 1965 D. W. MASTERS ET AL 3,178,690
DATA TRANSFER SYSTEM
Filed June 5, 1961 17 Sheets-Sheet 9
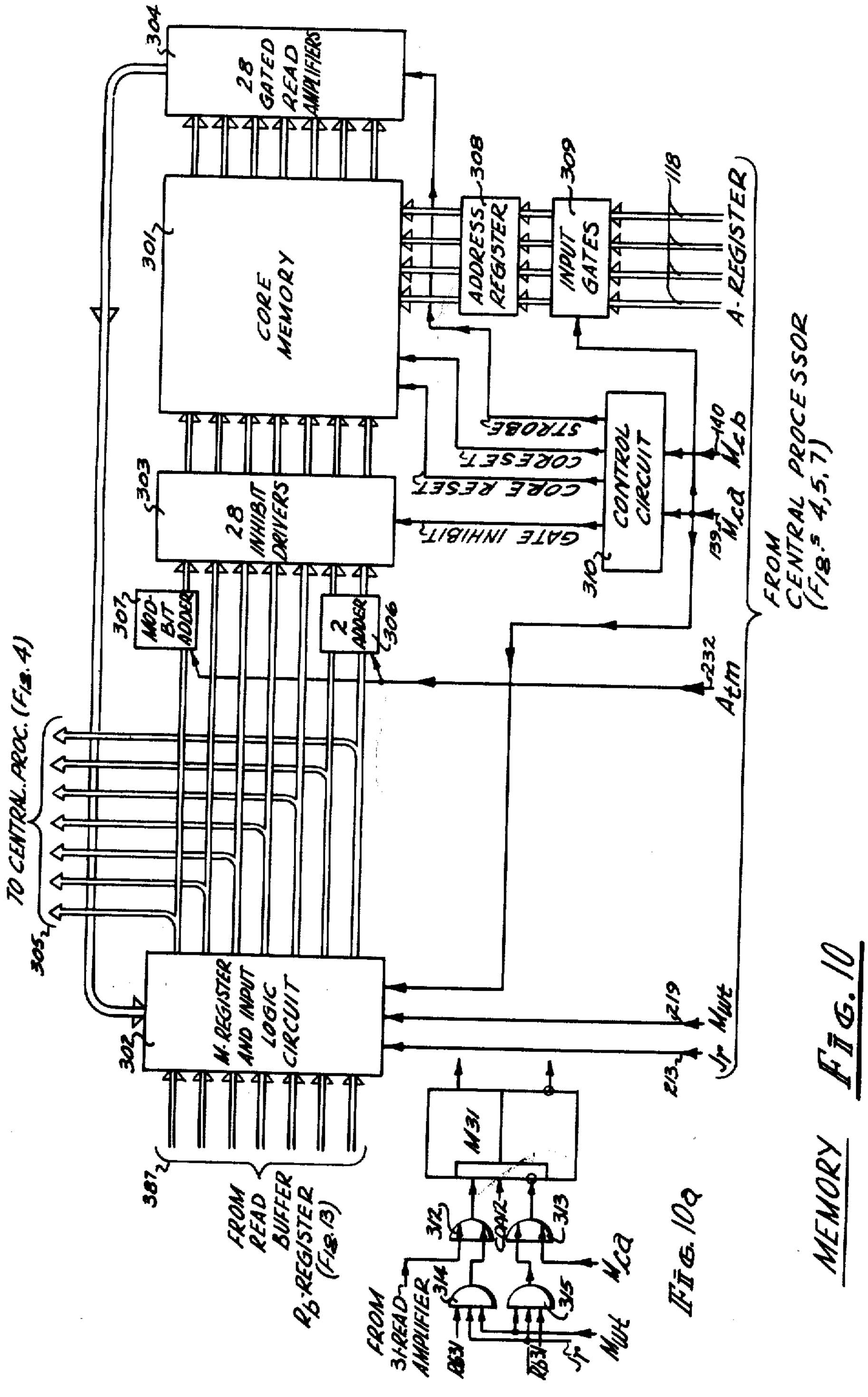
MEMORY FIG. 10, FIG. 10a April 13, 1965 D. W. MASTERS ET AL 3,178,690

DATA TRANSFER SYSTEM

Filed June 5, 1961 17 Sheets-Sheet 11

READ BUFFER-SHIFT TIMER

April 13, 1965 D. W. MASTERS ET AL 3,178,690

DATA TRANSFER SYSTEM

Filed June 5, 1961 17 Sheets-Sheet 16

SORTER CONTROL UNIT #1 CONTROL PORTION FIG. 18

United States Patent Office 3,178,690
Patented Apr. 13, 1965

3,178,690

DATA TRANSFER SYSTEM

David W. Masters, Palo Alto, and Henry L. Herold, Fullerton, Calif., assignors to General Electric Company, a corporation of New York Filed June 5, 1961, Ser. No. 116,655
6 Claims. (Cl. 340—172.5)

This invention relates to information processing apparatus and more particularly to apparatus for processing data at high speeds and adapted to communicate with a plurality of peripheral components operating at lesser speeds.

In the processing of data, various arithmetic and logical operations are performed on data items by a data processing unit, which is adapted to execute a sequence of these operations in a very short period of time. To maintain a rapid rate of execution of these operations, the data processing unit must be able to immediately receive data items when needed and to immediately store data items after processing. Rapid receipt and storage of data items by the data processing unit is provided by a high-speed, random-access memory. The random-access memory operates at a rate of speed compatible with that of the data processing unit and rapidly supplies a data item needed by the data processing unit or rapidly stores a data item provided by the data processing unit.

From time to time, the data processing unit will complete the processing of the data items in the memory. At these times, peripheral components, which are the sources of the data being processed, are coupled to transmit data items to the memory. One such peripheral component is the automatic document reader. United States Patent 2,924,812 by P. E. Merritt and C. M. Steele, for an Automatic Reading System, which is assigned to the same assignee as the instant invention, describes an automatic document reader. A document reader scans documents, such as bank checks and deposit slips, and delivers electrical signal representing the information on each document. If these electrical signals are transmitted to a data processing system comprising the aforementioned data processing unit and memory, the information represented by the signals may be processed to provide automatic accounting or bookkeeping. Additionally, a sorter may be provided for automatically collating the documents in accordance with the information derived therefrom. United States Patent 3,077,984, issued February 19, 1963, to R. R. Johnson for a Data Processing System, describes such a system for performing automatic bookkeeping. Other peripheral components which may be employed to supply data to the memory for processing are magnetic tape storage units and paper tape storage units.

A problem which arises in the manner of coupling such peripheral components to the memory for transfer of new data thereto is that the type of memory above-described can communicate at one time with only one transmitter or one receiver of data, such transmitters or receivers of data including the aforementioned data processing unit, tape units, and document readers. Therefore, it may be necessary for the data processing unit to halt its communication with the memory, and consequently its sequential processing of data, to permit a peripheral component to communicate with the memory. The peripheral components of the type described transmit and receive data at a much slower rate than the data processing unit processes data; for example, the time between transmittal of successive data units by a document reader is comparable to the time required for the data processing unit to execute many operations. Hence, in order to maintain a high-average data processing speed, it is necessary that the data processing unit does not remain idle during the periods when the coupled peripheral component is preparing data units for transmission to the memory, but, instead, that the data processing unit continue to execute the aforementioned sequence of operations, yielding priority for communication with the memory only when the peripheral component is immediately ready to transmit a data unit to the memory. Apparatus to so permit the data processing unit to continue to execute a sequence of operations, pausing only to permit a peripheral component to communicate with the memory when said component is immediately ready to supply a data unit, is also described in the aforementioned R. R. Johnson patent.

The capability of processing data at very high rates, possessed by the data processing unit as compared with the relatively slow rates at which data is supplied by the peripheral components, enables the data processing unit to concurrently process information provided by more than one peripheral unit. Therefore, it is desirable to provide novel apparatus for enabling more than one peripheral component to supply data concurrently to the memory, in order to make most effective use of the capability of the associated data processing unit. In such apparatus, means must be provided to place the data in the memory where it is most conveniently accessible for subsequent processing.

In a random-access memory of the type described, data items are stored in a plurality of storage locations. Each storage location is a physical region of the memory and may comprise, for example, a group of magnetic cores equal in number to the number of binary digits employed to represent the data item. By controlling the direction of magnetization of a core, a binary digit representation is stored therein. Each storage location is identified by a unique address, usually expressed in numerical form. When the data processing unit must communicate with the memory to receive or store a data item, an address register in the data processing unit provides an identification item representing the address of the storage location with which communication is to be effected. For simplicity, data items are normally received from or stored in the storage location identified by the contents of the address register, regardless of whether the data processing unit or a peripheral component is communicating with the memory.

For the data processing unit to most effectively process the data received in memory from the peripheral components, it is desirable that the data from each peripheral component be placed in memory in a respective group of sequentially accessible storage locations; i.e., locations identified by a continuous series of available address numbers. Therefore, each time one of the peripheral components supplies a data unit, the address of a storage location chosen from the respective one of such series of addresses must be inserted in the address register to direct the transfer of the data unit to the proper storage location group. This address must then be incremented by unity to identify the next sequential storage location to receive the next supplied data unit from the same peripheral component. However, neither such address nor its incremented value can be permitted to remain in the address register because, as set forth above, apparatus has been provided to enable a plurality of peripheral components to communicate concurrently with the memory; and, additionally, the data processing unit will normally communicate with the memory between those intervals when a peripheral component is ready to transmit a data unit. Therefore, it is further desirable to provide apparatus for determining the next storage location for receiving a data unit from each peripheral component and to provide the corresponding address for the address register of the data processing unit when such component is ready to supply the data unit.

Therefore, it is the principal object of this invention to provide apparatus for enabling a plurality of concurrently operating peripheral components to communicate with the memory of a data processing system.

Another object of this invention is to provide apparatus for directing data received from a plurality of sources to corresponding groups of locations in a storage means.

Another object of this invention is to provide apparatus for directing data received from a plurality of peripheral components into sequential locations of respective groups of locations in a random-access memory.

Another object of this invention is to provide apparatus for determining the next sequential storage location in a random-access memory for receiving a data unit from a respective one of a plurality of peripheral components.

The immediately preceding objects are achieved in a data processing system by providing for the storage within the random-access memory itself of the next accessible storage location for each peripheral component. In the embodiment of the invention, the peripheral components are automatic document readers. The storage locations in the memory are organized into several groups, wherein a first group of storage locations stores a plurality of addresses. A storage location in this first group is allocated to each of the document readers. Additionally, one of the other groups of storage locations is allocated to each of the document readers for storing data supplied thereby. Each storage location of the first group stores an address denoting the next accessible storage location in the one of the other groups for receiving a data unit from the corresponding document reader. A memory register is provided for receiving data items read from the memory. The memory, in turn, receives for storage data items transmitted from the memory register. Means is provided to transmit an address in the memory register to an address register in the data processing unit. The contents of the address register denote the storage location in memory from which the memory register receives data items and to which the memory register transmits data items for storage.

When a document reader has a data unit ready for insertion in the memory, a respective character presence signal is generated. In response to issuance of the character presence signal, the data processing unit may have to discontinue its sequential processing of data to permit the document reader to communicate with the memory. When the data processing unit subsequently discontinues data processing, the contents of the address register are forced into a configuration identifying the storage location in the first group of storage locations allocated to the document reader identified by the character presence signal. In response to this configuration in the address register, the contents of the identified storage location of such first group are then transferred to the memory register and, in turn, to the address register. The new contents of the address register now identify the next accessible storage location in the storage location group of the memory allocated to receive data from the document reader presently having a data unit ready. In response to these contents of the address register, the data unit available from the identified document reader is transferred to the corresponding storage location in memory. The memory register at this time contains the same address as does the address register. These memory register contents are now restored to the storage location in the first group from which they were obtained, but during such restoration, they may be modified. This modification provides for an identification of the next sequential portion of the memory storage location group to receive data from the document reader that initiated the operation then occurring. Thus, the employment of the memory itself for storing the next accessible storage location for each of the concurrently operating peripheral components provides a convenient and flexible means for enabling the address register of the data processing unit to control access to the memory for the data processing unit and all of such peripheral components.

The invention will be described with reference to the accompanying drawings, wherein:

FIGURE 10 is a block diagram of the Memory of the system;

DATA PROCESSING SYSTEM—GENERAL

Figure 1:
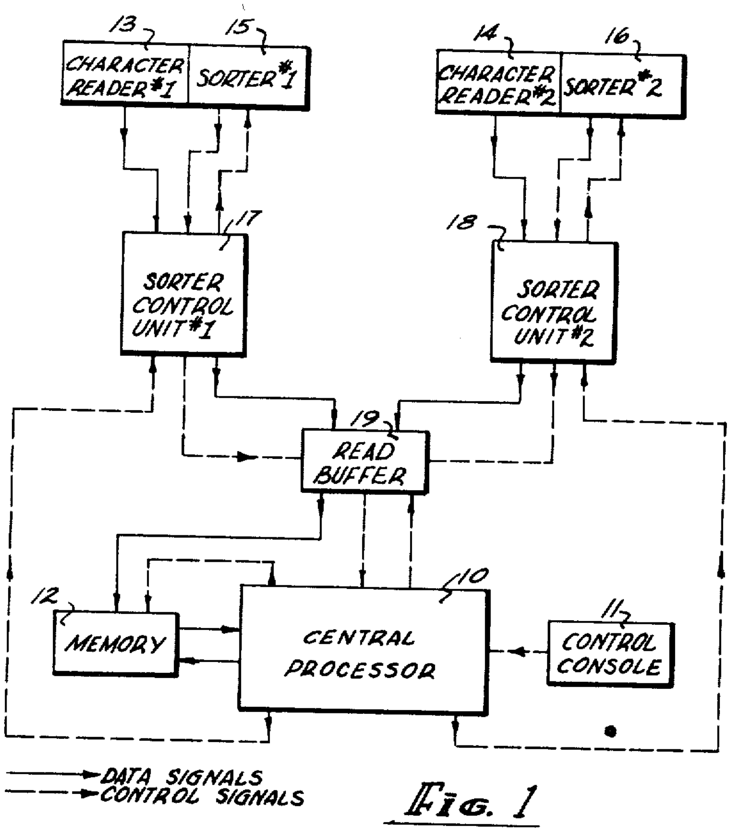
FIGURE 1 is a block diagram of a data processing system to which the instant invention is applicable.

The Data Processing System of FIG. 1 is adapted to process data under operational control of a Central Processor 10. The solid lines interconnecting the various components illustrated in FIG. 1 represent symbolically paths of data communication. The broken lines interconnecting the various components represent symbolically paths of control communication.

The Central Processor responds to a plurality of distinct instructions, which are supplied thereto in the sequential order necessary to perform a particular data processing operation. A Control Console 11 provides an indicating and control station for the operator, whereby he has access to the system for modification of the order of execution of the instructions or for data revision. A Memory 12 stores data words which are to be processed, data words which are the results of processing, and instruction words. The Central Processor communicates with the Memory to receive therefrom data words on which operations are to be performed and instruction words. Following certain data processing operations, the Central Processor transmits the resulting data words to the Memory for storage.

Figure 2:
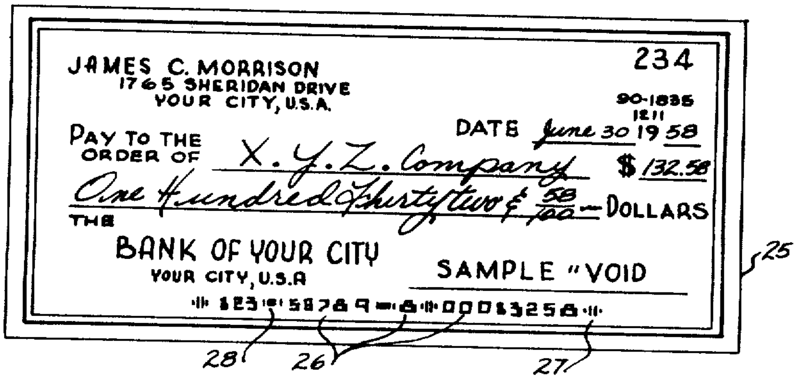
FIGURE 2 illustrates a document adapted to be read by the Character Reader of FIG. 1.

New data for processing by Central Processor 10 is provided for Memory 12 by a plurality of peripheral components, which are shown in the instant embodiment to be Character Readers 13 and 14, identified respectively as Character Reader #1 and Character Reader #2. Sorters 15 and 16 provide documents for reading by the respective Character Readers, transmit such documents to the Character Readers for automatic reading thereof, and subsequently automatically collate the documents into proper ones of pockets provided in accordance with information derived therefrom. Many types of documents can be read by a character reader, but for purposes of illustration the bank check of FIG. 2 is the type to which the instant description will refer. The Character Readers sense magnetically imprinted information on the documents and deliver encoded representations of the information to respective ones of Sorter Control Units 17 and 18, identified respectively as Sorter Control Unit #1 and Sorter Control Unit #2. In the instance of the bank check of FIG. 2, the magnetically imprinted information occupies the lowermost line on the document. Sorter Control Units 17 and 18 control the transmission of documents to the respective Character Readers, and the subsequent collating of the documents, by controlling respective ones of Sorters 15 and 16.

A Read Buffer 19, controlled by the Central Processor, temporarily stores data being supplied by the Sorter Control Units from the magnetically imprinted documents and subsequently transfers the temporarily stored data to the Memory, in accordance with the principles of the instant invention.

Central Processor 10 then processes the data received from the documents and communicates the results of the processing operations by transmitting information to the Sorter Control Units to direct collating of the documents. Apparatus (not shown) may also provide visible records of various accounts for which the documents provide information. Additionally, other peripheral components, shown in the aforementioned Johnson patent may be employed to supply data to Memory 12 through Read Buffer 19.

*Data representation*

The Data Processing System of FIG. 1 is adapted to process data represented by the binary code. In the binary code, each element of information, termed a "bit," is represented by either a 1 or a 0. In the instant system, a 1 is represented by a positive electrical signal and a 0 by a negative electrical signal. The fundamental unit of data for processing and communication is the data word. The data word comprises 28 bits.

The 28 bits of the data word are normally processed as 7 sequential groups of 4 bits. Each group is termed a "digit." The bits of a digit are processed simultaneously. The grouping of the bits permits the system to perform operation in the decimal number system. The 4 bits of a group may be treated as a decimal numeral and such a group is termed a "binary-coded decimal" digit. Each bit of a digit corresponds to a different decimal numeral if the group is employed as a decimal digit representation. In this system, the 5-4-2-1 code is employed. The most significant bit of the digit represents the decimal numeral "5", the next lower order bit represents the decimal numeral "4," the next lower order bit represents the decimal numeral "2" and the least significant bit represents the decimal numeral "1." For example, the decimal numeral "8" is represented by the binary bit group 1011.

Inasmuch as but 10 of the 16 possible configurations of the 4 bits of a group are employed to represent the 10 decimal numerals, 6 configurations of the group are available for other representations. The bit configurations representing the 10 decimal numerals are termed "numeric" digits. Five of the remaining 6 configurations represent respectively the dollar sign ($), the comma (,), the ampersand (&), the period (.), and the asterisk (*). The remaining bit configuration, 1111, is not employed to represent data, but instead is forbidden, and is useful for detecting data processing errors. These 6 configurations representing non-numerals are termed "non-numeric" digits. The 16 configurations of the binary code of a single digit or group and the corresponding symbols which they usually represent are given in the following Table I. In this table, the bits of each group are shown in decreasing (from left to right) order of significance.

TABLE I

| Symbol | Single Digit Code |
|---|---|
| 0 | 0000 |
| 1 | 0001 |
| 2 | 0010 |
| 3 | 0011 |
| 4 | 0100 |
| 5 | 1000 |
| 6 | 1001 |
| 7 | 1010 |
| 8 | 1011 |
| 9 | 1100 |
| $ | 0101 |
| , | 0110 |
| & | 0111 |
| . | 1101 |
| * | 1110 |
| forbidden | 1111 |

Therefore, all data words, including instruction words, comprise 7 digits, each digit comprising one of the bit configurations of Table I. In arithmetic operations and in many other data processing operations, the 7 digits of a word are processed in sequential order. The digit first processed is termed the least significant digit (LDS) of the word. The digit last processed is termed the most significant digit (MSD) of the word. Each of the 6 digits other than the MSD digit are interpreted as repreesnting one of the 15 symbols of Table I. The 7th, or MSD, is not usually so interpreted.

This 7th digit of the data word, which is also termed the "condition" digit, comprises three separate representations. The most significant bit of the condition digit is termed the "designator" bit and is employed for automatic address modification. The next lower order bit of the condition digit is termed the "sign" bit and is employed to denote the algebraic significance of the 6 least significant digits of the data word. When the sign bit is 1, the data word is considered negative. When the sign bit is 0, the data word is positive. The employment of the designator and sign bits in a data processing system is illustrated in the aforementioned Johnson patent. The two least significant bits of the condition digit are termed the "mod-bits." The mod-bits provide a representation of the modulo-3 of the data word and are employed to check the correctness of the data word following a data transfer, or to check the correctness of an arithmetic operation employing the data word. The data word may be represented as follows:

DATA WORD

| Condition Digit | 6th Digit | 5th Digit | 4th Digit | 3rd Digit | 2nd Digit | 1st Digit |
|---|---|---|---|---|---|---|
| Designator bit | 5-bit | 5-bit | 5-bit | 5-bit | 5-bit | 5-bit. |
| Sign bit | 4-bit | 4-bit | 4-bit | 4-bit | 4-bit | 4-bit. |
| Mod-bit | 2-bit | 2-bit | 2-bit | 2-bit | 2-bit | 2-bit. |
| Mod-bit | 1-bit | 1-bit | 1-bit | 1-bit | 1-bit | 1-bit. |
| | $\times 10^5$ | $\times 10^4$ | $\times 10^3$ | $\times 10^2$ | $\times 10^1$ | $\times 10^0$. |

The order of the digits in the above representation, starting with the first digit, is the order of sequential processing of the data word. If the word represents a numeric quantity, the increasing order of decimal significance of each digit is indicated in the row following the data word representation.

Two types of data words are employed, and include the instruction word and the operand word. The instruction word is employed by the Central Processor to direct a distinct operation of the system. The instruction word is generally employed in two portions to direct an operation. The four least significant digits comprise a Memory address and denote a location in Memory where a data word is to be obtained for processing, or where a processed word is to be stored. The next two digits comprise a command (order) code. The command code is a two-decimal digit code which determines the type of operation that the system will execute.

Since the addressable locations in Memory are normally identified by 0000–3999, the 4- and 5-bit positions of the 4th digit are not usually needed for a Memory address. Therefore, in an instruction word, the two most significant bits of the 4th digit are employed for separate functions. The most significant bit of the 4th digit is termed the "augmentor" bit. The next lower order bit is termed the "breakpoint" bit. The employment of the augmentor and breakpoint bits in a data processing system is illustrated in No. 3,077,984. The instruction word may be represented as follows:

word transferred. This positive mod-check is to be contrasted with the false mod-check which would occur if the total word modulo-3 had been required to be 0, and a complete failure of data transfer occurs; inasmuch as a word consisting solely of 0's has a total modulo-3 of 0.

SYSTEM CIRCUIT ELEMENTS

Elements used in the system of FIG. 1 will now be described. Diagrams of specific circuits which may be employed for these elements are shown in the Johnson patent No. 3,077,989. However, other forms of such elements are known in the art and may be employed instead.

The following elements are employed in the system: clock pulse generator, clock pulse driver, flip-flop, AND-gate, OR-gate, inverter, emitter follower, register transfer, and one-shot. In the various drawings illustrating the instant invention, symbols representative of these elements are employed. Such symbols provide for simplicity in the description of the embodiment of the invention.

INSTRUCTION WORD

| Condition Digit | Command Portion | | Address Portion | | | |
|---|---|---|---|---|---|---|
| | 6th Digit | 5th Digit | 4th Digit | 3rd Digit | 2nd Digit | 1st Digit |
| Designator bit | 5-bit | 5-bit | Augmentor bit | 5-bit | 5-bit | 5-bit. |
| Sign bit | 4-bit | 4-bit | Breakpoint bit | 4-bit | 4-bit | 4-bit. |
| Mod-bit | 2-bit | 2-bit | 2-bit | 2-bit | 2-bit | 2-bit. |
| Mod-bit | 1-bit | 1-bit | 1-bit | 1-bit | 1-bit | 1-bit. |

The other type of data word is that on which data processing operations are performed. This word is generally known as an "operand" word. The type of operand word most commonly employed in the instant invention is the numeric operand, wherein each of the six least significant digits of the numeric word is processed as a separate entity and represents one of the 15 symbols of Table I.

The Memory may contain at any location either one of the two types of data words.

*Mod-bits*

Although the configurations of the six least significant digits and the designator and sign bits of all data words inserted into the Memory are discretionary with the operator, the configuration of the mod-bits is mandatory. The mod-bits of all words are representative of the modulo-3 thereof. The modulo-3 of a number is the remainder when that number is divided by 3. Thus, for example, the modulo-3 of 0, 3, 6, and 9 is 0; of 1, 4, and 7 is 1 (−2); and of 2, 5, and 8 is 2 (−1).

The mod-bits of a numeric word in Memory are required to have the configuration necessary to make the modulo-3 of the entire seven digits of the word equal to 1. In determining the modulo-3 of the entire word, the designator and sign bits are assigned their respective positional values of 5 and 4. The most significant mod-bit is assigned the value of 2 and the least significant mod-bit, the value of 1. Thus, the three configurations of the mod-bits (most significant bit first) are 0, 0; 0, 1; and 1, 0 to represent the respective numbers 0, 1 and 2. When a data word is transferred into the Central Processor from Memory, its correctness is tested by a "mod-check," wherein the total modulo-3 of all seven digits is accumulated. If this accumulated total is not 1, an alarm occurs and the Central Processor halts. This testing and conditional halting by the Central Processor is described in the aforementioned Johnson patent.

Figure 3:
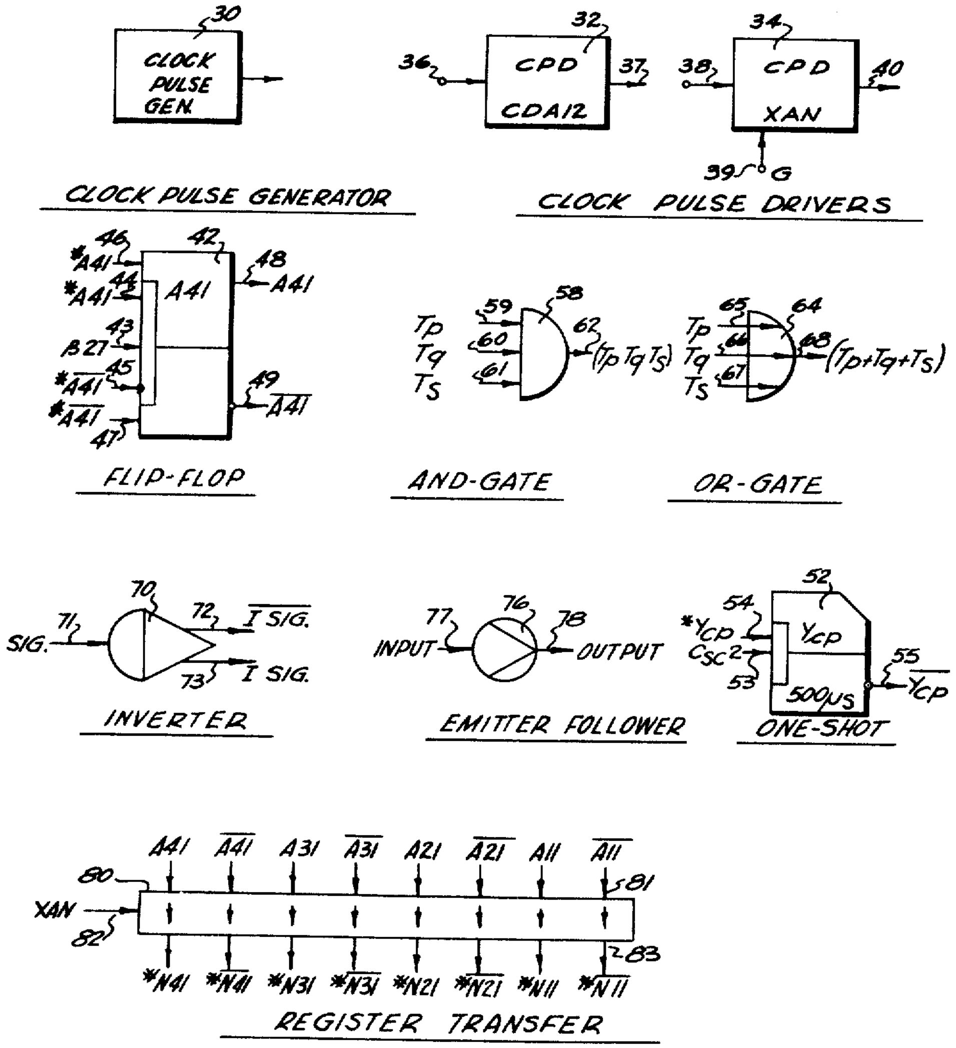
FIGURE 3 is an assemblage of the various circuit element symbols employed in the drawings.

The employment of a total modulo-3 of 1 for words transferred from Memory to the Central Processor always permits a positive check on the correctness of the entire These symbols are assembled in FIG. 3. The significance of each symbol will be explained in conjunction with an explanation of the function of the respective element.

The clock pulse generator represented by symbol 30 of FIG. 3 provides positive trigger signals for synchronizing clock pulse drivers located throughout the system. The trigger signals comprise a substantially rectangular pulse train provided at a repetition rate of 250 kc.

The clock pulse driver provides clock signals for driving other clock pulse drivers or for direct application to flip-flops and register transfers to control respectively the entry of data into flip-flops and the transfer of data between flip-flops. The clock pulse driver responds to the trigger signals supplied by the clock pulse generator to clock pulses provided by other clock pulse drivers to generate corresponding clock pulses. The clock pulse driver may operate continuously, as represented by symbol 32, or gated, as represented by symbol 34. When operated continuously, the clock pulse driver provides clock pulses at the 250 kc. rate. When operated gated, the clock pulse driver may provide single clock pulses or bursts of clock pulses, wherein the pulses recur at the 250 kc. rate. When gated on, the clock pulse driver generates a clock pulse for each trigger signal received from the clock pulse generator, but when gated off, no clock pulses are generated.

The clock pulses generated by the clock pulse driver are substantially rectangular and have a peak amplitude equal to +6 v. Between pulses, or when the clock pulse driver is inoperative, the output voltage level drops to −5 v.

The continuous clock pulse driver represented by symbol 32 receives trigger signals from the clock pulse generator on an input lead 36. Clock pulses are delivered continuously on an output lead 37.

The gated clock pulse driver represented by symbol 34 receives trigger signals from the clock pulse generator on an input lead 38. The gating signal is applied to a terminal 39, designated by the symbol "G." So long as the gating signal is at a −5 v. level, no clock pulses are delivered on the output lead 40. When the gating signal is increased to +6 v., the gated clock pulse driver delivers a clock pulse for every input trigger signal received. A gating signal is identified with a "G-" prefix. Thus, the gating signal applied to the XAN clock pulse driver is identified as the G-XAN signal.

Generally, clock pulse drivers and their respective output signals are identified in accordance with the function they perform. Thus, clock pulse drivers whose designations begin with the letter "C," such as clock pulse driver CDA–12, drive flip-flops and other clock pulse drivers. Clock pulse drivers driving register transfers usually have designations beginning with the letter "X," so that the letter "X" denotes a clock pulse driver controlling a parallel shift, or transfer, of data. Thus, the clock pulse driver XAN provides a parallel transfer of data from the A-register to the N-register.

The flip-flop represented by symbol 42 provides temporary storage of a data word bit or a control signal. Generally, a flip-flop that is employed to store a data bit comprises one of an array of flip-flips denoted as a register. For example, in a register adapted to provide temporary storage for a complete data word, 28 flip-flops are employed, one for each bit of the data word.

The flip-flop is an element adapted to operate in either one of two stable states, and to transfer from the state in which it is operating to the other stable state upon application of an appropriate input signal thereto. In one state of operation, the flip-flop represents the binary 1 (1-state) and in the other state, the binary 0 (0-state). The particular flip-flop employed is adapted to receive five signals as follows:

(*a*) A clock pulse signal on input lead 43, supplied by a clock pulse driver, (*b*) An input logic signal on input lead 44 for triggering the flip-flop to its 1-state, usually supplied by a logical gate, (*c*) An input logic signal on input lead 45 for triggering the flip-flop to its 0-state, usually supplied by a logical gate, (*d*) An input signal on input lead 46 for triggering the flip-flop to its 1-state, usually supplied by a register transfer circuit, and (*e*) An input signal on input lead 47 for triggering the flip-flop to its 0-state, usually supplied by a register transfer circuit.

Leads 44 and 45 are also referred to herein as "logic input" leads, and leads 46 and 47 are referred to as "register transfer input" leads.

A flip-flop output signal representing the 1-state of the flip-flop is delivered on an output lead 48, and an output signal representing the 0-state of the flip-flop is delivered on an output lead 49. When the flip-flop is in its 0-state, the signal provided on output lead 48 is at the —5 v. level. Inasmuch as the system logical elements and flip-flops respond only to positive signals of +6 v., the —5 v. so delivered on output lead 48 denotes a binary 0. Again, when the flip-flop is in its 0-state, a +6 v. signal is provided on output lead 49. The elements of the system respond to this +6 v. signal, so that it denotes a binary 1. Therefore, when the flip-flop is in the 0-state, a binary-0 signal is provided on the 1-output lead and a binary-1 signal is provided on the 0-output lead. Thus, system elements coupled to respond to the flip-flop 0-state will be enabled by the +6 v. signal delivered on lead 49, whereas elements coupled to respond to the flip-flop 1-state will be disabled by the —5 v. signal delivered on lead 48.

Conversely, when the flip-flop is in its 1-state, a +6 v. signal, representing a binary 1, is supplied on lead 48 and a —5 v. signal, representing a binary 0, is supplied on lead 49. Thus, the designation of output lead 48 as a 1-output lead indicates that, when the flip-flop is in its 1-state, a binary-1 output signal is provided on lead 48. The designation of lead 49 as a 0-output lead indicates that, when the flip-flop is in its 0-state, a binary-1 output signal is provided on lead 49.

Consider now the input signals which will trigger the flip-flop; that is, those signals which will transfer the flip-flop from the state in which it is operating to its other stable state. The logic signals applied on leads 44 and 45 result from a logical combination of other data-representing signals. When a logical combination of signals represents a binary 0, the resulting logic signal is approximately —5 v. When a logical combination of signals represents a binary 1, the resulting logic signal is approximately +6 v. Neither a binary-0 logic signal nor a binary-1 logic signal is adequate, alone, to trigger the flip-flop when it is applied to leads 44 or 45. However, if a binary-1 logic signal is present on lead 44 or 45 when a clock pulse arrives on lead 43, the concurrence thereof is sufficient, under conditions herein described, to change the state of the flip-flop. With a binary-1 logic signal applied only to lead 44 when the flip-flop is operating in the 0-state, the application of a clock pulse to lead 43 causes the flip-flop to transfer to its 1-state. This type of flip-flop triggering is known as clock pulse pedestal triggering and enables the flip-flops of the system to change their state in synchronism with the clock pulses. Between clock pulses, which occur no more frequently than every four microseconds, there is adequate time for the logic elements of the system to change their state and for the resulting logical combination signals to stabilize their voltage levels at the logic input leads 44 and 45 of the various flip-flops, so that when clock pulses are subsequently applied to the flip-flops the logic signal voltage levels will determine whether the flip-flops change state.

In addition to the input logic signal which, when enabled by a clock pulse, may trigger the flip-flop, the input signals applied to leads 46 or 47 may trigger the flip-flop. Such signals are usually provided by register transfer circuits and consist of a logic signal with superposed clock pulse; however, such signals may comprise any signal of sufficient amplitude to cause the flip-flop to change state. If the register transfer signal is a binary-1 logic signal with superposed clock pulse, it will be sufficient to trigger the flip-flop. Therefore, the signals applied to leads 46 and 47 are sufficient in amplitude to trigger the flip-flop without requiring the clock pulses applied on lead 43. The superposed logic and clock signal is provided in the register transfer circuit to be described later. Register transfer circuits are generally employed to transfer the state of one flip-flop to another flip-flop and are, therefore, employed in transferring data between, or within, registers.

The input leads 46 and 47 may be employed also for manually setting or resetting the flip-flop. A +12 v. signal applied to the appropriate one of these leads through a pushbutton switch or other electrical network is adequate to transfer the flip-flop to the desired state.

Flip-flops are identified in accordance with the function they perform; for example, a typical flip-flop employed for control is identified as the A*tm* flip-flop. The A*tm* designation stands for "Add to memory," and the A*tm* flip-flop, when in the 1-state, increments the contents of the M-register of the Memory as such contents are restored to their proper storage location. A typical flip-flop employed for temporary storage of data is the A41 flip-flop. When the A41 flip-flop stores a binary 1, a +6 v. output signal is available on the 1-output lead thereof, and when it stores a binary 0, a —5 v. output signal is delivered on the 1-output lead.

Symbol 42 represents the A41 flip-flop. The notation "B27" opposite lead 43 indicates that the A41 flip-flop receives clock signals from the B27 clock pulse driver on lead 43. Input leads 46 and 47 receive respective register transfer output signals. The representation "#A41" opposite lead 46 is a notation for the signal applied to lead 46 and adapted to trigger the A41 flip-flop to the 1-state. Correspondingly, the representation "#$\overline{A41}$" opposite lead 47 is a notation for the signal applied to lead 47 and adapted to trigger the A41 flip-flop to the 0-state. Similarly, the notations "*A41" and "*$\overline{A41}$"

identify the logic input signals applied respectively to leads 44 and 45 and adapted to trigger the A41 flip-flop respectively to the 1- and 0-states, provided clock pulse driver B27 simultaneously supplies a clock pulse.

The notation "A41" and "$\overline{A41}$," respectively, opposite leads 48 and 49 identify the respective 1-output and 0-output signals of the A41 flip-flop; thus, the notation "A41" has the dual function of identifying the A41 flip-flop and of identifying the 1-output signal thereof.

In the ensuing system description, a flip-flop in its 1-state is also said to be in the "set" state or in the "on" state. Conversely, a flip-flop in its 0-state is also said to be in the "reset" state or in the "off" state. When a flip-flop is transferred to its 1-state, it will often be said to be "set" or to be "turned on." Conversely, when a flip-flop is transferred to its 0-state, it may be said to be "reset" or to be "turned off."

The one-shot, or monostable multivibrator, represented by the symbol 52 of FIG. 3 provides an output signal of predetermined duration. The duration of the output signal is often equal to a non-integral number of clock periods.

The one-shot is an element adapted to operate normally in a stable state, but to transfer to an unstable state for a predetermined duration upon application of an appropriate input signal thereto. In the unstable state of operation, the one-shot represents a binary 1 (1-state) and in the stable state, a binary 0 (0-state). The one-shot is adapted to receive two signals as follows:

(*a*) A clock pulse signal on input lead 53, supplied by a clock pulse driver, and (*b*) A logic signal on input lead 54 for triggering the one-shot to its unstable state, usually supplied by a logical gate.

The output signal, representing the 0-state of the one-shot, is delivered on output lead 55. When the one-shot is in its stable, or 0-state, the signal provided on output lead 55 is at the +6 v. level, denoting a binary 1. When the one-shot is in its unstable, or 1-state, a −5 v. signal, representing a binary 0, is provided on output lead 55. Thus, lead 55 may be designated as the 0-output lead inasmuch as when the one-shot is in its 0-state, a binary-1 output signal is provided.

The logic input signal applied on lead 54 is either at the −5 v. level (binary 0) or at the +6 v. level (binary 1). Either level of the logic input signal is insufficient, alone, to trigger the one-shot to its unstable state. However, if a clock pulse is applied on lead 53 when the logic input signal is at its +6 v. level, the superposition of the two input signals is sufficient to trigger the one-shot into its unsable state. Once triggered, the one-shot remains in its unsable state for a duration determined by its circuit constants, following which it returns to its stable, or 0-state.

One-shots are identified in accordance with the function they perform; for example, a typical one-shot employed for control is identified as the Y*cp* one-shot, represented in FIG. 3 by symbol 52. The Y*cp* designation represents a "character presence" signal, and the Y*cp* one-shot is one which is triggered to its unstable state when each character on a document is read.

The notation "C*sc*2" opposite lead 53 indicates that the Y*cp* one-shot receives clock signals from the C*sc*2 clock pulse driver on lead 53. The notation "*Y*cp*" identifies the logic input signal applied to lead 54 and adapted to trigger the Y*cp* one-shot to its unstable, or 1-state, provided clock pulse driver C*sc*2 simultaneously supplies a clock pulse.

The notation "$\overline{Ycp}$" opposite lead 55 identifies the 0-output signal of the Y*cp* one-shot. The duration of the unstable state of the one-shot is also included within the one-shot symbol; thus, the unstable state of the Y*cp* one-shot is indicated to be 500 microseconds.

Thus, the logic signal available at the sole output lead of the one-shot normally represents a binary 1, until the one-shot is triggered to its unstable state, whereupon such output signal represents a binary 0 for the duration of the unstable state. In effect, therefore, the one-shot output signal turns off when the one-shot is triggered. If desired, an inverter may be coupled to output lead 55 to provide an output signal representing the 1-state of the one-shot; i.e., an output signal representing a binary 1 when the one-shot is in its 1-state.

The AND-gate represented by symbol 58 provides the logical operation of Conjunction for positive input signals applied thereto. In the system, a binary 1 is represented by a signal of approximately +6 v. Therefore, the AND-gate provides an output signal of approximately +6 v., representing a binary 1, only when all of the input signals applied thereto represent binary 1's.

The AND-gate of FIG. 3 is illustrated, by way of example, as having three input leads 59, 60, and 61, and a single output lead 62. The AND-gates employed in the system are not limited to three input leads but may have from two input leads to the maximum number necessary for the required Conjunctive operation.

A logic input signal applied to an input lead of the AND-gate represents either a binary 0 or a binary 1, and is provided as a corresponding signal of −5 v. or +6 v. If any one of the input signals is at the −5 v. level, the output signal from lead 62 will be at −5 v. and represent a binary 0. Therefore, only when all input signals are at the +6 v. level (binary 1) will the output signal be at the +6 v. level.

The three input signals to the particular AND-gate shown are respectively denoted T*p*, T*q* and T*s*. Therefore, the output signal is denoted *Tp Tq Ts*. The expression *Tp Tq Ts* is the logic expression for the Conjunctive, or AND, combination of the individual signals T*p*, T*q* and T*s*. This form of expression is used in logical equations, which are also known as Boolean equations, to be employed hereinafter. The Conjunctive operation on any two signals, such as the T*p* and T*q* signals, is indicated by writing the two signal terms adjacent each other with no operator notation therebetween, or with the operator notation (·) between the two terms; as follows: *Tp·Tq*. This expression is read as "*Tp* AND *Tq*."

The OR-gate represented by symbol 64 provides the logical operation of Inclusive-Or for positive input signals applied thereto. The OR-gate provides an output signal of approximately +6 v., representing a binary 1, when any one or more of the input signals applied thereto represent binary 1's.

The OR-gate of FIG. 3 is illustrated, by way of example, as having three input leads 65, 66, and 67 and a single output lead 68. The OR-gates employed in the system are not limited to three input leads, but may have from two input leads to the maximum number necessary for the required Inclusive-Or operation.

A logic input signal applied to an input lead of the OR-gate represents either a binary 0 or a binary 1, and is provided as a corresponding signal of −5 v. or +6 v. If any one of the input signals is at the +6 v. level, the output signal from lead 68 will be at +6 v. and will represent a binary 1. Therefore, when any one or more of the input signals are at the +6 v. level (binary 1), the output signal will be at the +6 v. level.

The three input signals to the particular OR-gate shown are respectively denoted T*p*, T*q* and T*s*. Therefore, the output signal is denoted *Tp*+*Tq*+*Ts*.

The expression *Tp*+*Tq*+*Ts* is the logic expression for the Inclusive-Or, or OR, combination of the individual signals T*p*, T*q* and T*s*. This form of expression is used in the logical equations to be employed hereinafter. The Inclusive-Or operation on any two signals, such as the T*p* and T*q* signals, is indicated by writing the two signal terms adjacent each other with the (+) operator notation therebetween; as follows: $Tp+Tq$. This expression is read as "$Tp$ OR $Tq$."

The inverter element represented by symbol 70 provides the logical operation of Inversion, or NOT, for an input signal applied thereto. The inverter is adapted to provide an output signal of approximately +6 v., representing a binary 1, when the input signal received thereby has a −5 v. level, representing a binary 0. Conversely, the inverter provides an output signal representing a binary 0 when the input signal represents a binary 1. The inverter supplies an additional output signal having the same logical significance as the input signal.

The input signal is applied to the inverter on input lead 71. The inverted output signal of the inverter is supplied on output lead 72. The non-inverted output signal is supplied on output lead 73 as a true logical representation of the input signal.

By way of example, the input signal to the inverter is denoted as the S*ig* signal. The logically inverted output signal provided on output lead 72 is designated as $\overline{ISig}$. The output signal provided on output lead 73 is not logically inverted and is represented by the legend IS*ig*. Thus, the "true" output signal of an inverter is usually identified with the letter I affixed to the input signal term. The inverted output signal is similarly written, but is provided with a superscribing bar.

The emitter follower represented by symbol 76 is employed in many parts of the logic networks of the system. The primary function of the emitter follower is to supply the input current requirements of a large chain of logical gates, which a flip-flop would be unable to directly drive. The specific locations of the emitter followers in the system will not be given in the description to follow. However, they may be employed following flip-flop output leads or at other locations where large current requirements exist.

The emitter follower receives a signal on input lead 77 and provides an output signal on lead 78 having the same logical sense as the input signal. That is, the emitter follower delivers a binary-1 output signal when the input signal represents a binary 1, and vice versa. Therefore, the output signal of the emitter follower bears the same notation as the input signal applied thereto.

*Register transfer*

The register transfer elements represented by symbol 80 of FIG. 3 provide for the direct transfer of data between pairs of flip-flops, under control of a gated clock pulse driver. Normally, if a first flip-flop (which may be termed a data-receiving flip-flop) is adapted to receive the data bit stored in a second flip-flop (which may be termed a data-transmitting flip-flop), the register transfer input leads of the first flip-flop are connected through respective register transfers to the corresponding output leads of the second flip-flop. A register transfer element is connected between the 1-output lead of each data-transmitting flip-flop and the register transfer 1-input lead of the corresponding data-receiving flip-flop. A register transfer is also connected between the 0-output lead of each data-transmitting flip-flop and the register transfer 0-input lead of the corresponding data-receiving flip-flop.

As described above, neither a −5 v. signal nor a +6 v. signal applied to the register transfer input lead of a flip-flop is sufficient to trigger the flip-flop. However, when a clock pulse is superposed on a +6 v. signal, the flip-flop can be triggered. The register transfer provides for the superposition of a clock pulse delivered by a gated clock on the output signal of the data-transmitting flip-flop.

Symbol 80 represents eight register transfers for transferring the entire contents of the first digit position of the A-register to the first digit position of the N-register upon receipt of the XAN signal provided by the XAN gated clock pulse driver.

The eight output signals of the four flip-flops of the first digit position of the A-register are shown in FIG. 3 as being applied to input leads 81 of the register transfer. The clock pulses XAN from the XAN clock pulse driver are applied on input lead 82. The output leads 83 are connected to the respective register transfer input leads of the four flip-flops of the first digit position of the N-register. Whenever the XAN clock pulse driver is gated on to supply a clock pulse, such clock pulse is superposed on all eight output signals from the A-register and applied to the corresponding input leads of the N-register. All A-register output signals representing a binary 1 at this time trigger the corresponding N-register flip-flops. Therefore, the digit contents of the first digit position in the A-register are transferred to the first digit position in the N-register.

Inasmuch as a triggering output signal from a register transfer output lead requires the simultaneous presence of a binary 1 from the corresponding data-transmitting flip-flop output lead and a clock pulse on lead 82, the register transfer output signal may be considered as representing a Conjunctive operation on the flip-flop input signal and the clock pulse. Therefore, an output signal delivered by the register transfer of FIG. 3, for example, may be represented as:

$$\#N41=XAN\ A41$$

Correspondingly, the output signal delivered for the other output lead of the A41 flip-flop may be represented as:

$$\#\overline{N41}=XAN\ \overline{A41}$$

The output terminals of one or more register transfers may be connected to a single register transfer input lead of a flip-flop. In such instance, the one of the register transfers which has a clock pulse applied thereto will transfer the contents of the corresponding data-transmitting flip-flop to the data-receiving flip-flop. An example of such a circuit is provided by the A11 flip-flop, which is adapted to receive the contents of the N11 flip-flop when the XNA clock signal is applied to register transfers connecting the output leads of the N11 flip-flop to the corresponding register transfer input leads of the A11 flip-flop, or to receive the contents of the J11 flip-flop when the XJI clock signal is applied to register transfers connecting the output leads of the J11 flip-flop to the corresponding register transfer input leads of the A11 flip-flop. This plural input connection is illustrated later.

Inasmuch as the plural register transfer connection to a flip-flop provides that an output signal from any one of the connected register transfers will trigger the data-receiving flip-flop, an Inclusive-Or logical operation is thereby provided for the output signals of the plurally connected register transfers. Thus, the register transfer 1-input signal to the A11 flip-flop may be expressed as:

$$\#A11=XNA\ N11+XJI\ J11$$

A register is adapted to provide temporary storage of data being processed or data being transferred between system components. The register comprises a plurality of flip-flops, one flip-flop for each bit of the data to be stored therein. Most registers of the system store a full data word and, therefore, comprise 28 flip-flops.

The flip-flops of a register are identified according to the register designation and the numerical significance of the data bits stored therein. For example, a register flip-flop will be designated as the Q*mn* flip-flop, where Q identifies the register, *m* identifies the digit order of the bit stored, and *n* identifies the decimal significance of the bit stored. Thus, the J13 flip-flop stores the 4-bit of the least significant digit of the J-register contents. The 28 flip-flops of the J-register may be represented as follows:

J-REGISTER

| | | | | | | |
|---|---|---|---|---|---|---|
| J*d*(J74) | J64 | J54 | J44 | J34 | J24 | J14 |
| J*s*(J73) | J63 | J53 | J43 | J33 | J23 | J13 |
| J*m*2(J72) | J62 | J52 | J42 | J32 | J22 | J12 |
| J*m*1(J71) | J61 | J51 | J41 | J31 | J21 | J11 |

The most significant, or 7th, digit of the data word is stored in *Jd*, *Js*, *Jm*2 and *Jm*1. This set of flip-flops is also termed J74, J73, J72 and J71.

The data in most of the registers may be serially shifted from higher to lower order digit positions of the register. In such registers, the entire contents of a digit position are transferred by parallel shift to the next lower order digit position. The serial shifting of data in this manner is most often effected by register transfers connected between the flip-flops.

Temporary signal storage is provided to permit a register flip-flop to change its state at the same time that its contents are being transmitted to another register flip-flop; i.e., during the parallel shift of data between registers. This temporary signal storage is supplied by capacitors in the register transfers and in the flip-flop logic input circuits. These capacitors shown in the Johnson Patent No. 3,077,984 store the logic signal levels from the output leads of a data-transmitting flip-flop prior to the occurrence of the clock signal that causes the data-transmitting flip-flop to change its state and the corresponding data-receiving flip-flop to receive the former contents of the data-transmititng flip-flop.

COMPONENT DETAILS AND OPERATION

Description of the internal structures of the various components of the system and of the operation of the system follow hereinafter. These component structures comprise novel assemblages of the previously described clock pulse drivers, flip-flops, one-shots, AND-gates, OR-gates, inverters, emitter followers, register transfers, and registers to perform the required functions of the Data Processing System in accordance with the principles of the instant invention. The connective relationships between the circuit elements will also be described by logic expressions of the types illustrated in connection with the foregoing descriptions of the AND-gate, the OR-gate, and the register transfer.

*Central processor*

The Central Processor exercises operational control over the Data Processing System. The Central Processor responds to a plurality of distinct instructions which are supplied thereto in the sequential order necessary to perform a data processing operation. The data which is processed in the Central Processor is primarily supplied from the Memory. Data is transferred into and out of the Memory under control of the Central Processor.

The Central Processor comprises registers for temporarily storing data, register transfer and logic circuits for transferring data through and between registers, clock pulse drivers for controlling the timing of the Central Processor, a sequencer for controlling the order of steps employed in executing an instruction, and flip-flops and one-shots for control signal sources.

Figure 4:
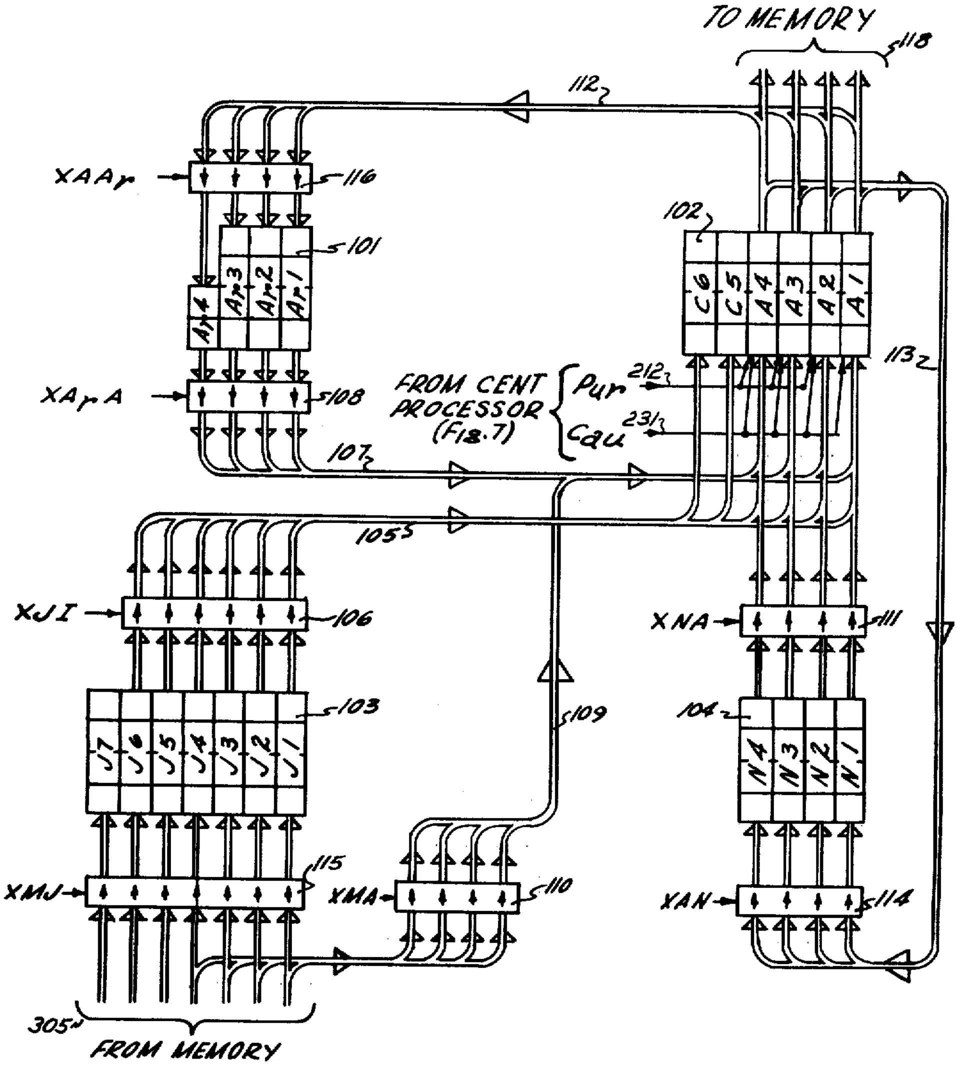
FIGURE 4 is a block diagram of data storage and communication portions of the Central Processor of FIG. 1.

The data storage and communication portions of the Central Processor employed in the embodiment of this invention are shown in FIG. 4. FIGS. 5–9 illustrate further details of the Central Processor. The Central Processor described herein is adequate to embody the principles of this invention. However, central processors employed with data processing systems frequently are adapted to execute many types of operations other than those described herein; accordingly, central processors may be provided with additional registers, accumulators, arithmetic units, and additional control elements. Such a central processor is shown in the aforementioned Johnson patent.

Consider now FIG. 4. The Central Processor shown comprises the following registers: A*r*-register 101, I-register 102, J-register 103, and N-register 104. The instruction word that directs the system operation is stored in the six-digit I-register 102, which comprises the two-digit C-register for storing the command portion of the instruction word, and the four-digit A-register for storing the address portion of the instruction word. Each different digit configuration in the C-register directs a fundamentally different data processing operation of the system. The three operations executed in the embodiment of the instant invention are described in detail in a later section.

The I-register is adapted to receive, by parallel shift over a cable 105, the contents of the corresponding six least significant digit positions of the J-register upon application of the XJI clock signal to the register transfers 106, which connect the output leads of the J6–J1 flip-flops to corresponding input leads of the I-register flip-flops. (The notation "J6," for example, is an abbreviation denoting all four flip-flops of the sixth-digit position of the J-register, these flip-flops comprising the J64, J63, J62, and J61 flip-flops.) Inasmuch as both the 0-output and 1-output signals of the flip-flops are transferred by the register transfers, cable 105 comprises forty-eight leads to transfer the contents of the twenty-four flip-flops in the six least significant digit positions of the J-register to the corresponding positions in the I-register. Each cable shown immediately entering and leaving the register transfer 106 correspondingly transfers eight signals and, therefore, comprises eight leads.

The A-register flip-flops are adapted to receive, by parallel shift over cable 107, the contents of the corresponding flip-flops of the A*r*-register upon application of the XA*r*A clock signal to the register transfers 108, which connect the output leads of the A*r*-register flip-flops to corresponding input leads of the A-register flip-flops. The A-register flip-flops are adapted to receive, by parallel shift over cable 109, the contents of the corresponding M-register flip-flops of the Memory upon application of the XMA clock signal to register transfers 110, which connect the output leads of the M-register flip-flops to corresponding input leads of the A-register flip-flops. The A-register flip-flops are also adapted to receive, by parallel shift, the contents of the corresponding N-register flip-flops upon application of the XNA clock signal to register transfers 111, which connect the output leads of the N-register flip-flops to corresponding input leads of the A-register flip-flops.

Through circuits (not shown), the A4, A3 and A2 flip-flops are all reset to their 0-states upon receipt of a P*ur* signal on the lead 212. A C*au* signal supplied on lead 231 is applied to all of the A-register flip-flops and functions to increment the contents of the A-register by unity each time it is applied. Consequently, the C*au* signal causes the A-register to function as a counter, wherein the numerical equivalent of the contents thereof is increased by one each time the C*au* signal is applied. Circuit details for the operation of this counting function are provided in the Johnson patent previously referenced.

The contents of the A-register may be transmitted to the address register 308 (FIG. 10) to provide the Memory location of the data word to be received from, or stored in, the Core Memory. The contents of the A-register may also be transmitted to the A*r*-register over cable 112 and to the N-register over cable 113. Additionally, the 0-output signals of the A1 flip-flops may be transmitted (FIG. 6) to the Sorter Control Units to store in the respective S*ou* (FIG. 17) flip-flops thereof the Sorter pocket code necessary to direct the storage of a document in a designated Sorter pocket.

The N-register 104 is a four-digit register adapted to store a Memory address, which is usually the address of the next instruction to be received from Memory by the Central Processor. The N-register flip-flops are adapted to receive, by parallel shift over cable 113, the contents of the corresponding A-register flip-flops upon application of the XAN clock signal to register transfers 114, which connect the output leads of the A-register flip-flops to corresponding input leads of the N-register flip-flops. The contents of the N-register may be transmitted to the A-register.

The seven-digit J-register 103 is the primary input register for the Central Processor. The J-register flip-flops are adapted to receive, by parallel shift, instruction and operand data words from the corresponding Memory M-register flip-flops upon application of the XMJ clock signal to register transfers 115, which connect the output leads of the M-register flip-flops to corresponding input leads of the J-register flip-flops.

The contents of the J6–J1 flip-flops may be transferred to the I-register. Not shown herein, but described in U.S. Patent 3,077,984, is apparatus coupled to the J-register to provide mod-checking for all data items received by the J-register from Memory before their subsequent transfer to other portions of the Central Processor.

The fourteen-bit A*r*-register is adapted to store a Memory address, and is primarily employed during those operations wherein new data is transferred from the Read Buffer to Memory. The A*r*-register flip-flops are adapted to receive, by parallel shift over cable 112, the contents of the corresponding A-register flip-flops upon application of the XAA*r* clock signal to register transfers 116, which connect the output leads of the A-register flip-flops to corresponding input leads of the A*r*-register flip-flops. The contents of the A*r*-register may be transmitted to the A-register.

Other Central Processor flip-flops are employed primarily to perform control functions. The A*m* flip-flop (FIG. 7) is employed during those operations when data is received by the Memory from the Character Readers and provides control for the address modification portion of these operations. The A*tm* flip-flop (FIG. 7) is set when the contents of the Memory M-register must be increased by 2. The C*fd*1 and C*fd*2 flip-flops (FIG. 6) control the feeding of documents by the respective ones of Sorter #1 and Sorter #2. The C*lc*1 and C*lc*2 flip-flops (FIG. 7) provide Memory address location control for the respective ones of Character Reader #1 and Character Reader #2 when data is being transferred from the Character Readers to Memory. The J*m*20 flip-flop (FIG. 7) is employed to extend the duration during which the Central Processor is interrupted when data is being transferred from the Read Buffer to the Memory. The J*r* flip-flop (FIG. 7) controls the gating of data from the Read Buffer to the Memory. The T*i* flip-flop (FIG. 7) functions during the execution of commands by the Central Processor to determine whether the Read Buffer has information ready for storage in the Memory and, if so, provides for signals to initiate transfer of the contents of the Read Buffer to the Memory.

Figure 5:
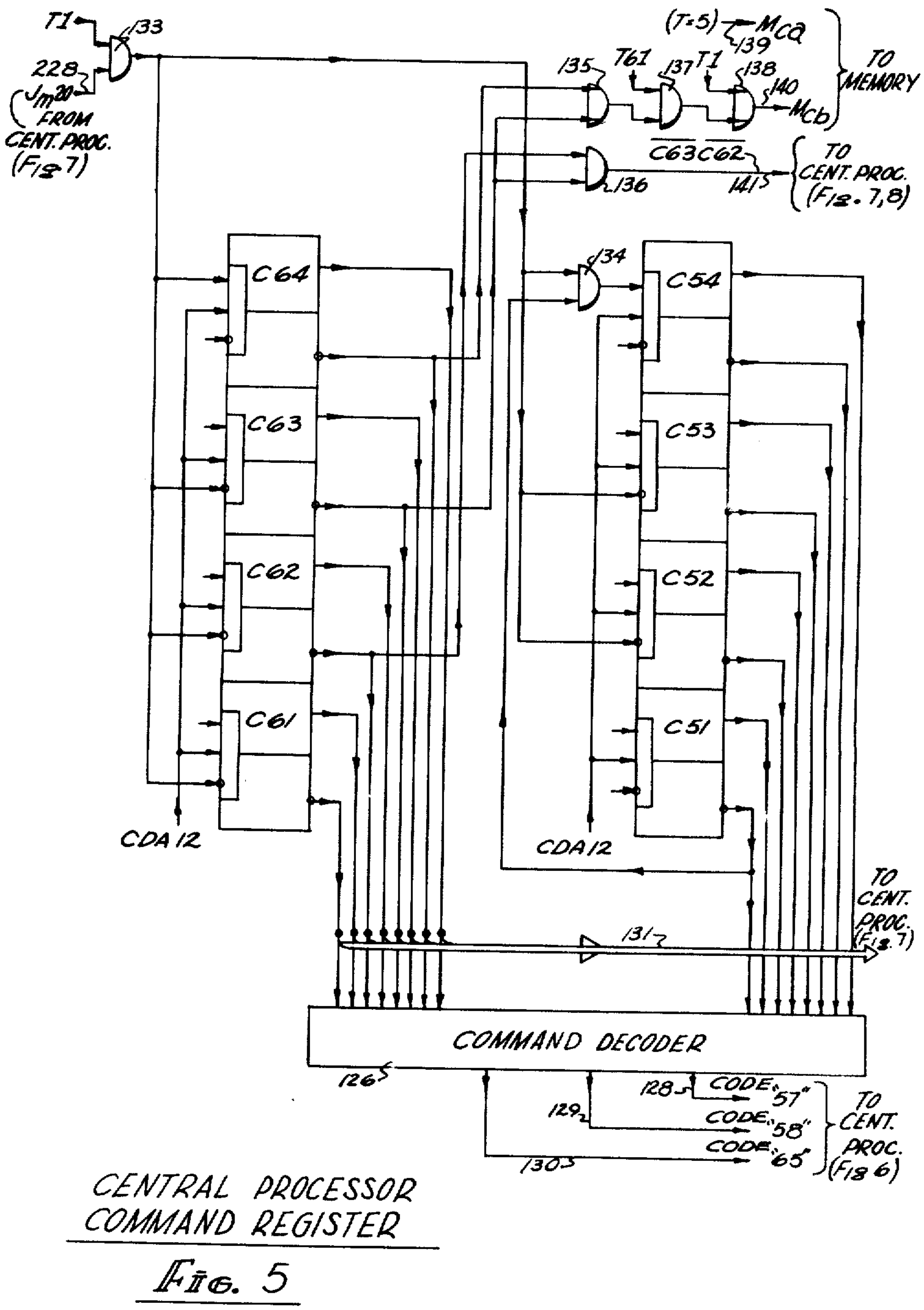
FIGURE 5 is a block diagram of the command register of the Central Processor of FIG. 4.

In FIG. 5, a command decoder 126 is shown connected to receive all output signals delivered by the eight flip-flops of the C-reigster portion of the I-register 102, this portion of the register containing the command portion of the instruction being executed. Decoders of this type are well known in the art and are adapted to provide output signals on each of a plurality of output leads in response to a particular configuration of input signals. In the embodiment illustrated, command decoder 126 provides a binary-1 output signal on output lead 128 when the contents of the C-register represent the decimal number 57. When the contents of the C-register represent the decimal number 58, a binary-1 output signal is provided on lead 129, and when the contents of the C-register represent 65, a binary-1 output signal is provided on lead 130. Thus, each instruction entered into the I-register from the Memory provides an output signal on the corresponding one of a plurality of output leads from command decoder 126. This output signal controls the particular data processing operation being executed by the system. In order to control additional operations, the command decoder may be increased in complexity to provide output signals on additional leads. A more-complete command decoder is illustrated in detail in U.S. Patent 3,077,984.

Figure 6:
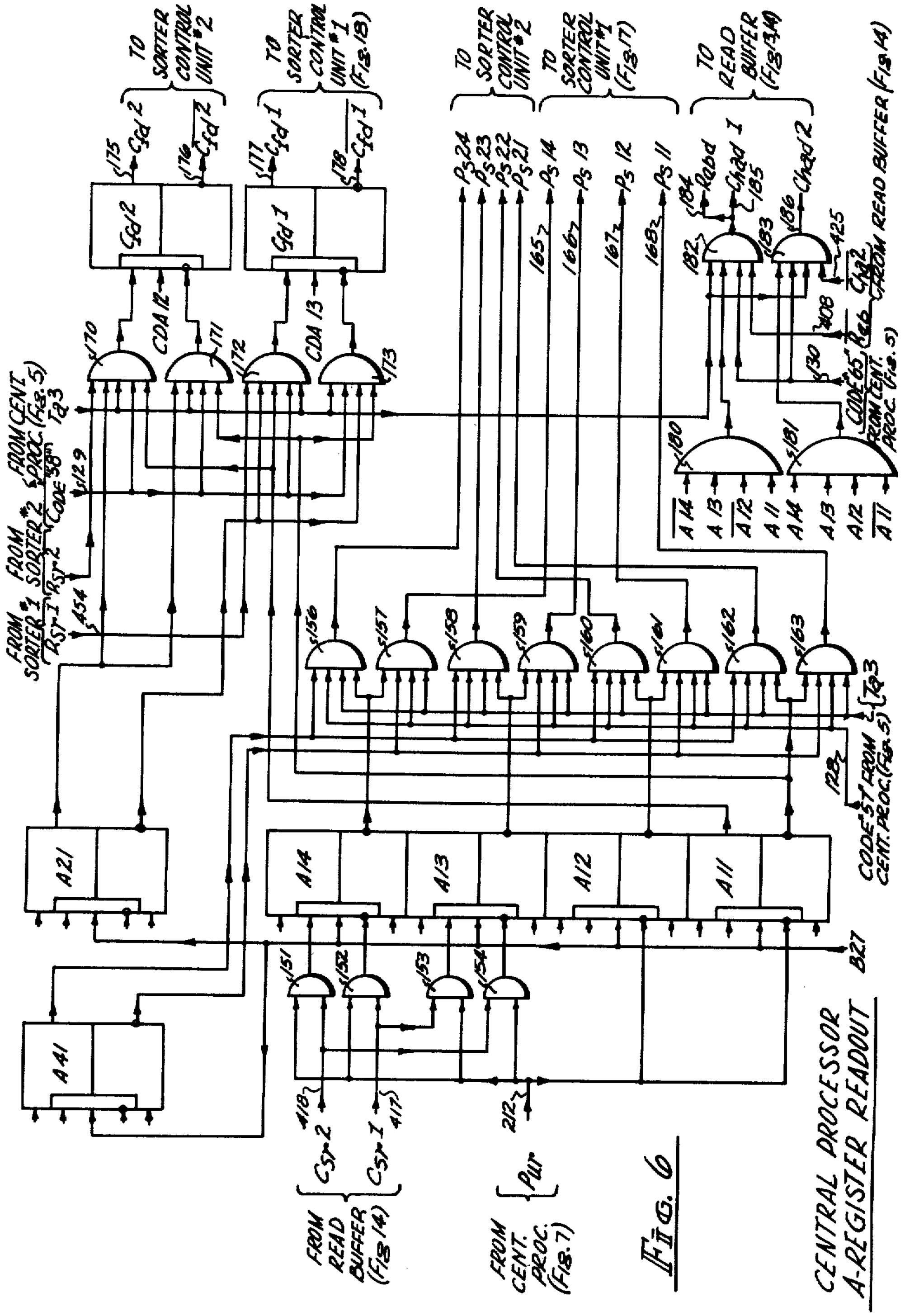
FIGURE 6 is a block diagram of elements in the Central Processor employed to respond to the A-register contents.

FIG. 6 illustrates the effect of the A-register contents on the operations executed by the Central Processor in response to the various commands decoded by command decoder 126 of FIG. 5. Thus, when command 57 is present in the C-register, the contents of the least significant digit position of the A-register are gated to Sorter Control Unit #1 or Sorter Control Unit #2, in accordance with the state of the A41 flip-flop of the A-register. When command 58 is received in the C-register, either flip-flop C*fd*1 or C*fd*2 is set to control respectively the operation of Sorter #1 or Sorter #2, in accordance with the state of the A21 flip-flop of the A-register. When the 65 command is present in the C-register, the contents of the least significant digit position of the A-register controls whether the signal C*had*1 or C*had*2 issues to initiate the reading of documents by the Character Reader.

Figure 8:
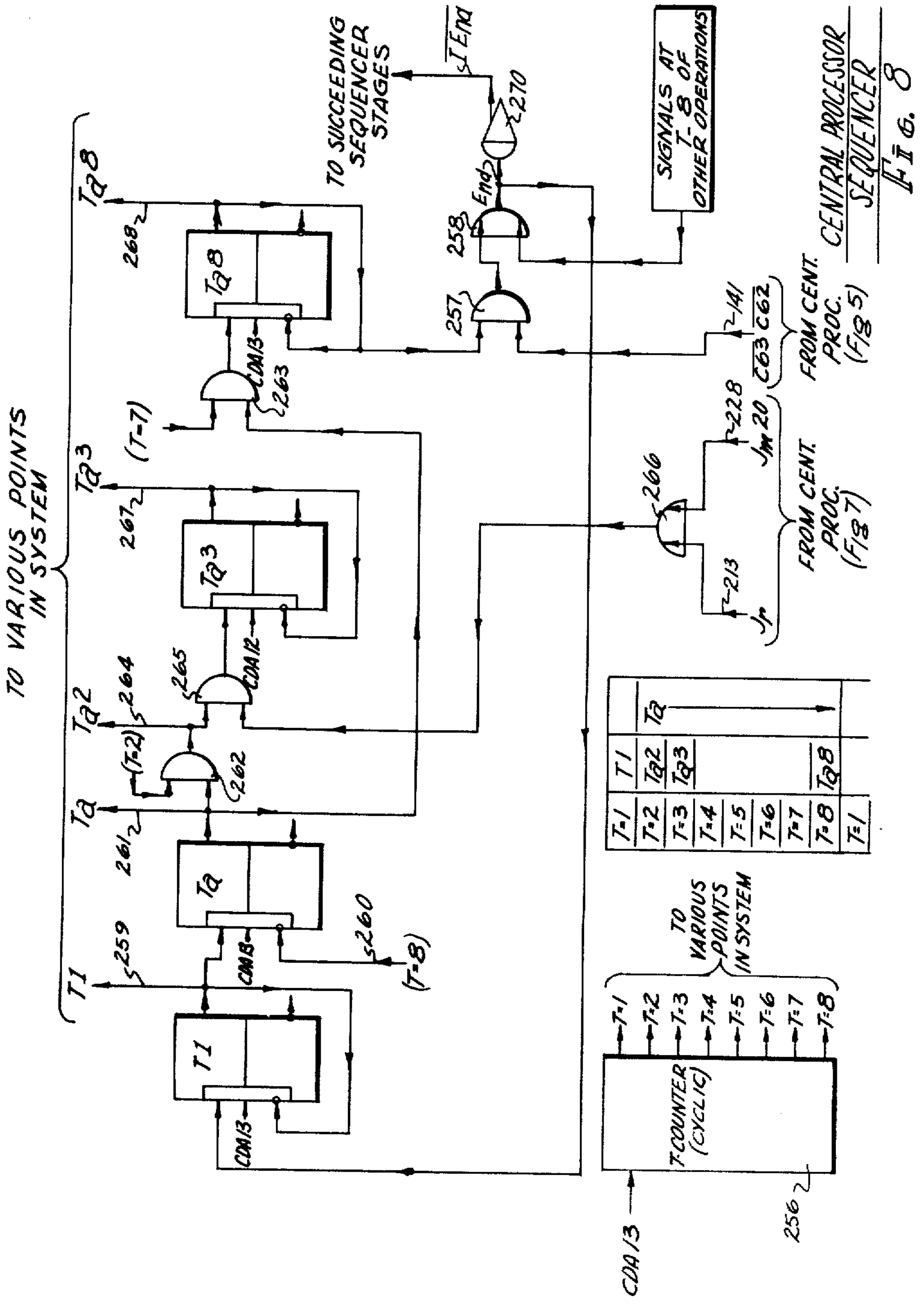
FIGURE 8 is a block diagram of the sequencer of the Central Processor.

The sequencer of FIG. 8 controls the sequence of steps performed by the Central Processor in executing an operation. The sequencer is illustrated with particular input signals received during those operations wherein data is being transferred from the Read Buffer to the Memory. The sequencer comprises the flip-flops T1, T*a*, T*a*3, and T*a*8, in combination with the T-counter 256.

The T-counter is a cyclic counter having eight states of operation, the eight states being designated as $T=1$ through $T=8$. Following $T=8$, the T-counter returns in the next clock period to the count of $T=1$. The T-counter comprises three flip-flops connected to occupy the eight different states and actuated by continuous clock pulses from clock pulse drivers CDA13, the period between two successive clock pulses being designated as the clock period. Thus, the T-counter is the basic counter of the system and changes its state every four microseconds, completing its cycle in 32-microseconds. The output signals delivered by the T-counter, represented by the notation $T=1$ to $T=8$, are applied to various points in the system, and the input signals at these points are designated by such notation.

The other flip-flops of the sequencer are synchronized in their operation with the states of the T-counter and the relationship of the states of these flip-flops to the state of the T-counter is illustrated in the table immediately to the right of T-counter 256. The sequencer enters its cycle of operation following the termination of each different operation executed under control of the Central Processor. The signal E*nd* is initiated at the conclusion of each operation, which occurs when the T-counter is in the $T=8$ state. To generate the signal E*nd* during those operations wherein the Read Buffer is transferring data to the Memory, the command number in the C-register is either 51, 55, or 56. Therefore, the C63 and C62 flip-flops are both in the 0-state, so that the signal $\overline{C63}\ \overline{C62}$ is equal to 1. Additionally, at the termination of such operation wherein data is transferred from the Read Buffer to the Memory, the flip-flop T*a*8 is in its 1-state, so that AND-gate 257, which is enabled during this operation by the $\overline{C63}\ \overline{C62}$ signal, supplies an output signal to OR-gate 258. Therefore, either at the conclusion of operations wherein data is transmitted from the Read Buffer to the Memory, or at the conclusion of all other types of operations which the system is adapted to execute, OR-gate 258 receives an input signal representing a binary 1. The output signal of OR-gate 258 is designated as the E*nd* signal and may be represented as follows:

(1) $End=\overline{C63}\ \overline{C62}\ Ta8+$Signals at $T=8$ of other operations The signal E*nd* is applied to the 1-input logic terminal of the T1 flip-flop and sets the T1 flip-flop to the 1-state at the same time as the T-counter enters its $T=1$ state. This concurrence is tabulated in the aforementioned table. The sequencer has now commenced the beginning of its cycle and, in turn, initiates the particular data processing operation designated by the contents of the command register. Although the T-counter may be in the $T=1$ state several times during a sequencer cycle, only at the beginning of the sequencer cycle is the T1 flip-flop in its 1-state. Therefore, the T1 flip-flop occupying its 1-state designates that the sequencer cycle is beginning.

The 1-output signal of the T1 flip-flop is delivered on an output lead 259 to various points in the system. Additionally, the 1-output lead of the T1 flip-flop is coupled to the 1-logic input lead of the T*a* flip-flop and to the 0-logic input lead of the T1 flip-flop. Therefore, the T1 flip-flop resets itself on the next clock pulse following that which caused it to be set. The signals which set and reset the T1 flip-flop may be represented as:

(2) $$*T1=End$$ $$*\overline{T1}=T1$$

The T*a* flip-flop is set to the 1-state during the second clock period of the sequencer cycle, at which time the T-counter enters the $T=2$ state. The T*a* flip-flop remains in its 1-state for seven clock periods, being reset to its 0-state at the end of the eighth clock period of the sequencer cycle. Thus, the first eight clock periods of the sequencer cycle, during which the T-counter completes a full cycle from the state $T=1$ through the state $T=8$, is designated as the T*a* portion of the sequencer cycle. The $T=8$ output signal of the T-counter is applied to the 0-logic input lead of the T*a* flip-flop on a lead 260. The logic input signals which set and reset the T*a* flip-flop may be represented as:

(3) $$*Ta=T1$$ $$*\overline{Ta}=(T=8)$$

The 1-output signal of the T*a* flip-flop is delivered on an output lead 261 to various points in the system. The 1-output lead of the T*a* flip-flop is also connected to respective input leads of AND-gates 262 and 263.

AND-gate 262 receives two input signals, one from the 1-output lead of the T*a* flip-flop and the other from the output lead of the T-counter 256 that represents the $T=2$ state. The output signal of AND-gate 262 is designated as T*a*2, and may be represented in terms of the input signals thereof as:

(4) $$Ta2=Ta(T=2)$$

The T*a*2 signal is delivered on an output lead 264 to various points in the system. Additionally, the T*a*2 signal is applied to an AND-gate 265.

AND-gate 265 receives a pair of input signals, one the T*a*2 signal and the other the output signal delivered by an OR-gate 266. OR-gate 266 receives input signals from both the 1-output lead of the J*r* flip-flop and the 1-output lead of the J*m*20 flip-flop, both flip-flops being illustrated in FIG. 7. As will be shown later, either the J*r* flip-flop or the J*m*20 flip-flop is in the 1-state upon the occurrence of T*a*2 during those operations wherein the Read Buffer transfers data to the Memory. Therefore, the output signal of OR-gate 266 will represent a binary 1 when the T*a*2 signal issues. Accordingly, upon the occurrence of the T*a*2 signal, the output signal of AND-gate 265 will represent a binary 1 and, since the output lead of AND-gate 265 is coupled to the 1-logic input lead of the T*a*3 flip-flop, the T*a*3 flip-flop will be set to the 1-state thereof.

The 1-output lead of the T*a*3 flip-flop is coupled to the 0-logic input lead thereof, so that the T*a*3 flip-flop immediately resets itself on the next clock pulse following that which caused it to be set. The input signals for setting and resetting the T*a*3 flip-flop may be represented as:

(5) $$*Ta3=Ta2\ (Jr+Jm20)$$ $$*\overline{Ta3}=Ta3$$

The 1-output signal of the T*a*3 flip-flop is transmitted on an output lead 267 to various points in the system.

Following the resetting of the flip-flop T*a*3 at the end of the third clock period of the sequencer cycle, the T-counter continues counting through its fourth through seventh states, while the T*a* flip-flop remains in the 1-state thereof to denote the T*a* portion of the sequencer cycle. When $T=7$, AND-gate 263, which has been enabled by the application thereto of the 1-output signal of the T*a* flip-flop, delivers an output signal representing a binary 1. The output lead of AND-gate 263 is coupled to the 1-logic input lead of flip-flop T*a*8 and, therefore, sets the T*a*8 flip-flop to the 1-state on the clock pulse following $T=7$. Therefore, T*a*8 enters the 1-state when the T-counter enters its $T=8$ state.

The T*a*8 flip-flop in its 1-state denotes the last clock period of the T*a* portion of the sequencer cycle. The 1-output lead of the T*a*8 flip-flop is coupled to the 0-logic input lead thereof, so that the T*a*8 flip-flop immediately resets itself on the next clock pulse following that which caused it to be set. The logic input signals which set and reset the T*a*8 flip-flop may be represented as:

(6) $$*Ta8=Ta(T=7)$$ $$*\overline{Ta8}=Ta8$$

The 1-output signal of the T*a*8 flip-flop is applied, as aforementioned, to an input lead of AND-gate 257, to enable the generation of the E*nd* signal by OR-gate 258 when certain operations are being executed, such as an operation when data is being transferred from the Read Buffer to Memory. The 1-output signal of the T*a*8 flip-flop is also delivered on an output lead 268 to various points in the system.

The receipt of sequencer output signals by other elements of the system is denoted in the various drawings by notations representing the particular signals, such as the notations T1, T*a*, T*a*2, T*a*3, T*a*8. Each of these notations indicates that the lead opposite to which it is placed is coupled to the respective one of output leads 259, 261, 264, 267, and 268 of the sequencer of FIG. 8. Distribution of the output signals of the T-counter 256 is indicated by similar notations.

For certain operations, not necessary to the description of the instant invention, the signal E*nd* is not provided following the eighth clock period of the sequencer cycle; that is, the clock period when the T*a*8 flip-flop is in the 1-state thereof. In such instances, the signal E*nd* does not issue. The failure of the signal E*nd* to issue is communicated to succeeding sequencer stages (not shown in the instant application, but shown in U.S. Patent 3,077,984) by delivery of an output signal designated as $\overline{\text{IE}nd}$ from inverter 270. When the input signal applied to inverter 270 represents a binary 0, signifying that the signal E*nd* is not issuing, the inverter delivers an output signal representing a binary 1. When the signal $\overline{\text{IE}nd}$ thus represents a binary 1, succeeding sequencer stages are enabled and the sequencer proceeds through additional states to control other operations not described in the instant application. In the instant application, all operations described are executed with the sequencer operating in only the T*a* portion of its cycle.

*Clock circuit*

Figure 9:
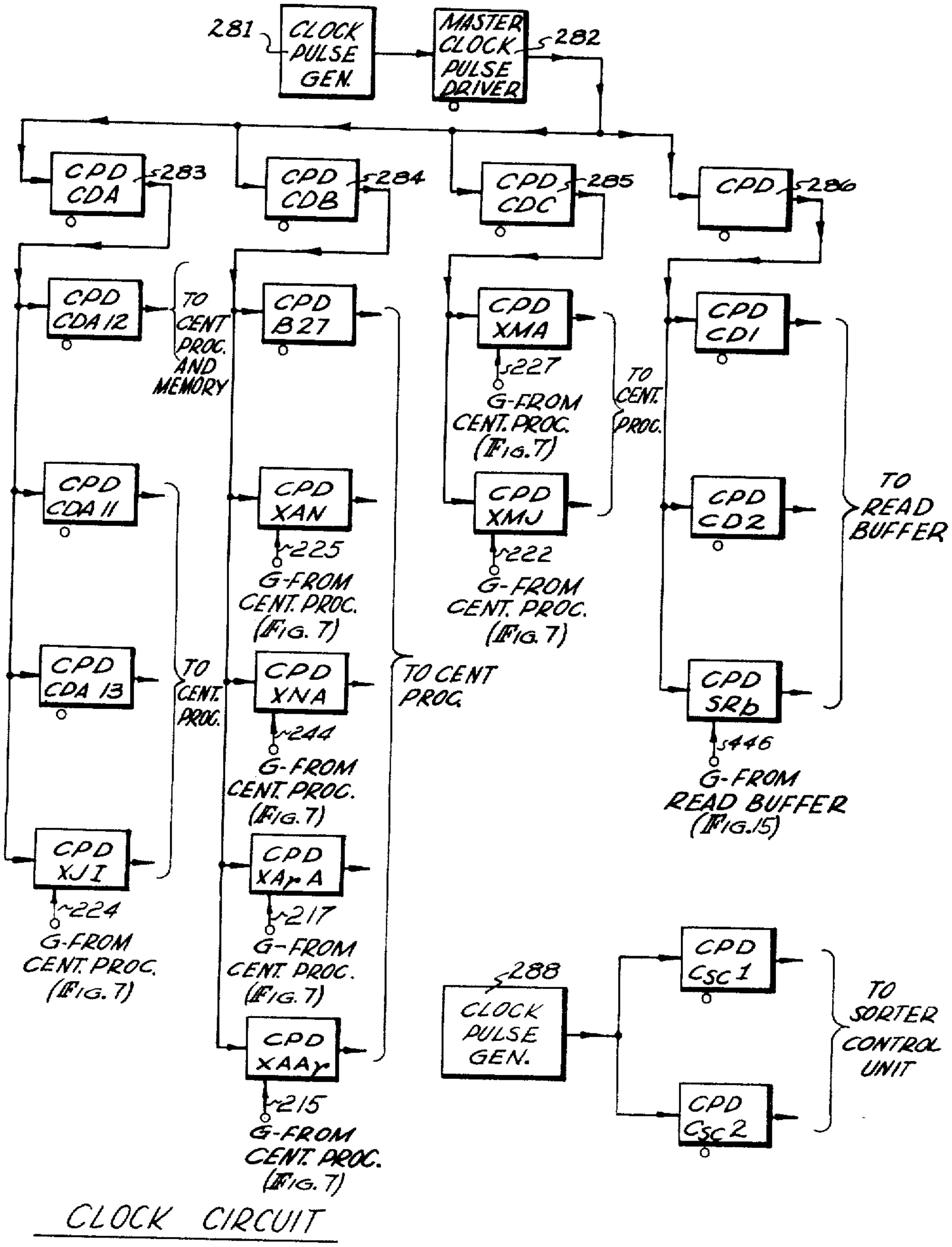
FIGURE 9 is a block diagram of the system clock circuit.

The clock circuit of the system, shown in FIG. 9, provides clock pulse signals for application to flip-flops and register transfers to control respectively the entry of data into flip-flops and the transfer of data between flip-flops. The clock circuit also provides clock pulses to control the triggering of one-shots. The clock pulse drivers of the clock circuit may be gated to provide single clock pulses or bursts of clock pulses at the 250 kc. rate, or may be operated continuously. A detailed description of the clock pulse driver has been provided previously. When gated on, the clock pulse driver generates a clock pulse for each trigger signal received, but when gated off, no clock pulses are generated.

The Central Processor clock circuit provides clock pulses for the Central Processor and Memory and comprises a clock pulse generator 281. Clock pulse generator 281 supplies trigger signals at a 250 kc. repetition rate for the clock pulse drivers. Continuous clock pulse driver 282 responds to the output signals of clock pulse generator 281 to provide continuous clock pulses at the 250 kc. rate. The output signals of clock pulse driver 282 are applied as trigger signals to Central Processor clock pulse drivers designated as the CDA clock pulse driver 283, the CDB clock pulse driver 284, and the CDC clock pulse driver 285, and to the Read Buffer clock pulse driver 286. Clock pulse drivers 283–286 operate continuously and deliver clock pulses at the 250 kc. rate. Clock pulse drivers of the Central Processor, the Read Buffer, and the Sorter Control Unit are all illustrated in FIG. 9 for convenience.

The clock pulses delivered by the CDA clock pulse driver 283 are applied to the input leads of the CDA11, CDA12, CDA13, and XJI clock pulse drivers. The CDA11, CDA12 and CDA13 clock pulse drivers are operated as continuous clock pulse drivers in this embodiment. The output clock pulses delivered by the CDA11, CDA12, and CDA13 clock pulse drivers are applied to the clock pulse input leads of Central Processor flip-flops. Additionally, the CDA12 clock pulse driver supplies clock pulses for Memory flip-flops. For example, the output clock pulses of the CDA11 clock pulse driver are applied to the clock pulse input leads of the C*lc*1 and C*lc*2 flip-flops.

The XJI clock pulse driver supplies clock pulses to the clock pulse input leads of Central Processor register transfers. Thus, the XJI clock pulse driver supplies clock pulses to the register transfers which connect the output leads of the J6–J1 flip-flops to the corresponding register transfer input leads of the I-register flip-flops (FIG. 4). When the XJI clock pulse driver is gated on by an input signal generated in the apparatus of FIG. 7, as follows, $$G\text{-}XJI=\overline{Jr}\;\overline{Jm20}\;Ta2 \qquad (7)$$

the contents of the J6–J1 flip-flops are transmitted to the corresponding I-register flip-flops.

The clock pulses delivered by the CDB clock pulse driver 284 are applied to the input leads of the B27, XAN, XNA, XA*r*A, and XAA*r* clock pulse drivers. All clock pulse drivers driven by the CDB clock pulse driver are gated clock pulse drivers, with the exception of the continuous clock pulse driver B27. The output clock pulses of the B27 clock pulse driver are applied to the clock pulse input leads of Central Processor flip-flops. The output clock pulses of the XAN, XNA, XA*r*A, and XAA*r* clock pulse drivers are applied to the clock pulse input leads of Central Processor register transfers.

The clock pulses delivered by the CDC clock pulse driver 285 are applied to the input leads of the XMA and XMJ clock pulse drivers. Both of these clock pulse drivers are gated clock pulse drivers, and supply clock pulses for Central Processor register transfers.

The clock pulses delivered by the Read Buffer clock pulse driver 286 are applied to the input leads of the CD1, CD2, and SR*b* clock pulse drivers. The CD1 and CD2 clock pulse drivers are operated continuously and the SR*b* clock pulse driver is operated gated. The output clock pulses of the CD1 and CD2 clock pulse drivers are applied to the clock pulse input leads of Read Buffer flip-flops. The output clock pulses of the SR*b* clock pulse driver are applied to the clock pulse input leads of register transfers in the R*b*-register of the Read Buffer and also to the clock pulse input leads of certain flip-flops of the R*b*-register.

The Sorter Control Unit clock circuit comprises a clock pulse generator 288 and the C*sc*1 and C*sc*2 clock pulse drivers. Clock pulse generator 288 supplies trigger signals at a 250 kc. repetition rate for the C*sc*1 and C*sc*2 clock pulse drivers. The C*sc*1 and C*sc*2 clock pulse drivers are operated continuously. The output clock pulses of the C*sc*1 and C*sc*2 clock pulse drivers are applied to the clock pulse input leads of Sorter Control Unit flip-flops and one-shots.

Opposite each clock pulse input lead of the flip-flops, one-shots, and register transfers of the system, the particular clock pulse driver connected thereto is denoted.

*Control console*

The Control Console provides an indicating and control station for the operator whereby he has access to the system for modification of the sequence of execution of the instructions or for data revision. A description of the Control Console is not necessary herein inasmuch as the instant invention relates to the automatic processing of data without the necessity of manual interruption or changes. A description of a control console which may be employed with the system described herein is provided in U.S. Patent 3,077,984.

*Memory*

The Memory is a data storage unit for storing operand words which are to be processed, data words which have resulted from processing, and instruction words to direct data processing.

The Memory comprises a storage element, a buffer register for transferring words into and out of the storage element of the Memory, appropriate addressing circuits for locating words in the storage element, control circuits, etc. FIGURE 10 illustrates symbolically the elements of the Memory, the paths of data transfer between these elements, and the paths of control signals. Details of the structure of the Memory are provided in the aforementioned U.S. Patent 3,077,984.

The storage element of the Memory of FIG. 10 is of the coincident-current magnetic core type, which is well known in the art. The structure and operation of such a memory element is described, for example, in the publication by C. V. L. Smith, "Electronic Digital Computers," chapter 12, McGraw-Hill Book Co., Inc., New York, 1959. Core memory 301 is the storage element of the Memory of FIG. 10. The Core Memory is adapted to store 4,000 data words of 28 bits each, each bit being stored in a corresponding magnetic core. The Core Memory comprises 28 planes, each plane having 4,000 magnetic cores. Each magnetic core is adapted to store one bit of information. These magnetic cores are characterized by substantially rectangular hysteresis loops and are composed of materials such as silicon steels and certain ferrites (see section 4–14 in the C. V. L. Smith reference). Such magnetic cores are characterized by very low coercive forces and high remanent magnetism. Each plane stores the corresponding bit for the 4,000 words. A core plane comprises a matrix of magnetic cores arranged in 50 rows and 80 columns. The location of a magnetic core in a matrix row and column is the address of the core and is identified by a number. Corresponding cores in all 28 planes are identified by the same number and store the 28 bits of a data word. Therefore, Core Memory 301 contains 4,000 addressable storage locations (0000–3999) for storing 4,000 data words.

The M-register of M-register and Input Logic Circuit 302 temporarily stores the data word that is to be stored in the Core Memory, or temporarily stores the data word that is read from the Core Memory. Twenty-eight inhibit drivers 303, directed by the respective contents of the M-register flip-flops, control the storage of the 28 bits of a word in the addressed memory location. Twenty-eight gated read amplifiers 304, when enabled by a strobe signal, read out the 28 bits from the addressed memory location and store the data word in the M-register. Input gates of M-register and Input Logic Circuit 302 direct the storage in the M-register of the data word read from the Core Memory or of an input data word from the R*b*-register of the Read Buffer. The contents of the M-register may also be transferred to the Central Processor.

A 2 adder 306 adds the number 2 to the contents of the two least significant digits of the word in the M-register as it is transferred to the Core Memory, if the signal A*tm* is delivered by the Central Processor. A mod-bit adder 307 corrects the mod-bits of the word transferred from the M-register to the Core Memory when the A*tm* signal is present.

An address register 308 stores the address of the Core Memory location wherein data is to be stored or from which data is to be read. Address register 308 receives a new address from the A-register of the Central Processor upon application of the M*ca* signal of the Central Processor to the input gates 309. The contents of the address register 308 control the row and column of the Core Memory into which a data word is to be stored from the inhibit drivers 303 or from which a word is to be read by the gated read amplifiers 304.

Control circuit 310 directs the timing sequence of the Memory for reading data from and for storing data in the Core Memory.

A data word is stored at the memory address designated by address register 308 by transferring all 28 cores at that address to the selected 1-stage of saturation except those which are prevented by a signal from a corresponding one of inhibit drivers 303. Each of the 28 inhibit drivers controls all cores of a corresponding memory plane. Therefore, all cores in each memory plane that is to have a 0-bit stored in the addressed location are prevented from transferring to the 1-state by the corresponding inhibit driver. Thus, when a word is stored in Memory, all addressed cores are transferred to the 1-state except those which are prevented therefrom by the corresponding inhibit drivers.

A single read out winding connected to a respective gated read amplifier threads serially all the cores of a given memory plane. Each of the 28 read out windings senses the bit stored at the addressed location of the corresponding memory plane. During read out of data from the selected memory address, all cores at the selected address, which were in the 1-state, are transferred to the selected 0-state of satuation. The resulting changes in magnetic field saturation are sensed by the corresponding read out windings. The 1's sensed by the read out windings are amplified by the corresponding gated read amplifiers and are transferred to the corresponding flip-flops of the M-register.

Thus, the Core Memory is adapted to store a data word in each of 4,000 addressable word locations. A data word is stored in an addressed word location by transferring the 28 cores at that location to the 1-state, except those cores which are to store 0-bits. A data word is read out of an addressed memory location by transferring those cores at that location to the 0-state, which were not already in the 0-state, and by sensing each core which had its magnetic field so transferred.

The word to be stored in the addressed memory location is held temporarily in the 28 flip-flops of the M-register. One such flip-flop and input logic elements associated therewith is shown in FIG. 10*a*. The 1-output lead of each flip-flop of the M-register is connected either directly, or through a logical circuit, to a corresponding inhibit driver. The 1-output terminals of the M1 and M2 digit groups of flip-flops are connected through logic circuits (designated as the 2 adder 306) to the corresponding inhibit drivers, wherein if the A*tm* signal is in its 1-state, the quantity 2 is added to the two least significant digits of a word transferred from the M-register to the Core Memory. If the A*tm* signal is in its 0-state, the contents of the M2 and M1 flip-flops are transferred directly to the corresponding inhibit drivers, and thus to the Core Memory. The logic circuits (mod-bit adder 307) connect the 1-output terminals of the M*m*2 and M*m*1 flip-flops to the corresponding inhibit drivers and alter the mod-bits if the A*tm* signal is in the 1-state as the word in the M-register is transferred to the Core Memory. The number in the M-register, which would be transferred to the Core Memory without alteration if the signal A*tm* did not occur, has the mod-bit configuration required to make the modulo-3 of the entire 28 bits of the word equal to +1. If the A*tm* signal occurs, the modulo-3 of the two least significant digits of the word in the M-register is increased by 2, and, therefore, the mod-bits of the word transferred to the Core Memory are decreased by 2 by mod-bit adder 307. If the A*tm* signal does not occur, the contents of the M*m*2 and M*m*1 flip-flops are transferred directly to the corresponding inhibit drivers.

The inhibit drivers are connected to receive the gate-inhibit signal provided by the control circuit 310. This is a signal, representing a binary 0, which is delivered when the word in the M-register is to be transferred to the Core Memory. Only when the gate-inhibit signal and the logic input signal both represent binary 0's does the inhibit driver provide an output signal. Thus, the inhibit driver functions to inhibit the change of state of the corresponding core if the corresponding bit to be written is a 0. If a core is to store a 1, no output signal is delivered by its corresponding inhibit driver.

The M-register provides temporary storage for the new data words to be stored in the Core Memory, for the data words to be restored in Memory after they have been read therefrom, and for the data words which have been read out from the Core Memory and are to be transferred to the Central Processor. One of the twenty-eight similar M-register flip-flops is illustrated in detail in FIG. 10*a*. The M-register flip-flops receive as the logic input signals thereof, the corresponding output signals delivered by the M-register input OR-gates 312 and 313. OR-gate 312 receives signals from the corresponding gated read amplifier and from AND-gate 314. OR-gate 313 receives the M*ca* signal from the Central Processor and the output signal of AND-gate 315. The signals which set and reset the M-register flip-flops may be represented as:

$$(8) \qquad {}^*M(ij) = Jr\,Mwt\,Rb(ij) + \text{Read Amp}(ij)$$

$$ {}^*M(ji) = Jr\,Mwt\,\overline{Rb(ij)} + Mca$$

In FIG. 10*a*, for example, the symbols (*ij*) represent 31. Thus, the contents of the R*b*-register will be gated by the M-register input logic circuit into the M-register in the presence of the signal combination (*Jr* M*wt*). Such a signal combination occurs during a Read Buffer operation and transfers the entire contents of the R*b*-register to Memory.

The M-register is cleared by the signal M*ca* at the start of each memory cycle. After clearing, the contents of the addressed memory location are read out by the gated read amplifiers and are stored in the M-register. As shown by the above Equations 8, each core at the addressed storage location that delivers a binary 1 during readout functions to set the corresponding M-register flip-flop. Prior to the portion of the memory cycle during which the contents of the M-register are inserted in the addressed Core Memory location, either the data word which was previously read from this addressed memory location is in the M-register, or a new data word has been inserted in the M-register from the R*b*-register.

Figure 11:
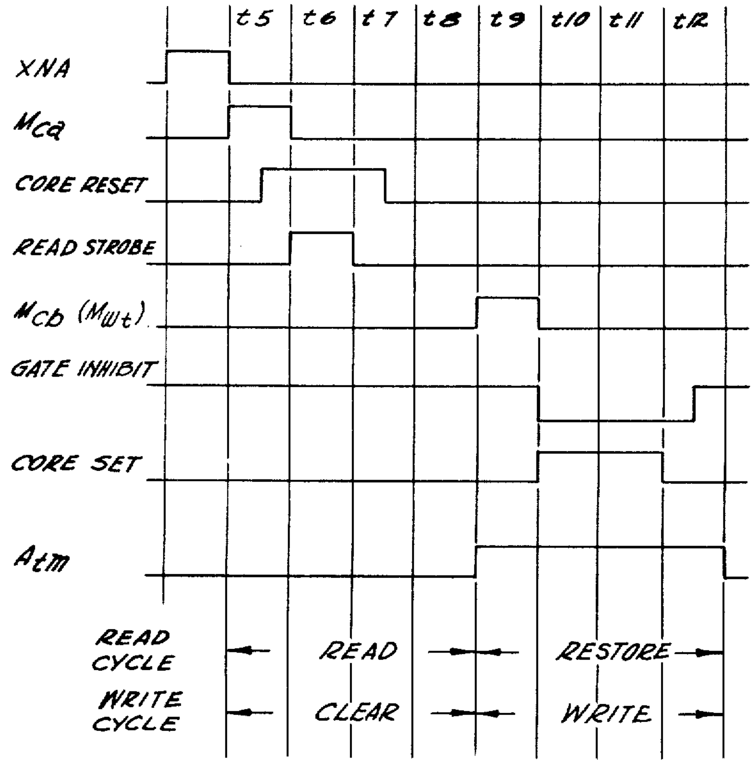
FIGURE 11 illustrates waveforms useful in explaining the operation of the Memory.

The waveforms of FIG. 11 illustrate the timing sequence of the Memory of FIG. 10. The Memory operates in one of two cycles, illustrated in the lower portion of FIG. 11. During the eight-clock periods of the read cycle, a data word is read out from the addressed Core Memory location, transferred into the M-register, and restored to the same addressed Core Memory location. The restoration of the word read out from the Core Memory is necessary, inasmuch as the read out process is a destructive one, all magnetic cores in the addressed location being returned to the 0-state. The write cycle commences with the read out of the data word from the addressed Core Memory location, an operation which clears the addressed memory location so that a new word can be written therein. The new word to be written in the addressed location is then transferred into the M-register and subsequently stored in the addressed memory location.

A memory cycle is initiated by the issuance of the M*ca* signal from the Central Processor (FIG. 5). The M*ca* signal clears the M-register and gates the address in the A-register of the Central Processor into the address register 308 of the Memory, thereby designating the Core Memory location which the succeeding memory cycle is to address. FIGURE 11 illustrates a typical timing sequence wherein the signal M*ca* occurs. The signal M*ca* occurs when the T-Counter of the sequencer (FIG. 8) is in the ($T=5$) state, and thus may follow the issuance of the shift signal XNA, which transfers the address of the next-instruction to the A-register to initiate execution of a new instruction. The signal M*ca* initiates the first half of the memory cycle. The first half of the memory cycle is designated "Memory cycle-A." The "core reset" signal is generated by control circuit 310, approximately two microseconds, or one-half clock period, after the M*ca* signal enters the Memory, and causes all twenty-eight magnetic cores at the addressed memory location, which are not in the 0-state, to be restored to their 0-state. During the second clock period of the memory cycle, the read strobe signal is generated by control circuit 310 and enables the twenty-eight gated read amplifiers 304 to sense the output signals of the memory planes wherein the cores at the addressed memory location are returned from the 1-state to the 0-state. The output signals of the read amplifiers 304 which sense a binary 1 thereupon set the corresponding M-register flip-flops to the 1-state, so that at the end of Memory cycle-A (the fourth clock period of the memory cycle) the word in the addressed memory location is in the M-register, and the addressed memory location has been cleared.

The signal M*cb* from the Central Processor (FIG. 5) then issues in the fifth clock period of the memory cycle to initiate Memory cycle-B, the designation for the second half of the memory cycle. During Memory cycle-B the word read out from the Core Memory may be restored to the addressed memory location, or a new word from the R*b*-register may be inserted into the addressed memory location. If a read cycle is occurring, the word read out from the Core Memory remains in the M-register during the last half of the memory cycle. The gate-inhibit signal is then generated by the control circuit 310 in the sixth clock period of the memory cycle to apply an inhibiting signal to the memory planes in which the bit to be stored is a binary 0. At the same time, the "core set" signal is also generated by control circuit 310 and causes all non-inhibited cores in the addressed memory location to be set to the 1-state. The read cycle is thereupon complete, and the word read out is once again in the addressed memory location. On the other hand, if a write cycle is occurring, the Memory write signal, M*wt*, from the Central Processor (FIG. 7) issues during the fifth clock period of the memory cycle, to transfer the contents of the R*b*-register to the M-register. The gate-inhibit and core set signals then issue to store the new word in the addressed memory location.

If the quantity two is to be added to the two least significant digits of the word in the M-register, the signal A*tm* from the Central Processor (FIG. 7) issues during Memory cycle-B, thereby enabling the two adder 306 and the mod-bit adder 307, so that as the word in the M-register is transferred to the Core Memory, the two least significant digits thereof are incremented by two and the mod-bits are corrected.

There has thus been described a Memory providing random access to 4,000 word locations therein. This Memory is synchronized with the Central Processor, completing a cycle in eight clock periods. During the memory cycle the word in the memory location addressed by the Central Processor is read out to the M-register, the addressed memory location is cleared, the contents of the M-register may be transferred to the Central Processor, a new word may be inserted in the M-register, and the contents of the M-register are stored in the addressed memory location.

DATA TRANSFER APPARATUS

Figure 12:
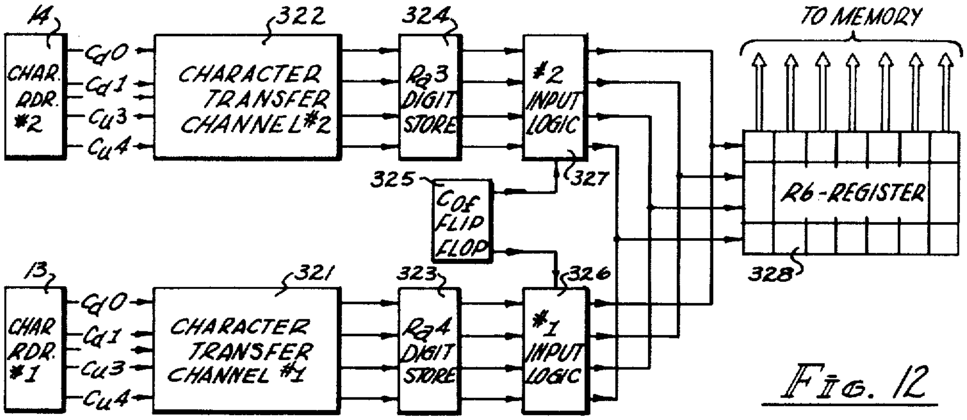
FIGURE 12 illustrates symbolically the apparatus employed for transferring data from two Character Readers to the R*b*-register of the Read Buffer.

A symbolic representation of the components employed for transferring data from the two Character Readers through the Read Buffer to the Memory is shown in FIG. 12. Each of Character Readers 13 and 14 scans a respective document and delivers data signals representing the characters on the document. The Character Readers normally operate asynchronously so that the data signals from the two Readers may arrive either temporally interlaced or concurrently.

The data signals representing the characters read by a Character Reader are delivered on respective ones of the output leads provided thereby, these leads being designated *Cd0*, *Cd1*, *Cd2* . . . *Cd9*, *Cu1*, *Cu2* . . . *Cu4*. The significance of this designation for the output leads of the Character Reader will be explained later. The output of each of Character Readers 13 and 14 are coupled to a respective one of character transfer channels 321 and 322, designated respectively as character transfer channel #1 and character transfer channel #2. Character transfer channel #1 comprises a portion of Sorter Control Unit 17 (FIG. 1) and associated gating elements. Similarly, character transfer channel #2 comprises a portion of Sorter Control Unit 18 and associated gating elements. The character transfer channel converts the single output signal received from the respective Character Reader to a corresponding four-bit digit code for employment in the Data Processing System.

The four bits representing a character are transferred from character transfer channel #1 to the R*a*4 digit store 323 of the Read Buffer. Similarly, the four-bit character provided by character transfer #2 is transmitted to the R*a*3 digit store 324. Both digit stores 323 and 324 comprise four flip-flops for storing respectively the four bits of the data character received thereby. Each of digit stores 323 and 324 retain the character received thereby until the next character is read by the corresponding Character Reader.

The free-running C*of* multivibrator or flip-flop, 325, controls the subsequent transmission of the contents of digit stores 323 and 324. The 1-output signal of the C*of* flip-flop is applied to and gates the normally enabled #1 input logic 326. The 0-output signal of the C*of* flip-flop is applied to and gates the normally enabled #2 input logic 327. When either one of input logic 326 or 327 is gated by the C*of* flip-flop, it functions to transfer the contents of the corresponding digit store to the R*b*-register 328, provided the gated input logic is enabled. When a digit is so transferred from a digit store to the R*b*-register through one of input logic 326 or 327, the other input logic is disabled for a predetermined period to permit transfer of the new contents of the R*b*-register to Memory.

The C*of* free-running multivibrator changes state at the 250 kc. clock cycle rate, or once each clock period. Assume, for example, that a character is read simultaneously by both Character Readers #1 and #2 and, therefore, the corresponding four-bit digit enters digit stores 323 and 324 simultaneously. If the C*of* flip-flop is then in the 1-state, the contents of digit store 323 will be immediately transferred through the gated #1 input logic to the R*b*-register, and simultaneously the #2 input logic will be disabled until the digit from Character Reader #1 has been subsequently transferred from the R*b*-register to Memory. Following the transfer of such R*b*-register contents to Memory, the disabled input logic is once again enabled, so that in the particular example the contents of digit store 324 may then be transferred through the #2 input logic to the R*b*-register when the C*of* flip-flop next enters the 0-state. Thus, the free-running C*of* multivibrator, having a respective state thereof allocated to each of Character Readers #1 and #2, provides an interlocking and selective feature whereby the character signals generated from the respective Character Readers will be transferred to the R*b*-register in succession, even though such signals arrive simultaneously.

*Read buffer*

The Read Buffer temporarily stores data being transferred from the Character Reader to the Memory. A succeeding section provides details of the operation of the Read Buffer in effecting the storing in consecutive Memory locations of one line of data read from a document by each one of the Character Readers. This operation is initiated by an appropriate program instruction (65) executed in the Central Processor, but continued and carried to completion under control of the Read Buffer.

Figure 13:
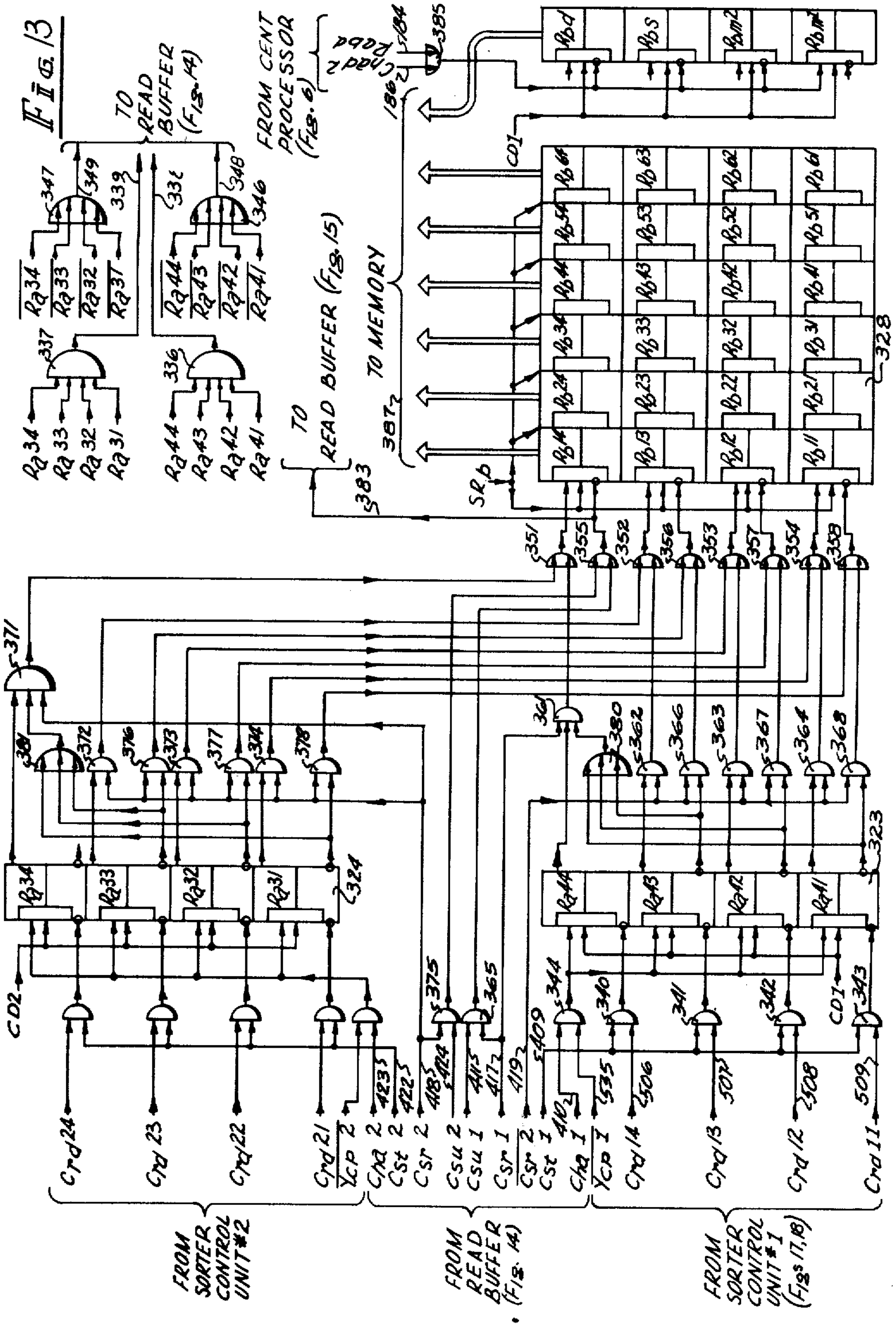
FIGURE 13 is a block diagram of the data transmission channel of the Read Buffer.
Figure 14:
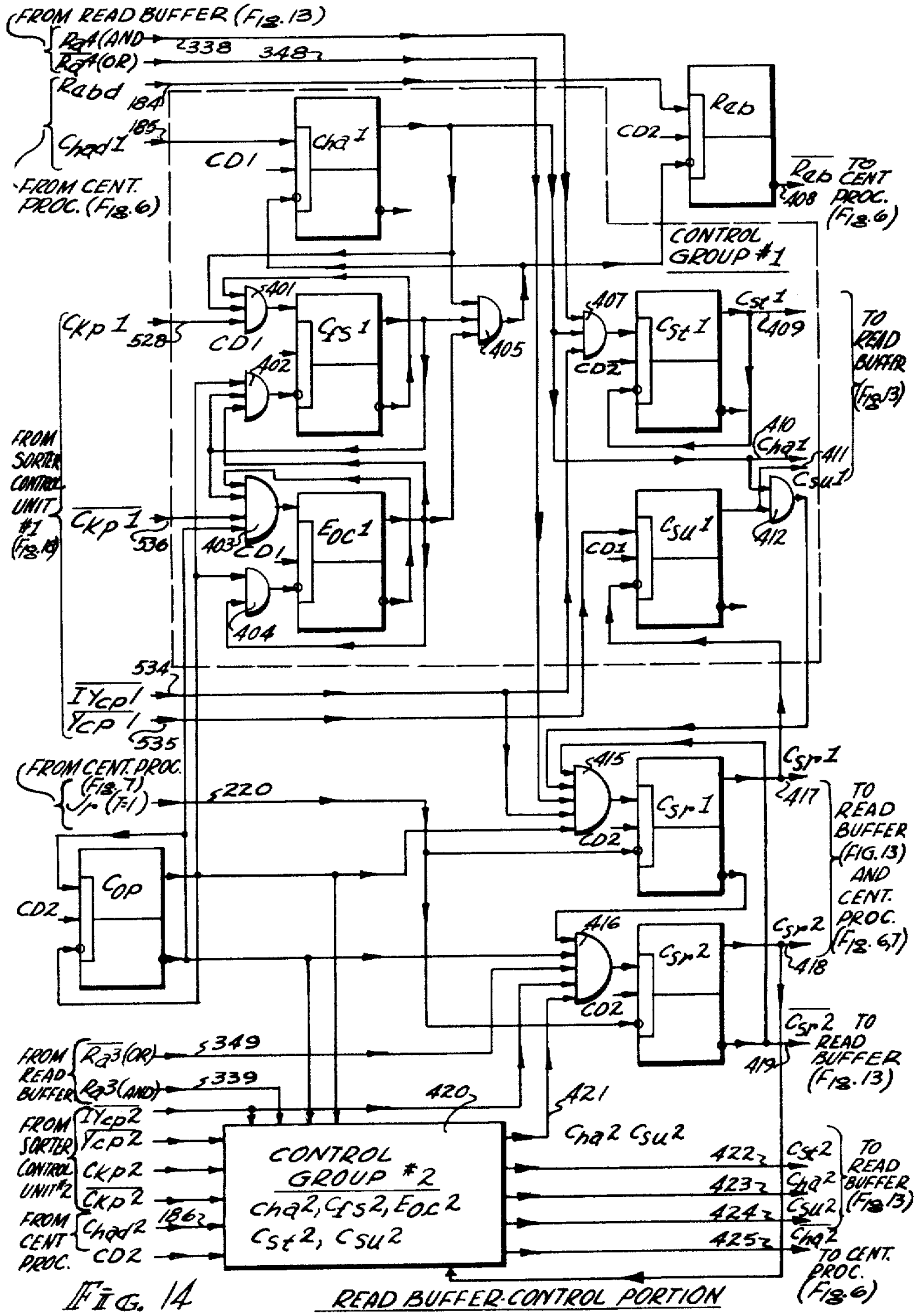
FIGURE 14 is a block diagram of the control portion of the Read Buffer.
Figure 15:
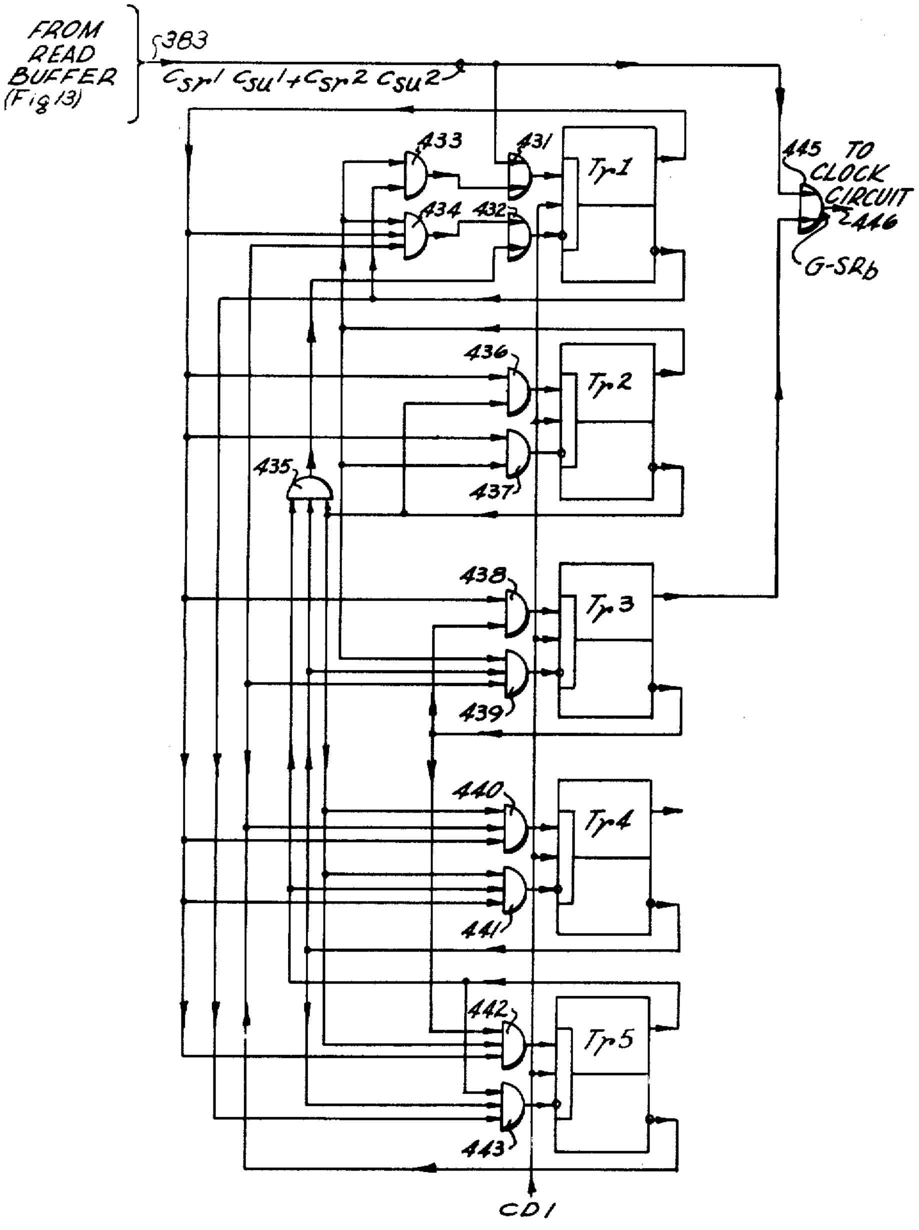
FIGURE 15 is a block diagram of the shift timer of the Read Buffer.

The Read Buffer comprises a register for temporarily storing the data being transferred through the Read Buffer, register transfer and logic circuits for transferring data through and between registers, a counter, and flip-flops employed as control signal sources. FIGURES 13–15 illustrate details of the Read Buffer. FIGURE 13 illustrates the elements of the Read Buffer which store data, the paths of data transfer between these elements, and certain logical circuits. The R*a*4 digit store 323 receives each character digit initiated by Character Reader #1 and encoded and transmitted by Sorter Control Unit #1. The R*a*3 digit store 324 receives each character digit initiated by Character Reader #2 and encoded and transmitted by Sorter Control Unit #2. Under control of appropriately interlocked gates, the contents of either digit store 323 or digit store 324 are transmitted to each of the six least significant digit positions of R*b*-register 328. Subsequently, the contents of the R*b*-register are transmitted to a particular storage location in the respective group of consecutive locations in Memory.

The R*a*4 flip-flops receive the corresponding C*rd*14–C*rd*11 output signals of Sorter Control Unit #1 (FIG. 17) upon application of the C*st*1 logic signal (FIG. 14) to logical gates which connect output leads of Sorter Control Unit #1 to corresponding input leads of the R*a*4 flip-flops. The R*a*3 flip-flops receive the corresponding C*rd*24–C*rd*21 output signals of Sorter Control Unit #2 upon application of the C*st*2 logic signal (FIG. 14) to logical gates which connect output leads of Sorter Control Unit #2 to corresponding input leads of the R*a*3 flip-flops.

The contents of the R*a*4 digit store are transmitted to the R*b*-register upon application of the $\overline{Csr2}$ signal (FIG. 14) to logical gates which connect the R*a*4 flip-flops to corresponding R*b*1 flip-flops of the R*b*-register. The contents of the R*a*3 digit store are transferred to the R*b*-register upon application of the C*sr*2 logic signal (FIG. 14) to logical gates which connect the R*a*3 flip-flops to corresponding R*b*1 flip-flops of the R*b*-register. The contents of the R*b*1–R*b*5 flip-flops are shifted to the right (FIG. 13) upon application of the S*rb* clock signal to register transfers (not shown) which connect the R*b*1–R*b*6 digit positions of the R*b*-register. The R*b*7 flip-flops automatically receive signals representing the modulo-3 of the contents of the R*b*1–R*b*6 flip-flops.

Other Read Buffer flip-flops are employed primarily to perform control functions. These flip-flops, shown in FIG. 14, comprise the C*fs*1 and C*fs*2 flip-flops, which direct the Read Buffer to read a line of data from but one document being transported by a respective one of Sorter #1 and Sorter #2; the C*ha*1 and C*ha*2 flip-flops, which aid in controlling the Read Buffer when data is being transferred thereto from a respective one of Character Reader #1 and Character Reader #2; the C*op* flip-flop, which controls the independent admission to the R*b*-register of character signals provided by the two Character Readers; the C*sr*1 and C*sr*2 flip-flops, which disable the transfer of character digits from the respective R*a*3 and R*a*4 digit stores to the R*b*-register for a predetermined duration following transfer of a character digit from the respective R*a*4 and R*a*3 digit stores to the R*b*-register; the C*st*1 and C*st*2 flip-flops, which transfer the character digits provided by Sorter Control Unit #1 and Sorter Control Unit #2 to the respective R*a*4 and R*a*3 digit stores; the C*su*1 and C*su*2 flip-flops, which aid in controlling the sequence of operations of the Read Buffer when data is being transferred from one of the R*a*4 or R*a*3 digit stores to the R*b*-register; the E*oc*1 and E*oc*2 flip-flops, which signal that the end of a line of data has been read by a respective one of Character Reader #1 or Character Reader #2; and the R*eb* flip-flop, which, when on, indicates that the Read Buffer is busy receiving data from Character Reader #1. The C*fs*1, C*ha*1, C*st*1, C*su*1, and E*oc*1 flip-flops and their related logical and other interconnecting circuits have been designated as Control Group #1. Control Group #1 responds to the C*kp*1, $\overline{Ckp1}$, $\overline{Ycp1}$, $\overline{IYcp1}$, C*op*, $\overline{Cop}$, R*a*4(AND), and $\overline{Ra4}$(OR) input signals in the manner indicated hereinafter to generate the C*ha*1, C*st*1, and C*su*1 output signals. The C*fs*2, C*ha*2, C*st*2, C*su*2, and E*oc*2 flip-flops and their related logical and other interconnecting circuits have been designated as Control Group #2. Control Group #2 is shown only symbolically in FIG. 14. Control Group #2 responds to the C*kp*2, $\overline{Ckp2}$, $\overline{Ycp2}$, $\overline{IYcp2}$, C*op*, $\overline{Cop}$, R*a*3(AND), and $\overline{Ra3}$(OR) input signals to generate the C*ha*2, C*st*2, and C*su*2 output signals in a manner analogous to that in which Control Group #1 responds to corresponding input signals to generate corresponding output signals. Therefore, Control Group #2 is structurally like Control Group #1.

The Read Buffer shift timer, or T*r*-counter, of FIG. 15 comprises the T*r*1–T*r*5 flip-flops. The T*r*-counter operates in eight discrete states and is the source for fine timing in the control of the shifting operations executed in the Read Buffer when characters are received thereby from a Character Reader.

The Read Buffer may be also employed to receive data from a magnetic tape unit. Additional logical elements and control flip-flops are provided in such instance. A Read Buffer so employed is described in the aforementioned U.S. Patent 3,077,984.

*Sorter and character reader*

A Sorter and a Character Reader in combination provide for the automatic reading of data borne by documents, such as bank checks, the delivery of this data to a Sorter Control Unit, and the sorting of these documents into Sorter pockets under control of signals received from the Sorter Control Unit. The Sorter stores a stack of documents to be read by the Character Reader and to be subsequently sorted; delivers the documents, one at a time, to apparatus for automatically reading the data thereon, this data being imprinted in magnetic ink; and then sorts these documents into Sorter pockets, as directed by signals received from the Sorter Control Unit. The Character Reader responds to the signals read by the automatic reading apparatus to deliver an encoded representation of the data on the documents to the Sorter Control Unit. A Sorter useful in the embodiment of this invention is described in United States Patent 3,108,694 issued October 29, 1963, to N. R. Crain et al., for a System for Collating Documents in Response to Indicia Appearing Thereon, which is assigned to the same assignee as the instant invention. A Character Reader and automatic reading apparatus useful in the embodiment of this invention is described in the United States Patent 2,924,812 by P. E. Merritt and C. M. Steele for an Automatic Reading System, and United States Patent 3,092,809 by P. E. Merritt and C. M. Steele, for Spurious Signal Suppression in Automatic Symbol Reader, both of which are assigned to the same assignee as the instant invention.

Figure 16:
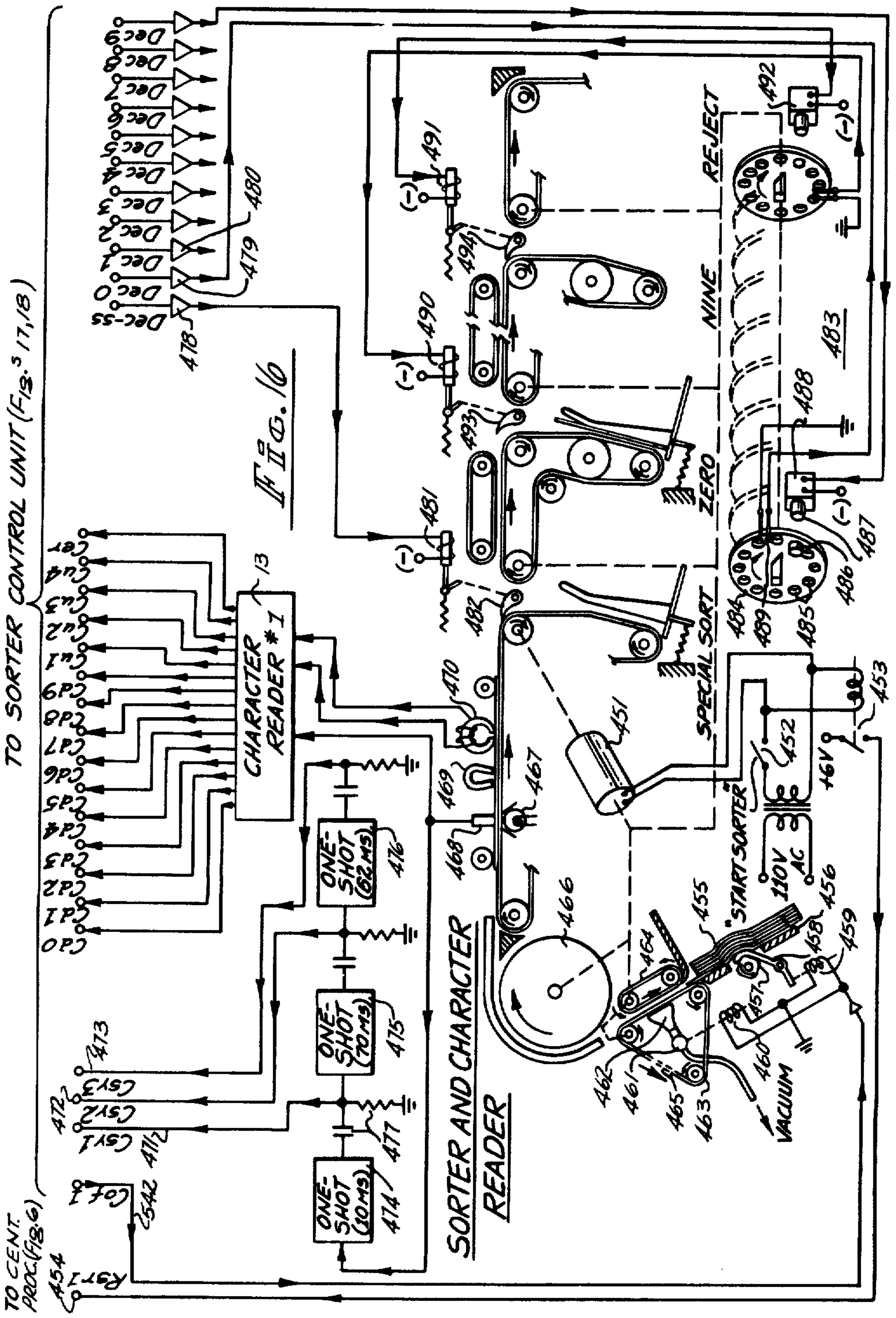
FIGURE 16 is a schematic diagram of a Sorter and Character Reader of the system.

The Sorter, which is illustrated schematically in FIG. 16, is driven by a motor 451. Motor 451 is energized upon closure of the START SORTER switch 452 and provides mechanical power by the linkages illustrated schematically for the various belt-driving pulleys, drums, and timer discs of the Sorter. When the START SORTER switch is closed, a relay 453 is energized to deliver a signal representing a binary 1, and denoted as the Rsr1 signal, to the Central Processor to indicate that Sorter power is on and that the Sorter is running. Although closure of the START SORTER switch 452 prepares the Sorter to feed documents for automatic reading and sorting, the Sorter must receive an additional signal before the documents are actually processed thereby.

A stack 455 of the documents to be read are held against a base plate 456 by a spring-loaded pressure plate, which is not shown. A continuously rotating cam 457 is provided to feed the bottom document of the stack into the transport mechanism of the Sorter, when this bottom document rests against the cam. However, in the absence of the Cof1 signal provided by the Sorter Control Unit, a lever 458 maintains the bottom document of the stack spaced from cam 457. Upon receipt of the Cof1 signal from the Sorter Control Unit (see the following description of execution of Instruction 58), solenoids 459 and 460 are energized, thereby causing lever 458 to pivot into a depression provided in cam 457, and allowing the bottom document of the stack to come into contact with cam 457. The Cof1 signal also actuates a valve 461, which provides vacuum at orifice 462. Cam 457 forces the bottom document into the region between the oppositely moving belts 463 and 464. When apertures 465 in belt 463 are opposite orifice 462, the document between belts 463 and 464 is attracted to belt 463 and moves therewith. Belt 464, which moves in a direction opposite the direction of motion of the bottom document, insures that only one document is fed by the document transport mechanism. Therefore, when the Cof1 signal is present, the document is moved by belt 463 to the periphery of a drum 466 which, in turn, transports the document to the automatic reading apparatus. The automatic reading apparatus comprises a lamp 467, a photocell 468, a magnet 469, and a transducer 470. Lamp 467 directs a beam of light on photocell 468. Photocell 468 delivers a significant output signal when the reference (leading) edge of a document interrupts the beam of light. Magnet 469 magnetizes the line of information on the document which is to be read, this line of information being imprinted on the document with magnetizable material. Transducer 470 responds to the magnetic field of the magnetized information on the document and delivers corresponding signals to Character Reader 13. The document is then transported to the right in FIG. 16 by the transport mechanism and enters a Sorter pocket in accordance with signals received from the Sorter Control Unit. The signals received from the Sorter Control Unit are delivered thereto by the Central Processor, after the Central Processor has processed the information borne on the document.

The bank check of FIG. 2 exemplifies documents bearing data imprinted in magnetizable material, from which the automatic reading apparatus of FIG. 16 extracts information. The reference edge of the document is that which first interrupts the light beam between lamp 467 and photocell 468. The reference edge of the document of FIG. 2, which is scanned from right to left, is denoted as edge 25. A portion of the check near the lower edge thereof is allotted to the printing of magnetic symbols. This portion is termed the field 26 and comprises a plurality of symbols printed in ink capable of being magnetized. Information which may appear in field 26 includes the amount of the check, represented in FIG. 2 by the eight numerals in the extreme right portion of the field; the transaction code number, represented by the single numeral immediately to the left of the amount; the account number, represented by the five numerals immediately to the left of the transaction code number; and the bank branch number, represented by the three numerals in the extreme left portion of the field.

Information is extracted from the field by first magnetizing the magnetic material thereon and then by scanning the field from the right to the left with transducer 470 of the Sorter, as the document moves to the right across the transducer. In scanning the magnetized symbols, the transducer senses the induced magnetic fields of the symbols, and generates electrical waveshapes characteristic of each different symbol. Character Reader 13 identifies these characteristic waveshapes and provides output signals indicative of the symbols scanned. Thus, whenever one of the numerals 0–9 is scanned, the corresponding one of output signals Cd0–Cd9 is delivered on one of the Character Reader output leads.

In addition to the numerals bearing the data to be read, cue characters are provided to distinguish the various portions of the document field. Thus, the cue character 27 signals the start of the data borne by the check, and also that the next eight numerals read by the Character Reader represent the amount of the check. The cue character 28 signals that the three digits immediately following constitute the bank branch number. In the documents to be read by the automatic reading apparatus of FIG. 16, four different cue characters are provided. Therefore, the Character Reader identifies the characteristic waveshape obtained by scanning one of the cue characters and delivers a corresponding one of output signals Cu1–Cu4.

In addition to providing output signals representing the ten numerals and four cue characters recognizable by the Character Reader, an error signal, Cer, is provided thereby when the transducer scans an improper character (one that the Character Reader is not designed to recognize), or a character that is so poorly printed that the Character Reader cannot recognize it.

Figure 18:
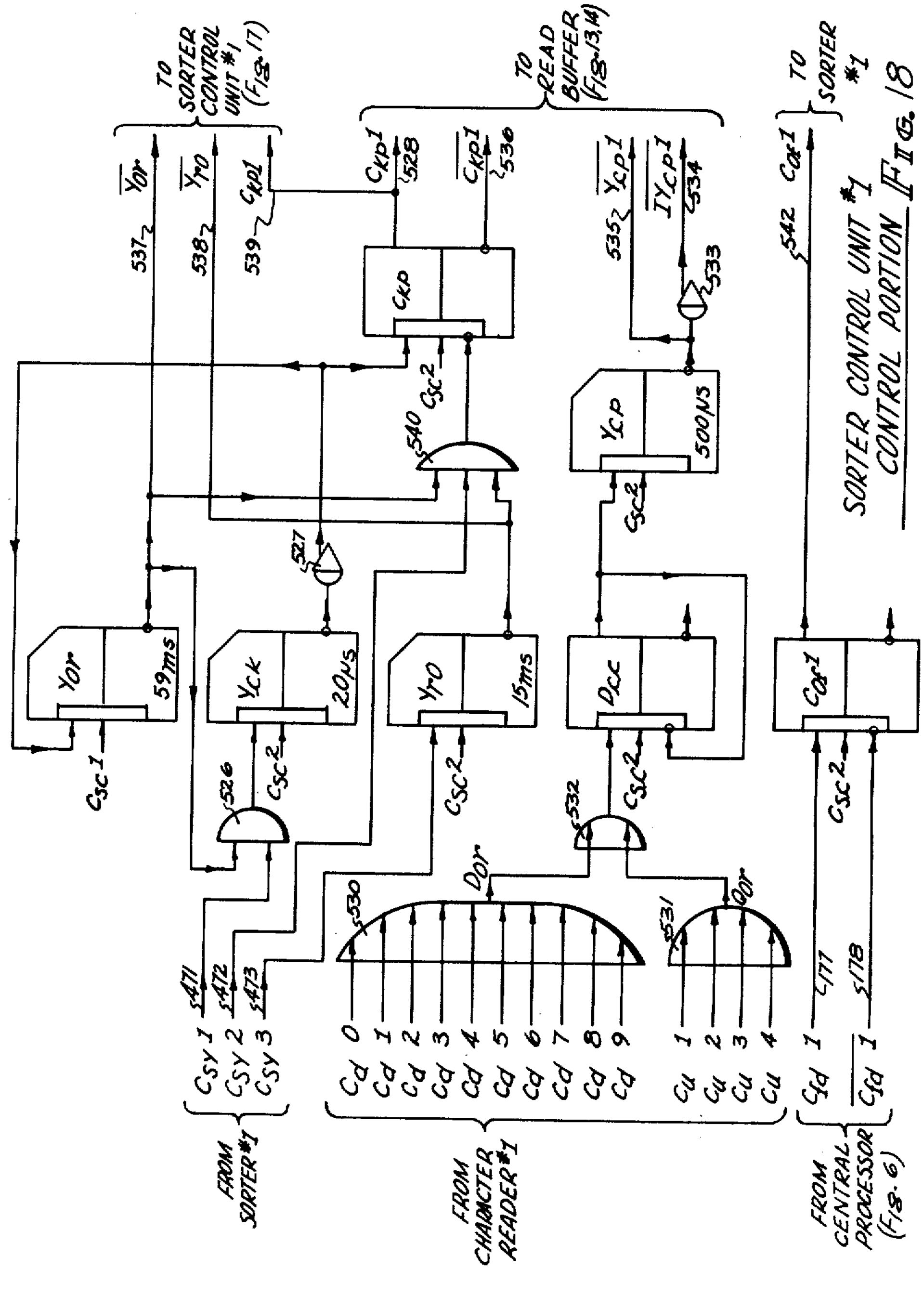
FIGURE 18 is a block diagram of the control portion of the Sorter Control Unit.
Figure 19:
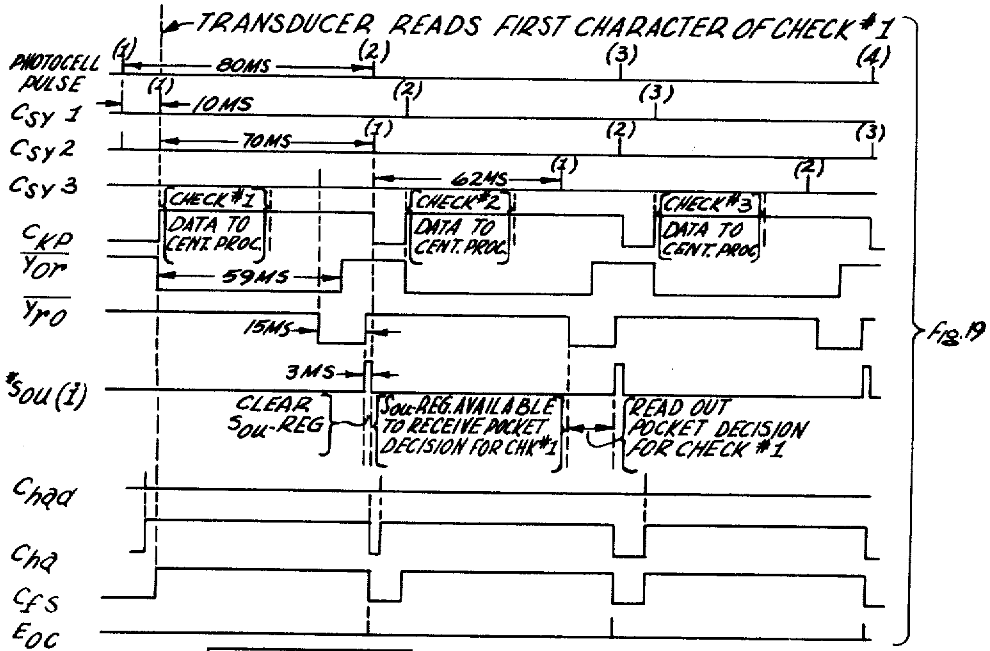
FIGURE 19 illustrates waveforms useful in explaining the operation of the Sorter and Sorter Control Unit.

As the automatic reading apparatus scans the document, the Csy1, Csy2, and Csy3 signals are delivered by the Sorter in response to detection of the reference edge 25 of the document by photocell 468. These three signals, which are shown in FIG. 19, are delivered by the tandem-connected one-shots 474, 475, and 476. These one-shots may be of any conventional type well known in the art. One-shot 474 is triggered into its unstable state by the signal delivered when the light beam from lamp 467 to photocell 468 is interrupted by the reference edge of the document. Thus, the signal delivered to one-shot 474 denotes the arrival of the document at the automatic reading apparatus. One-shot 474 remains in its unstable state for approximately 10 msec. whereupon it returns to its stable state. The 10 msec. pulse delivered by one-shot 474 is differentiated by differentiating circuit 477. The positive-going output pulse from differentiating circuit 477, which is delivered when one-shot 474 returns to its stable state, is transmitted as the Csy1 signal to the Sorter Control Unit (FIG. 18) and is also applied to trigger the one-shot 475. Similarly, one-shot 475 remains in its unstable state for 70 msec., and upon return to its stable state causes issuance of the Csy2 signal, which triggers one-shot 476. One-shot 476 remains in its unstable state for 62 msec., thereupon returning to its stable state and delivering the Csy3 signal. Therefore, the signals Csy1, Csy2, and Csy3 occur respectively 10 msec., 80 msec., and 142 msec. after the reference edge of the document arrives at photocell 468.

The output signal of photocell 468 is also applied to the Character Reader 13 to allow for activation of the circuits thereof when the document field is opposite transducer 470.

Prior to the arrival of the document at the first Sorter pocket, the Central Processor has determined in which pocket the document is to be entered and transmitted a corresponding signal to the Sorter Control Unit. (Documents are usually sorted in accordance with the numeral in a predetermined position in the field. For example, a group of checks may be sorted according to the least significant digit of the account number.) The Sorter Control Unit, in turn, transmits this pocket identification to the Sorter on one of 11 lines, which carry the corresponding signals D*ec–ss*, and D*ec*0–D*ec*9. Each of the signals D*ec–ss* and D*ec*0–D*ec*9 is amplified and inverted by a corresponding Sorter amplifier 478, 479, 480, etc. Twelve pockets are provided in the Sorter for accepting the documents. The first pocket, designated as the Special Sort pocket, receives documents which are not to be sorted according to one of the numeric characters thereon. Thus, a check in the stack which did not belong to the bank branch whose checks were then being sorted by account number, may be entered into the Special Sort pocket. The Zero-Nine pockets accept those documents having the corresponding numeral in the field digit position on which the document is being sorted. For example, if the documents are being sorted on the least significant digit of the account number, the check in FIG. 2 will enter the Nine pocket. The last (Reject) pocket is provided to receive those checks for which an error signal is delivered by the Character Reader, or for which no decision is provided by the Central Porcessor in adequate time to actuate the proper numbered pocket.

The Central Porcessor provides a pocket decision signal for a document within 62 msec. after the data has been read from the document and transferred to the Central Processor. If the document is to be entered in the Special Sort pocket, the D*ec–ss* signal is delivered to the Sorter, and amplifier 478 directly energizes solenoid 481. When solenoid 481 is energized, deflector 482 lifts and causes the document just read to enter the Special Sort pocket. Inasmuch as the Central Processor provides a pocket decision signal for all documents before they reach the first deflector; i.e., the Special Sort pocket, a means is provided to store this decision until immediately prior to the time when the document arrives at the deflector of the decision pocket. Hence, several documents may be traveling along the transport mechanism between the automatic reading apparatus and the Reject pocket. Each document will pass over closed deflectors until it reaches the deflector of the pocket wherein it is to be entered. However, if no pocket is selected for a document, no deflector is lifted, and the document enters the Reject pocket. Thus, if a document is to be sorted into pocket Nine, the corresponding deflector will not be lifted until the document is immediately ahead of the deflector. The storage of pocket decisions, and consequent delay in deflector actuation, is provided by a timer 483.

Timer 483 comprises 10 timer discs, 484, each of which corresponds to one of the Zero-Nine pockets. The timer discs are mounted on a common shaft and driven at a speed which provides one complete revolution of the timer disc during the time required for a document to travel the length of the pocket assembly. Each disc is provided with twelve apertures 485 about the periphery thereof, each aperture containing a pin 486 which normally projects outwardly on the right side of the disc. Cooperating with each disc is a corresponding plunger 487, which is driven by a respective solenoid 488. The ten solenoids 488 are connected to the output terminals of the respective amplifiers 479, 480, etc., which receive the corresponding D*ec*0–D*ec*9 input signals. Upon the occurrence of a signal at the output terminal of any one of amplifiers 479, 480, etc., the corresponding solenoid 488 is energized, thereby driving its plunger 487 to the left, which moves the pin 486 opposite thereto toward the left through its disc support, so that it projects outwardly on the left-hand side of the disc.

As the discs 484 rotate, the pins projecting outwardly on the left-hand side thereof, engage and close corresponding contacts 489. The closure of contacts 489 provides current to energize a corresponding one of solenoids 490, 491, etc., which lifts the deflector for the respective Zero-Nine pockets. For example, energizing solenoid 492 causes the deflector 493 to be lifted at the proper time to admit the check having the numeral 0 in the selected field position into the Zero pocket. Means is provided to reset each pin 486 after it passes the corresponding contacts 489.

If the numeral 9 occurs in the selected field position of one check and the numeral 0 in this field position of the immediately following check, the first check must travel the entire length of the pocket assembly before it is deposited in pocket Nine, whereas the immediately following check must be deposited in the Zero pocket. Thus, this second check must be deposited in its pocket before the first check arrives at deflector 494. Therefore, the contacts 489 adjacent the timer discs which correspond respectively to pockets 0–9, are spaced at progressively greater angles about the periphery of the discs from the corresponding plunger 487. The angular spacing between the plunger 487 and the contacts 489 about the periphery of a disc provides that a pin 486 is moved to the left by the plunger when the pocket decision for a document is generated, and closes the contacts as the document arrives at the corresponding deflector.

The Sorter and Character Reader of FIG. 16, therefore, transport documents individually from a stack, automatically read a line of information thereon, transmit signals providing this information to the Central Processor, receive signals denoting the pockets of the Sorter, and in accordance with these signals, enter the documents into corresponding pockets.

*Sorter control unit*

A Sorter Control Unit controls the reading of information on documents by the respective Sorter and Character Reader combination and transmits this information through the Read Buffer to the Central Processor. The Central Processor then determines from this information the particular Sorter pockets to which the documents are to be directed and notifies the Sorter Control Unit, which, in turn, directs the transfer of these documents into the corresponding Sorter pockets. The Sorter Control Unit receives the information digit-by-digit as it is read from a document by the respective Character Reader, encodes the digits of information into Central Processor code, and delivers the digits to the Read Buffer. Subsequently, the Sorter Control Unit receives a digit for each document from the Central Processor, the digit corresponding to the pocket into which the document is to be sorted; decodes this digit; and transmits a signal to control actuation of the corresponding Sorter pocket at the proper time that the document may be entered therein.

Figure 17:
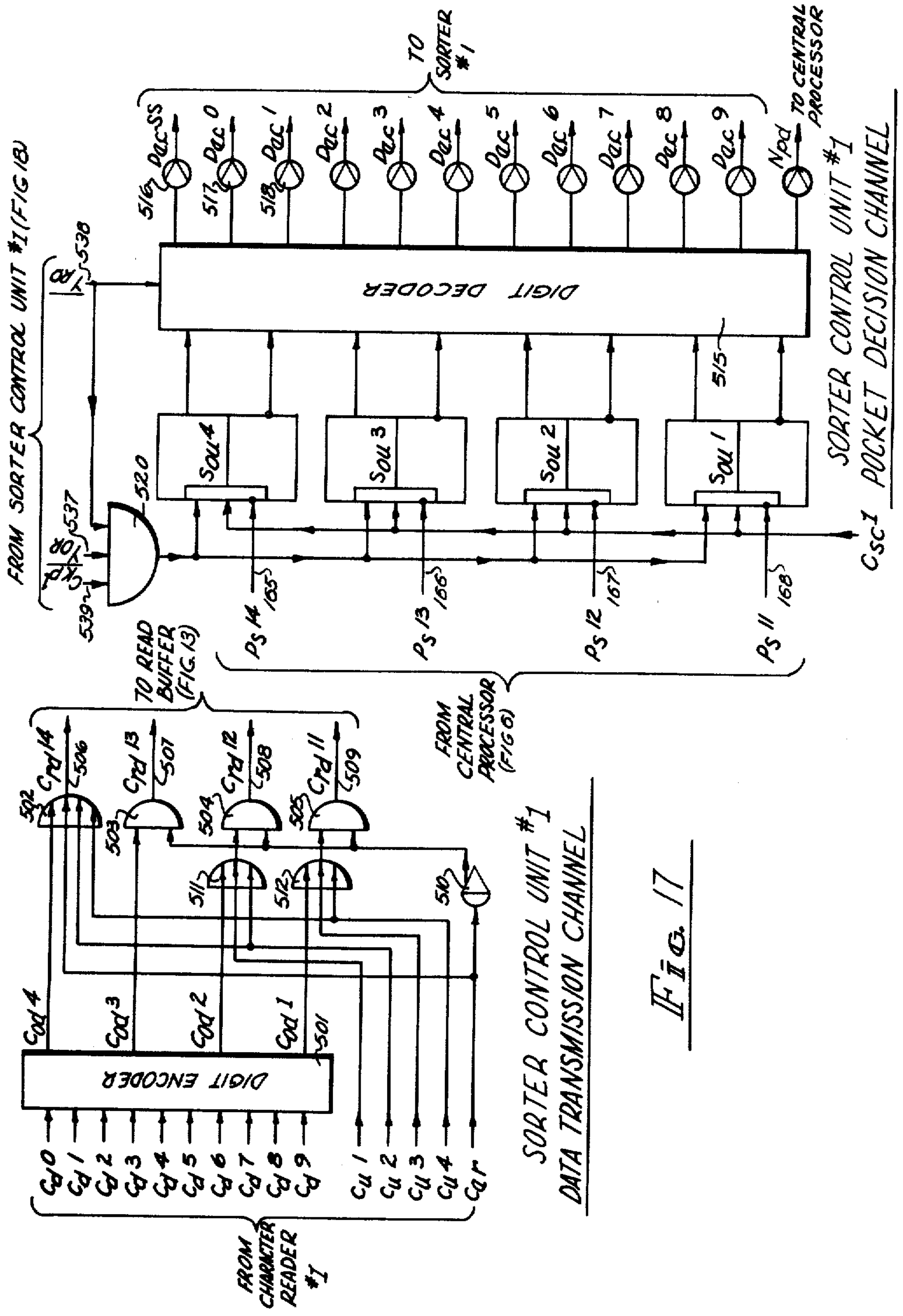
FIGURE 17 is a block diagram of the data transmission portion of the Sorter Control Unit.

FIGURE 17 illustrates symbolically the elements of the Sorter Control Unit which store data, the elements which encode and decode data, the paths of data transfer between these elements, and certain control elements. The details of the control structure of the Sorter Control Unit are provided by FIG. 18.

As each digit on a document is read by the Character Reader, the respective Sorter Control Unit receives a corresponding signal on a respective one of 14 lines, these signals being designated C*d*0–9, if a numeral has been read, and C*u*1–4, if a cue character has been read. Additionally, the Sorter Control Unite receives the C*er* signal on a separate line, if an error has been detected by the Character Reader.

Thus, each character read by the Character Reader is designated by only a single signal on a corresponding lead. These single signals, which represent digits or cue characters, must be converted into a four-bit code useful by the Central Processor. Therefore, each of the signals C*d*0–9, C*u*1–4 and C*er* is encoded into a four-bit digit which comprises a code complementary to that normally employed by the Central Processor. This complementary code is illustrated in the following table, "Sorter Control Unit Digits," wherein it may be seen that the four-bit Sorter Control Unit complementary code for each character is an inverted binary form from the corresponding digits in Central Processor code. It may be noted in Table II that the cue characters and error signals employ the Central Processor code also used in other data processing operations (Table I) to represent certain non-numeric digits. The particular type of data processing operation being performed will determine whether the five corresponding code configurations represent document cue characters on the non-numeric characters of Table I.

TABLE II.—SORTER CONTROL UNIT DIGITS

| Character | S.C.U.Complementary Code | Cent. Proc. Code |
|---|---|---|
| 0 | 1111 | 0000 |
| 1 | 1110 | 0001 |
| 2 | 1101 | 0010 |
| 3 | 1100 | 0011 |
| 4 | 1011 | 0100 |
| 5 | 0111 | 1000 |
| 8 | 0110 | 1001 |
| 7 | 0101 | 1010 |
| 8 | 0100 | 1011 |
| 9 | 0011 | 1100 |
| C*u*1 | 0010 | 1101 |
| C*u*2 | 1010 | 0101 |
| C*u*3 | 0001 | 1110 |
| C*u*4 | 1001 | 0110 |
| Error | 1000 | 0111 |
| Forbidden | 0000 | 1111 |

The four bits of the complementary code from right to left in Table II are transmitted from Sorter Control Unit to Read Buffer as the respective output signals C*rd*4, C*rd*3, C*rd*2, and C*rd*1.

Digit encoder 501 of the Sorter Control Unit provides the logical circuits for receiving any one of the numeral signals C*d*0–C*d*9 and for encoding this signal into the corresponding four-bit complementary Sorter Control Unit code, in accordance with the preceding Table II. Encoders of this type are well-known in the art, one such encoder being described in U.S. Patent 3,077,984. If a numeral has been properly read by the Character Reader, the C*er* error signal is absent, and the corresponding output signals of encoder 501 are transmitted directly through OR-gate 502 and AND-gates 503, 504, and 505 to respective output leads 506, 507, 508, and 509 as the Sorter Control Unit output signals C*rd*14, C*rd*13, C*rd*12, and C*rd*11, for Sorter Control Unit #1. The C*er* error signal is inverted by inverter 510. The output signal delivered by inverter 510 enables AND-gates 503–505 in the absence of the input error signal. If a cue character is read by the Character Reader, the corresponding signal C*u*1–C*u*4 is encoded through OR-gates 502, 511, and 512 into the complementary four-bit code and delivered as corresponding C*rd*14–11 output signals. If an error is detected by the Character Reader, the C*er* signal causes the transmittal of the binary combination 1000 by the Sorter Control Unit.

The characters in the line of data read from a document are transmitted in the complementary code of the Sorter Control Unit to the Read Buffer, where they are converted to Central Processor code and stored in the Memory. The Central Processor thereupon analyzes the data provided by the document, in accordance with a prearranged program, and in response to this data provides output signals representing the Sorter pocket into which the document is to be inserted. The four logical combination signals P*s*1(*i*) for controlling Sorter #1 issue from the Central Processor in response to the bits in the A1 flip-flops of the A-register (FIG. 6). The signals P*s*41–P*s*11 represent four bits, each being the inverted binary form of the corresponding bit in A1. Therefore, the P*s*41–P*s*11 signals represent in the complementary code of the Sorter Control Unit the pocket into which the document is to be sorted. (See the following description of execution of Instruction 57.)

The P*s*41–P*s*11 signals are applied to the 0-input logic leads of the respective S*ou*4–S*ou*1 flip-flops of the Sorter Control Unit #1 output register. The S*ou*(*i*) flip-flops are thereby transferred to the same bit configuration as that originally provided by the A1 flip-flops.

Digit decoder 515 responds to the output signals delivered by the S*ou* flip-flops and the Y*ro* one-shot, to provide a significant output signal D*ec–ss* and D*ec*0–D*ec*9 on only one of the respective Sorter Control Unit output lines to the Sorter. Decoder 515 provides that the signal on each of these output lines represents a binary 1, except on that line which commands a pocket decision. For example, flip-flops S*ou*4–S*ou*1 store the 0001 code, a significant output signal, representing a binary 0, is available on only the D*ec*1 line. If no pocket designation has arrived at the S*ou*-register when the read out signal $\overline{Yro}$ transfers to the 0-state, no pocket decision line is actuated; instead, the N*pd* signal is transmitted to the Central Processor as an alarm.

The output lines from digit decoder 515 are connected to the input terminals of respective emitter followers 516, 517, 518, etc. The output leads of these emitter followers are connected to respective amplifiers 478, 479, 480, etc., in the Sorter (FIG. 16).

The significant output signal delivered by digit decoder 515 is a binary 0 on one of the lines therefrom. When this binary 0 issues on a pocket decision line; i.e., the D*ec–ss* and D*ec*0–D*ec*9 lines, it is transmitted through the corresponding emitter follower to a corresponding Sorter amplifier 478, 479, 480, etc. Normally, the output signals provided by digit decoder 515 each represent a binary 1, and provide a +6 v. input signal to the corresponding emitter follower, which, in turn maintains cutoff the corresponding amplifier of FIG. 16. When, for example, the D*ec*0 signal issues by transferring to the 0-state, the output voltage delivered by emitter follower 517 transfers to approximately the 0 v. level and amplifier 479 conducts current through the corresponding Sorter solenoid 492. Solenoid 492 thereupon sets the adjacent pin 486 of the respective timer disc, and the corresponding document will enter the Zero pocket when it arrives at deflector 493.

Other Sorter Control Unit flip-flops and one-shots (FIG. 18) are employed primarily to perform control functions. The C*kp* flip-flop indicates the presence of the field of a document under the transducer 470 of the corresponding Sorter and Character Reader. The C*of* flip-flop directs the feeding of documents by the corresponding Sorter. The D*cc* flip-flop indicates the arrival of a character signal from the Character Reader.

The Y*ck* one-shot is triggered when the C*sy*1 signal arrives from the Sorter Control Unit to indicate the presence of the reference edge of the document. This one-shot remains in its unstable state for a duration sufficient to enable the triggering of the C*kp* flip-flop and the Y*or* one-shot. The Y*cp* one-shot is triggered and remains in its unstable state when a character is being read from the document. The Y*or* one-shot controls the period when the S*ou* flip-flops may receive new data. The Y*ro* one-shot enables the read out of the contents of the S*ou* flip-flops to the Sorter.

SYSTEM OPERATION

The operation of the instant invention will now be described in connection with the overall operation of the system embodiment. The embodiment described is adapted to execute three different commands under the control of the Central Processor: command 58, which directs Sorter #1 or Sorter #2 to start or stop feeding documents; command 65 which prepares the Read Buffer to accept one line of data from the next document to be transported past the automatic reading apparatus of Sorter #1 or Sorter #2 and to transmit this data to the Memory; and command 57, which transmits to Sorter Control Unit #1 or Sorter Control Unit #2 a digit designating the pocket of the corresponding Sorter wherein a document is to be inserted. By assembling these commands into a program of instructions and storing such program in the Memory, automatic reading and sorting of documents under control of the Central Processor is effected.

*Execution of instruction 58*

This instruction commands Sorter #1 or Sorter #2 to start or stop feeding documents.

Execution of this instruction is initiated during execution of a program of sequential instructions by the Central Processor, wherein the Memory address of the particular Instruction 58 to be executed becomes the next-instruction address in the A-register as a previous instruction is being completed. A Memory cycle-A is completed during the last portion of this previous instruction and when the signal E*nd* occurs this new Instruction 58 occupies the M-register of the Memory (FIG. 10). The sequencer then enters the first clock period of its cycle wherein Instruction 58 is executed.

Figure 7:
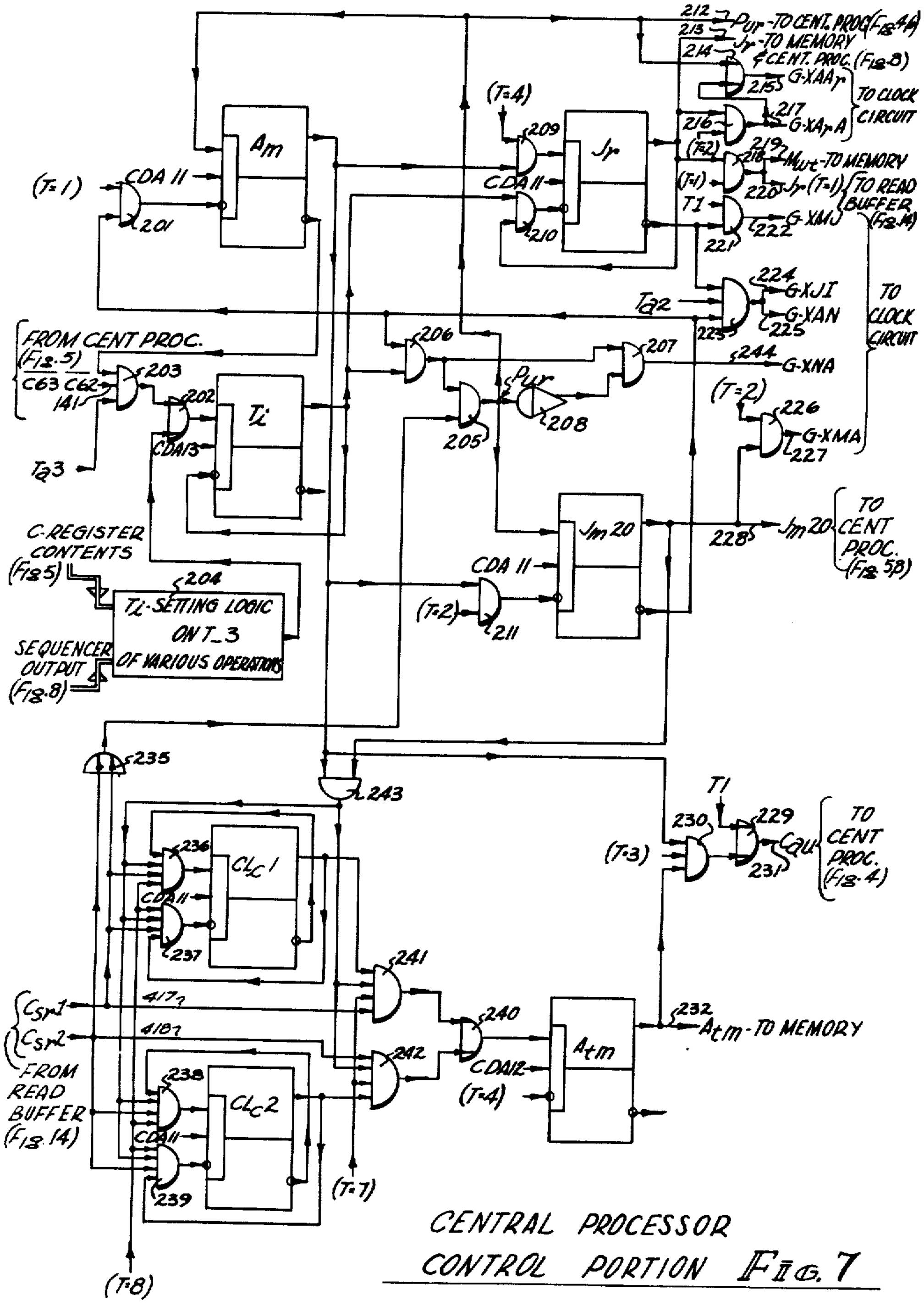
FIGURE 7 is a block diagram of a control portion of the Central Processor.

During the first clock period, when the T1 flip-flop is in the 1-state, three signals issue; namely the XMJ, M*cb* and C*au* signals. The XMJ shift signal is applied to register transfers 115 of FIG. 4 and gates the new instruction word from the M-register of the Memory to the J-register 103 of the Central Processor. The XMJ signal is delivered by the XMJ clock pulse driver upon application of the G-XMJ signal thereto during the first clock period of Instruction 58. The generation of the G-XMJ gating signal is shown in FIG. 7. The G-XMJ signal issues on output lead 222 of AND-gate 221 upon application to AND-gate 221 of the 1-output signal of the T1 flip-flop of the sequencer, AND-gate 221 being enabled at this time by the 0-output signal of the J*r* flip-flop. The J*r* flip-flop is normally in its 0-state and therefore AND-gate 221 receives a binary-1 signal from the 0-output lead thereof. The generation of the G-XMJ signal may be represented as:

$$G\text{-}XMJ=\overline{Jr}\ T1 \quad (9)$$

The M*cb* signal is applied to the Memory to initiate Memory cycle-B, wherein the representation of Instruction 58, which was transferred from a storage location in the Core Memory to the M-register during the previous Memory cycle-A, is restored to the same storage location in the Core Memory. The M*cb* signal issues on output lead 140 of OR-gate 138 (FIG. 5) upon the application to OR-gate 138 of the 1-output signal of the T1 flip-flop of the sequencer. OR-gate 138 also receives the output signal of AND-gate 137, AND-gate 137 delivering an output signal during a later portion of the sequencer cycle upon issuance of the T*b*1 signal (not shown in the instant application, but in S.N. 8,391), when enabled by commands wherein either the C64 or C63 flip-flop is in the 0-state. The 0-state of the C64 or C63 flip-flop is represented by the output signal of OR-gate 135, which is applied to AND-gate 137. The generation of the M*cb* signal may be represented as:

$$Mcb=T1+Tb1(\overline{C64}+\overline{C63}) \quad (10)$$

The C*au* signal is applied to the A-register of the Central Processor of FIG. 4 and increases the numerical value of the address therein by the quantity 1, in order to provide the address for the next sequential instruction to be derived from Memory when execution of the present Instruction 58 is completed. (At the beginning of the sequencer cycle the A-register still retains the address of the memory location that stored the present Instruction 58.) The C*au* signal issues on output lead 231 of OR-gate 229 of the Central Processor control portion (FIG. 7), upon application to OR-gate 229 of the 1-output signal of the T1 flip-flop of the sequencer. OR-gate 229 also receives the output signal of AND-gate 230, AND-gate 230 delivering an output signal upon the concurrent application thereto of a binary-1 signal from the 1-output lead of the A*m* flip-flop, a binary-1 signal from the 1-output lead of the A*tm* flip-flop, and the $T=3$ signal from the T-counter. The generation of the C*au* signal may be represented as:

$$Cau=Am\ Atm\ (T=3)+T1 \quad (11)$$

Therefore, during the first clock period of execution of Instruction 58 the instruction word is transferred from the Memory to the J-register, the data word representing Instruction 58 in the M-register is restored to its location in the Core Memory, and the contents of the A-register are incremented by 1 to identify the address of the next sequential instruction to be executed by the Central Processor.

During the second clock period of Instruction 58; that is, when the T-counter is in the $T=2$ state, the T*a* flip-flop is in the 1-state, and the sequencer is delivering the T*a*2 signal, the XJI and XAN signals issue. The XJI shift signal is applied to register transfers 106 of FIG. 4 and gates the new instruction word from the J-register 103 to the I-register 102. The XJI signal is delivered by the XJI clock pulse driver upon application of the G-XJI signal thereto during the second clock period of Instruction 58. The generation of the G-XJI gating signal is shown in FIG. 7. The G-XJI signal issues on output lead 224 of AND-gate 223 upon application to AND-gate 223 of the T*a*2 output signal of the sequencer, AND-gate 223 being enabled at this time by the 0-output signals of the J*r* and J*m*20 flip-flops. Both the J*r* and J*m*20 flip-flops are normally in their 0-states and therefore, AND-gate 223 receives binary-1 signals from the respective 0-output leads thereof. The generation of the G-XJI signal has been previously represented by Equation 7.

The XAN shift signal is applied to register transfers 114 of FIG. 4 and gates the address of the next-sequential instruction to be executed by the Central Processor from the A-register to the N-register 104, where the address remains until called for at a later time. The XAN signal is delivered by the XAN clock pulse driver upon application of the G-XAN signal thereto during the second clock period of Instruction 58. The generation of the G-XAN gating signal is shown in FIG. 7. The G-XAN signal issues on output lead 225 of AND-gate 223 upon application to AND-gate 223 of the T*a*2 output signal of the sequencer, AND-gate 223 being enabled at this time by the 0-output signals of the J*r* and J*m*20 flip-flops. The generation of the G-XAN signal may be represented as:

$$G\text{-}XAN=\overline{Jr}\ \overline{Jm20}\ Ta2 \quad (12)$$

Therefore, during the second clock period of execution of Instruction 58, the instruction word is transferred to the I-register at the same time that the address of the next-instruction in the A-register is transferred to the N-register.

At the conclusion of the second clock period of Instruction 58 the command register contains the command 58, and therefore command decoder 126 of FIG. 5 delivers a binary 1 on output lead 129 to control the operation of the Central Processor during the remainder of the execution period of Instruction 58. The A-register portion of I-register 102 will now contain one of four data configurations. These four configurations, represented by the four digits stored in the A4 to A1 flip-flops, direct the following operations:

0000—Sorter #1 will stop feeding documents.

0001—Sorter #1 will commence the continuous feeding of documents.

0010—Sorter #2 will stop feeding documents.

0011—Sorter #2 will commence the continuous feeding of documents.

During the third clock period of Instruction 58, when the T*a*3 flip-flop is in the 1-state, one of the four signals, $*Cfd1$, $*\overline{Cfd1}$, $*Cfd2$, or $*\overline{Cfd2}$, will issue to control the setting or resetting of the C*fd*1 or C*fd*2 flip-flops. The generation of each of these signals is shown in FIG. 6. The *C*fd*1 signal is the output signal of AND-gate 172 and functions to set the $Cfd1$ flip-flop to the 1-state thereof. The *$\overline{Cfd1}$ signal is the output signal of AND-gate 173 and functions to reset the $Cfd1$ flip-flop. The $Cfd1$ flip-flop, when in its 1-state, causes Sorter #1 to feed documents continuously. However, the $Cfd1$ flip-flop can only be set when Sorter #1 is ready to feed documents, because only at this time does the $Rsr1$ signal provided by Sorter #1 represent a binary 1. Thus, in Sorter #1 of FIG. 16 when the START SORTER switch 452 is closed, a binary 1 output signal representing the $Rsr1$ signal is delivered on output lead 454 to the Central Processor. This $Rsr1$ signal is applied to AND-gate 172 of FIG. 6. Therefore, AND-gate 172 can only be enabled if Sorter #1 is ready to feed documents. AND-gate 172 is also connected to receive the 1-output signal of the A11 flip-flop, the 0-output signal of the A21 flip-flop, and the output signal on lead 129 of command decoder 126. Additionally, the 1-output lead of the $Ta3$ flip-flop of the sequencer is applied to all of gates 170–173. Consequently, when AND-gate 172 is enabled by the $Ta3$ signal during execution of Instruction 58, the *$Cfd1$ signal will issue therefrom if the A11 flip-flop is in the 1-state, the A21 flip-flop is in the 0-state, and Sorter #1 is prepared to feed documents.

AND-gate 173 is coupled to receive the 0-output signal of both the A11 and A21 flip-flops and the output signal on lead 129 of command decoder 126. Therefore, upon the issuance of the $Ta3$ signal during execution of an Instruction 58, AND-gate 173 will deliver the output signal *$\overline{Cfd1}$ if the A11 and A21 flip-flops are both in the 0-state. The generation of the *$Cfd1$ and *$\overline{Cfd1}$ signals may be represented as:

(13) $$*Cfd1=(58)\ Rsr1\ Ta3\ \overline{A21}\ A11$$
$$*\overline{Cfd1}=(58)\ Ta3\ \overline{A21}\ \overline{A11}$$

The term (58) in Equations 13 represents the output signal provided on lead 129 of command decoder 126 (FIG. 5) and represents a binary 1 when command 58 occupies the C-register.

The *$Cfd2$ signal is the output signal of AND-gate 170 and functions to set the $Cfd2$ flip-flop to the 1-state thereof. The *$\overline{Cfd2}$ signal is the output signal of AND-gate 171 and functions to reset the $Cfd2$ flip-flop. The $Cfd2$, when in its 1-state, causes Sorter #2 to feed documents continuously. However, the $Cfd2$ flip-flop can only be set when Sorter #2 is ready to feed documents, because only at this time does the $Rsr2$ signal provided by Sorter #2 represent a binary 1. This $Rsr2$ signal is applied to AND-gate 170. Therefore AND-gate 170 can only be enabled if Sorter #2 is ready to feed documents. AND-gate 170 is also coupled to receive the 1-output signals of both the A11 and A21 flip-flops and the output signal on Lead 129 of command decoder 126. Therefore, upon the issuance of the $Ta3$ signal during execution of an Instruction 58, AND-gate 170 will deliver the output signal *$Cfd2$ if the A11 and A21 flip-flops are both in the 1-state and Sorter #2 is prepared to feed documents. AND-gate 171 is coupled to receive the 0-output signal of the A11 flip-flop, the 1-output signal of the A21 flip-flop, and the output signal on lead 129 of command decoder 126. Therefore, upon the issuance of the $Ta3$ signal during execution of an Instruction 58, AND-gate 171 will deliver the *$\overline{Cfd2}$ signal if the A11 flip-flop is in the 0-state and the A21 flip-flop is in the 1-state. The generation of the *$Cfd2$ and *$\overline{Cfd2}$ signals may be represented as:

(14) $$*Cfd2=(58)\ Rsr2\ Ta3\ A21\ A11$$
$$*\overline{Cfd2}=(58)\ Ta3\ A21\ \overline{A11}$$

Therefore, upon the occurrence of the clock pulse at the close of the third clock period of execution of Instruction 58, one of the $Cfd1$ or $Cfd2$ flip-flops is set or reset in accordance with the contents of the A-register.

During the fourth clock period of Instruction 58, signals are generated to set or reset the $Cof1$ flip-flop of Sorter Control Unit #1 (FIG. 18) or the $Cof2$ flip-flop of Sorter Control Unit #2 so that the states of the $Cof1$ and $Cof2$ flip-flops correspond to the states of the respective $Cfd1$ and $Cfd2$ flip-flops. Thus, the 1-output signal of the $Cfd1$ flip-flop of FIG. 6 is delivered on lead 177 to the logic input lead of the $Cof1$ flip-flop of FIG. 18. Similarly, the 0-output signal of the $Cfd1$ flip-flop is delivered on lead 178 to the $Cof1$ flip-flop. Consequently, a change in the state of the $Cfd1$ flip-flop during Instruction 58 will immediately be reflected by a corresponding change in state of the $Cof1$ flip-flop in the next following clock period. In a similar manner the $Cof2$ flip-flop changes state one clock period after a change in state of the $Cfd2$ flip-flop. The generation of the signals which cause the $Cof1$ and $Cof2$ flip-flops to follow the state of the $Cfd1$ and $Cfd2$ flip-flops may be represented as:

(15) $$*Cof1=Cfd1$$
$$*\overline{Cof1}=\overline{Cfd1}$$

(16) $$*Cof2=Cfd2$$
$$*\overline{Cof2}=\overline{Cfd2}$$

Also issuing during the fourth clock period of the Instruction 58 is the XNA signal. The XNA shift signal is applied to register transfers 111 of FIG. 4 and gates the next-instruction address from the N-register 104 to the A-register. The XNA signal is delivered by the XNA clock pulse driver upon application of the G-XNA signal thereto during the fourth clock period of Instruction 58. The generation of the G-XNA gating signal is shown in FIG. 7. The G-XNA signal issues on output lead 244 of AND-gate 207 upon the application to AND-gate 207 of a binary 1 signal from AND-gate 206, AND-gate 206, in turn, providing an output signal when the $Ti$ flip-flop is in the 1-state thereof. During this fourth clock period, the output signal of AND-gate 205 normally represents a binary 1, so that the output signal of the succeeding inverter 208 represents a binary 1 and enables AND-gate 207. Consequently, AND-gate 207 responds to the state of the output signal of AND-gate 206. AND-gate 206 is normally enabled by the 0-output signal of the $Jm20$ flip-flop which is in its 0-state at this time. Therefore, AND-gate 206 will deliver an output signal only during the fourth clock period of Instruction 58 because at this time the $Ti$ flip-flop is in its 1-state, having been transferred thereto by the sequencer $Ta3$ signal. The generation of the G-XNA signal may be represented as:

(17) $$G\text{-}XNA=\overline{IPur}\ \overline{Jm20}\ Ti$$

wherein the designation $\overline{IPur}$ represents the output signal of inverter 208.

Therefore, during the fourth clock period of execution of Instruction 58 signals are provided to cause the $Cof1$ and $Cof2$ flip-flops to follow the state of the $Cfd1$ and $Cfd2$ flip-flops, and the next-instruction address is transferred to the A-register.

During the fifth clock period of Instruction 58 the $Cof1$ and $Cof2$ flip-flops of the Sorter Control Units occupy the states designated by the instant Instruction 58 and deliver corresponding signals to control the respective Sorters. Thus, Sorter Control Unit #1 of FIG. 18 provides an output signal representing a binary 1 on lead 542 of the $Cof1$ flip-flop when such flip-flop is in the 1-state. This output signal is applied to and energizes solenoids 459 and 460 of Sorter #1 (FIG. 16), causing Sorter #1 to start feeding documents, as described previously in connection with the description of the Sorter. If the $Cof1$ flip-flop had been transferred to the 0-state by the instant Instruction 58, Sorter #1 will discontinue feeding documents because of removal of the binary 1 signal from lead 496 and the consequent de-energization of solenoids 459 and 460. In a similar manner, Sorter #2 responds to the state of the C*of*2 flip-flop of Sorter Control Unit #2 to start or stop document feeding.

During the fifth clock period of Instruction 58 the M*ca* signal issues. The M*ca* signal is applied to the Memory to initiate Memory cycle-A wherein the next instruction, the address of which at this time is in the A-register of the Central Processor, is transferred from the addressed storage location in the Core Memory to the M-register. The preceding Memory description indicated that the contents of the A-register in the Central Processor are gated to address register 308 of the Memory upon issuance of the M*ca* signal. The M*ca* signal issues on output lead 139 of the Central Processor portion, shown in FIG. 5, each time the T-counter is in the $T=5$ state. The generation of the M*ca* signal may be represented as:

$$Mca=(T=5) \tag{18}$$

The sequencer continues counting until the eighth clock period of Instruction 58 is reached, whereupon the E*nd* signal issues. The E*nd* signal is applied to the T1 flip-flop of the sequencer (FIG. 8) to cause a new sequencer cycle to start and the consequent execution of the next instruction, the address of such next instruction being in the M-register at the close of the instant Instruction 58. The E*nd* signal is delivered as a binary 1 representation from OR-gate 258 upon receipt of a signal representing a binary 1 from AND-gate 257. AND-gate 257 is enabled by the $\overline{C63}\,\overline{C62}$ signal supplied on lead 141 from the Central Processor portion of FIG. 5, since both of the C63 and C62 flip-flops are in the 0-state during execution of Instruction 58. With AND-gate 257 so enabled a binary 1 output signal is delivered thereby, when the T*a*8 flip-flop is in the 1-state during the eighth clock period of Instruction 58. The generation of the E*nd* signal has been represented previously by Equation 1.

Therefore, Instruction 58 terminates after eight clock periods and the next instruction commences. During execution of Instruction 58, the contents of the Central Processor A-register have directed Sorter #1 or Sorter #2 to start or stop the continuous feeding of documents.

*Execution of instruction 65*

This instruction directs the Read Buffer and either Sorter Control Unit #1 or Sorter Control Unit #2 to prepare to accept and transmit to Memory one line of data to be read from the next document to be transported past the respective automatic reading apparatus of Sorter #1 or Sorter #2. This instruction merely prepares the system to read and store a line of data from a document. Following the conclusion of the instruction, the Read Buffer and designated Sorter Control Unit take over control of reading data from the document, signaling the Central Processor when a data word is ready for transfer to Memory, and terminating the reading operation.

Execution of this instruction is initiated during execution of a program of sequential instructions by the Central Processor, wherein the Memory address of the particular Instruction 65 to be executed becomes the next-instruction address in the A-register as a previous instruction is being completed. A Memory cycle-A is completed during the last portion of this previous instruction and when the signal E*nd* occurs this new Instruction 65 occupies the M-register of the Memory. The sequencer then enters the first clock period of its cycle, wherein Instruction 65 is executed.

During the first clock period of Instruction 65, three signals issue; namely the XMJ, M*cb*, and C*au* signals. The XMJ shift signal gates the new instruction word from the M-register of the Memory to the J-register 103 of the Central Processor. The M*cb* signal initiates Memory cycle-B, wherein the representation of Instruction 65, which was transferred from a storage location in the Core Memory to the M-register during the previous Memory cycle-A, is restored to the same storage location in the Core Memory. The C*au* signal increases the numerical value of the address in the A-register by the quantity 1 in order to provide the address for the next sequential instruction to be derived from the Memory when execution of the present Instruction 65 is completed. Each of the XMJ, M*cb*, and C*au* signals is caused to issue by the 1-output signal of the T1 flip-flop, as described in connection with the preceding Equations 9, 10, and 11.

During the second clock period of Instruction 65, the XJI and XAN signals issue. The XJI signal gates the new instruction word from the J-register 103 to I-register 102 of the Central Processor. The XAN signal gates the address of the next-sequential instruction to be executed by the Central Processor from the A-register to the N-register 104 of the Central Processor. Each of the XJI and XAN signals is caused to issue by the T*a*2 signal, as described in connection with the preceding Equations 7 and 12.

At the conclusion of this second clock period of Instruction 65 the command register contains the command 65 and, therefore, command decoder 126 of FIG. 5 delivers a binary 1 on output lead 130 to control the operation of the Central Processor during the remainder of the execution period of Instruction 65. The A-register portion of I-register 102 will now contain one of two data configurations. These two configurations, represented by the four digits in the A4 to A1 flip-flops, direct the following operations:

000$—The reading of a line of data from a document fed by Sorter #1.

000*—The reading of a line of data from a document fed by Sorter #2.

The four bit code in the A1 flip-flops for the $ and * digits is indicated in the preceding Table I.

During the third clock period of Instruction 65, the four signals C*had*1, R*ebd*, *R*eb*, and *C*ha*1 issue if the contents of the A-register are 000$. These four signals issue to control the setting of the R*eb* and C*ha*1 flip-flops in the Read Buffer (FIG. 14). However, during this third clock period of Instruction 65, the two signals C*had* and *C*ha*2 issue if the contents of the A-register are 000*. These two signals issue to control the setting of the C*ha*2 flip-flop of the Read Buffer (FIG. 14).

The R*ebd* and C*had*1 signals issue on respective output leads 184 and 185 of AND-gate 182 (FIG. 6). The R*ebd* signal functions as the signal *R*eb* (FIG. 14) and causes the setting of the R*eb* flip-flop at the end of the third clock period of Instruction 65. The setting of the R*eb* flip-flop may be represented as:

$$*Reb=Rebd \tag{19}$$

The C*had*1 signal functions as the signal *C*ha*1 (FIG. 14) and causes the setting of the C*ha*1 flip-flop at the end of the third clock period of Instruction 65. The setting of the C*ha*1 flip-flop may be represented as:

$$*Cha1=Chad1 \tag{20}$$

The 0-output signal of the R*eb* flip-flop is applied to and functions to disable AND-gate 182 if the R*eb* flip-flop is in the 1-state, denoting that a document is still being read by Sorter #1 when an attempt is made to execute the instant Instruction 65. AND-gate 182 also receives the signal on lead 130, which represents a binary 1 when a 65 command occupies the C-register. The output signal of AND-gate 180 is also coupled to AND-gate 182. AND-gate 180 responds to the contents of the A1 flip-flops to deliver a binary 1 output signal when such contents represent the $ digit. Therefore, AND-gate 182 delivers output signals R*ebd* and C*had*1 upon the application of the T*a*3 output signal of the sequencer during execution of Instruction 65, if the contents of the A1 flip-flops represent the $ digit, provided the R*eb* flip-flop is not already in the 1-state. The generation of the R*ebd* and C*had*1 signals may be represented as:

$$Rebd=(65)\,\overline{Reb}\,Ta3\,(\overline{A14}\,A13\,\overline{A12}\,A11) \tag{21}$$

(22) $Chad1=(65)\ \overline{Reb}\ Ta3\ (\overline{A14}\ A13\ \overline{A12}\ A11)$ The *Chad*2 signal issues on output lead 186 of AND-gate 183 (FIG. 6). The *Chad*2 signal functions as the signal **Cha*2 (FIG. 14) and causes the setting of the *Cha*2 flip-flop at the end of the third clock period of Instruction 65. The setting of the *Cha*2 flip-flop may be represented as:

(23) $*Cha2=Chad2$

The similarity between the Equations 20 and 23 is because Control Group #2 and Control Group #1 of FIG. 14 are structurally alike, as has been pointed out heretofore. The 0-output signal of the *Cha*2 flip-flop is applied to and functions to disable AND-gate 183 if the *Cha*2 flip-flop is in the 1-state, denoting that a document is still being read by Sorter #2 when an attempt is made to execute the instant Instruction 65. AND-gate 183 also receives the signal on lead 130, which represents a binary 1 when a 65 command occupies the C-register. The output signal of AND-gate 181 is also coupled to AND-gate 183. AND-gate 181 responds to the contents of the A1 flip-flops to deliver a binary 1 output signal when such contents represent the asterisk (*) digit. Therefore, AND-gate 183 delivers output signal *Chad*2 upon the application of the *Ta*3 output signal of the sequencer during execution of Instruction 65, if the contents of the A1 flip-flops represent the asterisk (*) digit, provided the *Cha*2 flip-flop is not already in the 1-state. The generation of the *Chad*2 signal may be represented as:

(24) $Chad2=(65)\ \overline{Cha2}\ Ta3\ (A14\ A13\ A12\ \overline{A11})$

The setting of the *Cha*1 and *Cha*2 flip-flops permits the entry of data from the corresponding one of Sorter Control Unit #1 and Sorter Control Unit #2 to the Read Buffer when a document is scanned by the automatic reading apparatus of respective Sorter #1 or Sorter #2.

During the fourth clock period of Instruction 65, the XNA signal issues. The XNA signal gates the next-instruction address from the N-register 104 to the A-register. The XNA signal is caused to issue by the 1-output signal of the T*i* flip-flop, as described in connection with the preceding Equation 17.

During the fifth clock period of Instruction 65, the M*ca* signal issues. The M*ca* signal initiates Memory cycle-A, wherein the next instruction, the address of which at this time is in the A-register of the Central Processor, is transferred from the addressed storage location in the Core Memory to the M-register. The M*ca* signal is caused to issue by the $T=5$ signal of the T-counter, as described in connection with preceding Equation 18.

The sequencer continues counting until the eighth clock period of Instruction 65 is reached, whereupon the E*nd* signal issues. The E*nd* signal is applied to the T1 flip-flop of the sequencer (FIG. 8) to cause a new sequencer cycle to start and the consequent execution of the next instruction, the address of such next instruction being in the M-register at the close of the instant Instruction 65. The generation of the E*nd* signal has been represented previously by Equation 1.

Therefore, Instruction 65 terminates after eight clock periods and the next instruction commences. During execution of Insrtuction 65, the Read Buffer and either Sorter Control Unit #1 or Sorter Control Unit #2 is prepared for the acceptance and transmission to Memory of one line of data to be read by the next document transported past the respective automatic reading apparatus of Sorter #1 or Sorter #2. Therefore, the instant Instruction 65 merely prepares the system to read one line of data from a document. Following the conclusion of execution of the instruction, the Read Buffer controls and the Sorter Control Unit take over reading of data from the document, signaling the Central Processor when a data word is ready for transfer to Memory, and finally terminating the reading operation when the line of data on the document has been stored in Memory. Since the reading of data by a Character Reader is slow compared with the speed of the Central Processor, at the conclusion of the execution of this Instruction 65 the Central Processor continues with its program, subject only to continual interruptions to receive data for the Memory from the Read Buffer as each character representation is supplied to the Read Buffer from the Character Reader.

*Entry of data into read buffer*

The operations described in this section relate to the transfer of character digits from the Character Reader through the respective Sorter Control Unit to the Read Buffer. These operations follow automatically after execution of a command 58, causing the respective sorter to start feeding documents, followed by a command 65, directing the Read Buffer to accept and transfer to Memory a line of data from the next document to be transported past the automatic reading apparatus of the Sorter. Furthermore, the description in this section relates to either operations following execution of a single Instruction 65 directing one Sorter Control Unit to cooperate with the Read Buffer to accept data from the corresponding Sorter or to operations following execution of two Instructions 65 directing both Sorter Control Units to cooperate with the Read Buffer to accept data from both sorters. The following two sub-sections describe in detail those operations wherein character digits are transferred from Character Reader #1 through Sorter Control Unit #1 to the Read Buffer. The corresponding operations for the transfer of character digits from Character Reader #2 through Sorter Control Unit #2 to the Read Buffer are substantially identical and will not be described herein in detail.

*Transfer of character digit into Ra4 flip-flops*

The operation for transferring character digits from Character Reader #1 through Sorter Control Unit #1 to the Read Buffer is best explained in two stages. In the first of these stages, a character digit is transferred from Character Reader #1 through Sorter Control Unit #1 to the R*a*4 flip-flops of the Read Buffer. It will be assumed herein that Sorter #1 has been directed to commence feeding documents continuously, by previous execution of an appropriate Instruction 58, and that the Read Buffer and Sorter Conrtol Unit #1 have been prepared to accept a line of data from the next document to be transmitted past the automatic reading apparatus of Sorter #1 and to transfer such data to the Memory, by previous execution of an appropriate Instruction 65.

The preparatory Instruction 65 sets the R*eb* and C*ha*1 flip-flops (FIG. 14). These two flip-flops remain in their 1-states until one line of data has been read from the next document supplied to Character Reader #1.

Figure 20:
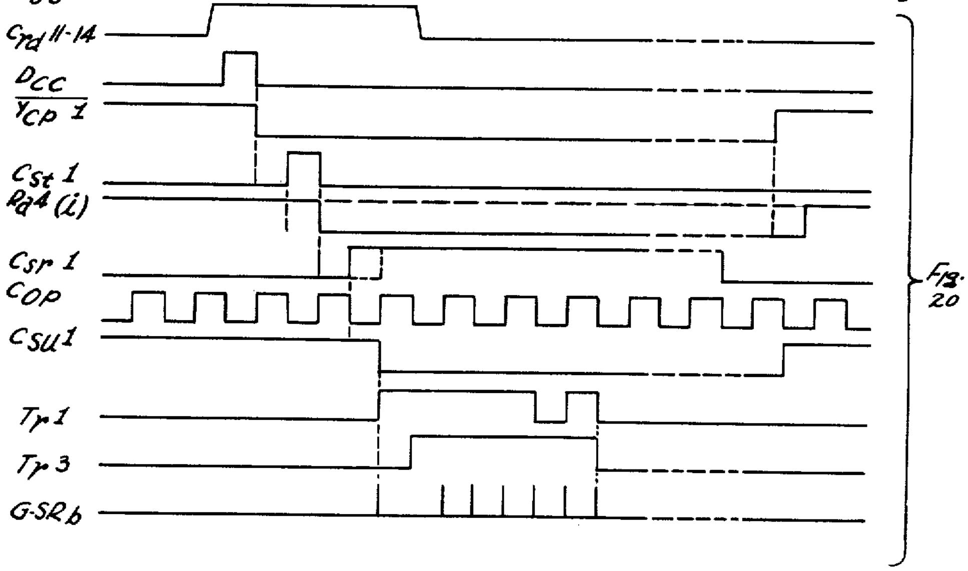
FIGURE 20 illustrates waveforms useful in explaining the operation of the Read Buffer.

The following description is implemented by reference to the waveforms of FIGS. 19 and 20. When photocell 468 of the automatic reading apparatus of Sorter #1 (FIG. 16) detects the reference edge 25 of a document, the C*sy*1 signal issues on lead 471 to initiate reading of characters from that document.

The C*sy*1 signal is applied to one input lead of AND-gate 526 of Sorter Control Unit #1 (FIG. 18). The other input lead of AND-gate 526 is normally enabled at this time by application thereto of the 0-output signal of the Y*or* one-shot, since the Y*or* one-shot is in its stable, or 0-state. The output signal of AND-gate 526 triggers the Y*ck* one-shot, as follows:

(25) $*Yck=Csy1\ \overline{Yor}$

The transfer of the Y*ck* one-shot to its unstable state causes the IY*ck* inverter 527, which is coupled to the 0-output lead of the Y*ck* one-shot, to now deliver a signal representing a binary 1. The IY*ck* inverter, in turn, sets the C*kp* flip-flop to its 1-state; as follows:

(26) $*Ckp=\overline{IYck}$

The *Ckp* flip-flop remains in its 1-state so long as the field of data of the document is opposite transducer 470 of Sorter #1, and is only reset after the normal extent of the document field 26 has passed the transducer 470. The Ckp flip-flop, when reset, terminates transfer to the Read Buffer of the data read from the document.

The *Ckp*1 output signal of the *Ckp* flip-flop of Sorter Control Unit #1 is delivered on output lead 528 to one input lead of AND-gate 401 of the Read Buffer controls (FIG. 14). A second input lead of AND-gate 401 is enabled at this time by application thereto of the 0-output signal of the *Cfs*1 flip-flop, since the *Cfs*1 flip-flop, before being set by the output signal of AND-gate 401, is in its 0-state. The third input lead of AND-gate 401 is enabled by application thereto of the 1-output signal of the *Cha*1 flip-flop, since the previously executed Instruction 65 set the *Cha*1 flip-flop to its 1-state. The output signal of AND-gate 401 causes the setting of the *Cfs*1 flip-flop, as follows:

(27) $\#Cfs1 = Ckp1\ Cha1\ \overline{Cfs1}$

When a document character is recognized by Character Reader #1, the coded representation thereof is transferred by the *Crd*14, 13, 12, 11 output signals of the Sorter Control Unit #1 to the Read Buffer. The coding for each of the characters in the *Crd*(*ij*) signals is complementary to the code employed for that character in normal data processing. For example, the *Crd*14, 13, 12, 11 signals for the digit 1 are respectively 1, 1, 1, 0.

When a proper character is read, one of the signals *Cd*0–9 or *Cu*1–4 issues and causes the corresponding *Dor* or *Qor* signal (FIG. 18) to issue. The *Dor* signal indicates that a numeral has been read and the *Qor* signal indicates that a cue character has been read. The digit signals *Cd*0–*Cd*9 are applied to OR-gate 530 of the Sorter Control Unit (FIG. 18). Therefore, upon the recognition of any numerical digit by Character Reader #1, a digit signal is applied on the corresponding lead to OR-gate 530, which thereupon delivers an output signal representing a binary 1, this output signal being designated *Dor*. Similarly, upon the recognition of any cue character by Character Reader #1, a cue signal is applied on the corresponding lead to OR-gate 531, which thereupon delivers an output signal representing a binary 1, and designated *Qor*. The output signals of OR-gates 530 and 531 are applied to input leads of OR-gate 532, which in turn delivers its output signal to the 1-logic input lead of the *Dcc* flip-flop. Thus, when a character is read the *Dcc* flip-flop of the Sorter Control Unit is set to the 1-state, as follows:

(28) $*Dcc = Qor + Dor$

The *Dcc* flip-flop remains in its 1-state for one clock period, immediately resetting itself, as follows:

(29) $*\overline{Dcc} = Dcc$

During the single clock period that the *Dcc* flip-flop is in its 1-state, it initiates acceptance of Sorter Control Unit output signals *Crd* (*ij*) by the Read Buffer. When the *Dcc* flip-flop is transferred to its 1-state, the *Ycp* one-shot is triggered, as follows:

(30) $*Ycp = Dcc$

The *Ycp* one-shot remains in its unstable state for approximately 500 microseconds, the approximate duration necessary for a character to be scanned by the automatic reading apparatus.

The $\overline{Ycp1}$ output signal of the *Ycp* one-shot of Sorter Control Unit #1 is applied to inverter 533. The inverted output signal of inverter 533, designated $\overline{IYcp1}$, is delivered on output lead 534 to one input lead of AND-gate 407 of the Read Buffer controls (FIG. 14). A second input lead of AND-gate 407 is enabled by application thereto of the 1-output signal of the *Cha*1 flip-flop. The third input lead of AND-gate 407 is enabled at this time by the binary 1 output signal delivered by AND-gate 336 on output lead 338 of the Read Buffer (FIG. 13). Therefore, the *Ycp* one-shot, upon transferring to its unstable state, results in the $\overline{IYcp1}$ signal representing a binary 1, causing AND-gate 407 to delivery a binary 1 output signal to set the *Cst*1 flip-flop (FIG. 14) to the 1-state, as follows:

(31) $*Cst1 = Cha1\ \overline{IYcp1}\ (Ra44\ Ra43\ Ra42\ Ra41)$

The 1-output signal of the *Cst*1 flip-flop is applied on output lead 409 to enable input AND-gates 340, 341, 342, and 343 of the Read Buffer (FIG. 13). When so enabled, gates 340–343 apply to the 0-register transfer input leads of the *Ra*44–*Ra*41 flip-flops the respective signals *Crd*14–*Crd*11 provided by the Sorter Control Unit (FIG. 13) and representing the character being read from the document, as follows:

(32) $\#Ra4(i) = Cst1\ Crd1(i)$

Before each character is read, the *Ra*4 flip-flops are preset to the 1-state.

An AND-gate 344 is coupled to the 1-logic input leads of the *Ra*44–*Ra*41 flip-flops (FIG. 13). One input lead of AND-gate 344 is enabled by application thereto of the 1-output signal of the *Cha*1 flip-flop. The second input lead is enabled by application thereto of the output signal of the *Ycp*1 one-shot on lead 535, this output signal representing a binary 1 prior to the reading of each character by Character Reader #1. Therefore, the *Ra*44–*Ra*41 flip-flops are preset to the 1-state immediately before each character is read, as follows:

(33) $*Ra4(i) = Cha1\ \overline{Ycp1}$

It is prior to the reading of each character that AND-gate 336 (FIG. 13) delivers the binary 1 output signal to enable the setting of the *Cst*1 flip-flop of FIG. 14, as demonstrated by the preceding Equation 31, because at this time all of flip-flops *Ra*44–*Ra*41 are in the 1-state.

The code of the digit entered in the *Ra*4 flip-flops is thus inverted from the digit code received from the Sorter Control Unit, and is the normal data code for processing by the Central Processor.

Thus, upon receipt of a character from the Character Reader by the Sorter Control Unit, the *Ycp* one-shot is triggered and this one-shot, in turn, enables the setting of the *Cst*1 flip-flop which gates the character digit from the Sorter Control Unit to the *Ra*44–*Ra*41 flip-flops of the Read Buffer.

The *Cst*1 flip-flop remains in its 1-state for but one clock period, immediately resetting itself, as follows:

(34) $*\overline{Cst1} = Cst1$

Thus, the *Ra*44–*Ra*41 flip-flops are enabled to receive data from Sorter Control Unit #1 through gates 340–343 for only one clock period. This prevents stray noise and transient signals from providing false signals to the *Ra*44–*Ra*41 flip-flops.

The *Ra*4 flip-flops may receive the next character after the *Ycp* one-shot returns to its stable state and delivers a binary 1 output signal on lead 535 (FIG. 18) to again preset the *Ra*4 flip-flops. When the *Ra*4 flip-flops are again preset, AND-gate 407 is once more enabled to permit the setting of the *Cst*1 flip-flop when the next character is read.

*Transfer of character digit from Ra4 flip-flops to Rb-register*

In the second stage of transferring a character digit from Character Reader #1 through Sorter Control Unit #1 to the Read Buffer, the character digit is transferred from the *Ra*4 flip-flops to the *Rb*-register of the Read Buffer. As this second stage commences, a character digit is in the *Ra*4 flip-flops and the *Cfs*1, *Ckp*1, and *Cha*1 flip-flops are in the 1-state, as described in the preceding sub-section. Additionally, prior to receipt of each character from Character Reader #1, the Csu1 flip-flop (FIG. 14) is transferred to the 1-state by application thereto of a binary-1 signal from the Ycp1 one-shot of Sorter Control Unit #1, this one-shot being in its stable state and delivering the binary-1 signal on lead 535 prior to receipt of each character by Sorter Control Unit #1. The Csu1 flip-flop is set to the 1-state as follows:

$$(35)\qquad {}^{*}Csu1=\overline{Ycp1}$$

The transfer of the digit in the Ra4 flip-flops to the Rb-register is effected upon the setting of the Csr1 flip-flop of the Read Buffer (FIG. 14) to the 1-state when a character is entered into the Ra4 flip-flops. The time of setting of the Csr1 flip-flop is controlled by the free-running Cop flip-flop. The Cop flip-flop changes state once each clock period and provides an interlock for the transfer of data to the Rb-register whereby a character from only one of the Sorter Control Units may be transferred to the Read Buffer at a given time regardless of the relative time of arrival of characters from these sources. The free-running operation of the Cof flip-flop may be represented as:

$$(36)\qquad {}^{*}Cop=\overline{Cop}$$
$${}^{*}\overline{Cop}=Cop$$

When the output signal of AND-gate 415 represents a binary-1, the Csr1 flip-flop is set to the 1-state. A first input lead of AND-gate 415 is enabled by application thereto of the 0-output signal of the Csr2 flip-flop, the Csr2 flip-flop being in the 0-state when no digit is being transferred from the Ra3 flip-flops of the Read Buffer to the Rb-register. A second input lead of AND-gate 415 is enabled by the binary-1 output signal delivered by AND-gate 412. AND-gate 412 delivers a binary-1 output signal at this time since it receives binary-1 signals on both input leads thereof from the Cha1 and Csu1 flip-flops. A third input lead of AND-gate 415 is enabled by the binary-1 output signal of OR-gate 346 (FIG. 13) delivered on output lead 348 of the Read Buffer. A fourth input lead of AND-gate 415 is enabled by the binary-1 output signal delivered by the IYcp1 inverter 533 of Sorter Control Unit #1 on lead 534 (FIG. 18), the output of inverter 533 representing a binary-1 because the Ycp1 one-shot is in its unstable state for 500 microseconds after a character is read and transferred to the Ra4 flip-flops. Therefore, immediately after the receipt by AND-gate 415 of a binary-1 signal on lead 348, denoting that a character digit has been inserted in the Ra4 flip-flops, AND-gate 415 delivers an output signal when the Cop flip-flop next transfers to its 1-state. The output signal of AND-gate 415, which sets the Csr1 flip-flop to the 1-state thereof, may be represented as:

$$(37)\qquad {}^{*}Csr1=Cop\ Cha1\ Csu1\ \overline{Csr2}\ \overline{IYcp1}\ (\overline{Ra44}+\overline{Ra43}+\overline{Ra42}+\overline{Ra41})$$

Therefore, the Csr1 flip-flop is set to the 1-state when the Cop flip-flop enters its 1-state, after a character has been read by Character Reader #1 and the corresponding character digit transferred to the Ra4 flip-flops, providing the Csr2 flip-flop is in its 0-state.

It may be noted at this time that the major difference between the apparatus for transferring a character digit from Character Reader #2 to the Rb-register and the apparatus for transferring a character digit from Character Reader #1 to the Rb-register lies in the application of the output signals of the Cop flip-flop to the respective Csr2 and Csr1 flip-flops. The Csr1 flip-flop is set to the 1-state to enable transfer to the Rb-register of the contents of the Ra4 flip-flops when the Cop flip-flop enters its 1-state after the Ra4 flip-flops receive the character digit. On the other hand, the Csr2 flip-flop is set to the 1-state to enable transfer to the Rb-register of the contents of the Ra3 flip-flops when the Cop flip-flop enters its 0-state after a character has been received by the Ra3 flip-flops. The Csr2 flip-flop cannot enter its 1-state, however, if the Csr1 flip-flop is already in the 1-state. The output signal of AND-gate 416 which sets the Csr2 flip-flop to the 1-state may be represented as:

$$(38)\qquad {}^{*}Csr2=\overline{Cop}\ Cha2\ Csu2\ \overline{Csr1}\ \overline{IYcp2}\ (\overline{Ra34}+\overline{Ra33}+\overline{Ra32}+\overline{Ra31})$$

The Rb14–Rb11 flip-flops of the Rb-register receive signals on the 1-logic input leads thereof through the respective OR-gates 351, 352, 353, and 354 (FIG. 13). The Rb14–Rb11 flip-flops receive signals on the 0-logic input leads thereof through the respective OR-gates 355, 356, 357, and 358. However, data may only be inserted into the Rb14–Rb11 flip-flops upon application thereto of clock signals from the SRb clock pulse driver.

OR-gates 351, 352, 353, and 354 are each provided with two input leads and receive signals thereon from the respective ones of AND-gates 361, 362, 363, and 364 and from the respective ones of AND-gates 371, 372, 373, and 374. OR-gates 355, 356, 357, and 358 are each provided with two input leads and receive signals thereon from the respective ones of AND-gates 365, 366, 367, and 368 and from the respective ones of AND-gates 375, 376, 377, and 378. Each of AND-gates 362–368 is enabled by the $\overline{Csr2}$ signal supplied on lead 419 from the Csr2 flip-flop of the Read Buffer (FIG. 14) when the Csr2 flip-flop is in the 0-state. As will be shown hereinafter, either the Csr2 flip-flop or the Csr1 flip-flop may be in the 1-state; however, although both of such flip-flops may be in the 0-state simultaneously, they may not both be in the 1-state at the same time. Therefore, when the Csr2 flip-flop is in the 0-state, data may be transmitted from the Ra4 flip-flops to the Rb-register.

When AND-gates 362, 363, and 364 are enabled by the 0-state of the Csr2 flip-flop, each delivers a binary-1 output signal if the corresponding one of flip-flops Ra43, Ra42, and Ra41 is in the 1-state. When AND-gates 366, 367, and 368 are enabled by the 0-state of the Csr2 flip-flop, each delivers a binary-1 output signal if the respective one of flip-flops Ra43, Ra42, and Ra41 is in the 0-state. Therefore, when the Csr2 flip-flop is in the 0-state, OR-gates 352–358 supply signals representing the respective states of the Ra43, Ra42, and Ra41 flip-flops at the output leads thereof. These signals delivered by OR-gates 352–358 are applied, as described previously, to the Rb13, Rb12, and Rb11 flip-flops and, upon the application of an SRb clock pulse, each of these three flip-flops assumes the state of the corresponding one of the Ra43, Ra42, and Ra41. Similarly, when the Csr2 flip-flop is in the 1-state, the output signals or OR-gates 352–358 cause each of the Rb13, Rb12, and Rb11 flip-flops to assume the state of the corresponding one of the Ra33, Ra32, and Ra31 flip-flops when the SRb clock pulse is applied.

OR-gate 351 is provided with two input leads and thereon receives the output signals of AND-gates 361 and 371. One input lead of AND-gate 361 receives the output signal of OR-gate 380, OR-gate 380, in turn, supplying a binary-1 output signal when any one of the Ra43, Ra42, or Ra41 flip-flops is in the 0-state; i.e., after a character has been transferred to the Ra4 flip-flops. A second input lead of AND-gate 361 is enabled by the 1-output signal of the Ra44 flip-flop. A third input lead of AND-gate 361 is enabled by the 1-output signal of the Csr1 flip-flop, supplied on lead 417, when the Csr1 flip-flop is in the 1-state; i.e., after a character has been transferred to the Ra4 flip-flops. OR-gate 355 is provided with two input leads and receives thereon the output signals of AND-gates 365 and 375. AND-gate 365 is enabled by the 1-output signal of the C*su*1 flip-flop, which is in the 1-state before each character is received by Sorter Control Unit #1, and by the 1-output signal of the C*sr*1 flip-flop, which is set to the 1-state after a character is received by the R*a*4 flip-flops.

Therefore, the output signals of AND-gates 351–358 which function to set, or reset, the R*b*1 flip-flops when a clock pulse is delivered by the SR*b* clock pulse driver may be represented as:

$$(39)\quad {}^*Rb14=Ra34\ Csr2\ (\overline{Ra33}+\overline{Ra32}+\overline{Ra31})$$
$$+Ra44\ Csr1\ (\overline{Ra43}+\overline{Ra42}+\overline{Ra41})$$
$$^*\overline{Rb14}=Csr1\ Csu1+Csr2\ Csu2$$
$$^*Rb13=Ra33\ Csr2+Ra43\ Csr2$$
$$^*\overline{Rb13}=Ra33\ Csr2+Ra43\ Csr2$$
$$^*Rb12=Ra32\ Csr2+Ra42\ Csr2$$
$$^*\overline{Rb12}=\overline{Ra32}\ Csr2+\overline{Ra42}\ \overline{Csr2}$$
$$^*Rb11=Ra31\ Csr2+Ra41\ \overline{Csr2}$$
$$^*\overline{Rb11}=\overline{Ra31}\ Csr2+\overline{Ra41}\ \overline{Csr2}$$

Following the setting of the C*sr*1 flip-flop to the 1-state upon the transfer of a character digit to the R*a*4 flip-flops, OR-gates 352–358 present at the output leads thereof signals representing the contents of the R*a*43, R*a*42, and R*a*41 flip-flops. If a proper character; i.e., one not represented by the 1111 digit, has been transferred to the R*a*4 flip-flops, OR-gate 380 receives at least one binary-1 signal and enables AND-gate 361, which, in turn, delivers a binary-1 output signal through OR-gate 351 if the R*a*44 flip-flop is in the 1-state. OR-gate 355 receives a binary-1 input signal from AND-gate 365, which is enabled by the C*sr*1 and C*su*1 flip-flops, which are both in the 1-state in the clock period following that in which the C*sr*1 flip-flop is set to the 1-state. The output signal of OR-gate 355 therefore enables the transfer of the R*b*14 flip-flop to the 0-state upon the application of the SR*b* clock signal.

OR-gate 355 also receives on one input lead thereof a binary-1 output signal from AND-gate 375, if the C*sr*2 and C*su*2 flip-flops are both in the 1-state. Therefore, the output signal of OR-gate 355 may be represented as:

$$(40)\qquad Csr1\ Csu1+Csr2\ Csu2$$

The output signal of OR-gate 355 is also delivered on output lead 383 to OR-gates 431 and 445 of the Read Buffer shift timer (FIG. 15). The signal on output lead 446 of OR-gate 445 gates the SR*b* clock driver. Therefore, in the clock period immediately following the setting of the C*sr*1 flip-flop to the 1-state, AND-gate 365, which is enabled at that time by the 1-output signal of the C*su*1 flip-flop, delivers a binary-1 output signal through OR-gate 355 of FIG. 13 and OR-gate 445 of FIG. 15 to the SR*b* clock pulse driver. This gate signal G-SR*b* driving the SR*b* clock pulse driver is the first occurring pulse illustrated in the last waveform of FIG. 20.

After the first clock period following the setting of the C*sr*1 flip-flop, the C*su*1 flip-flop is reset, so that no further output signal is delivered by OR-gate 355 during the instant character digit transfer. The 0-logic input lead of the C*su*1 flip-flop (FIG. 14) receives directly the 1-output signals of the C*sr*1 flip-flop. Thus, the resetting of the C*su*1 flip-flop may be represented as:

$$(41)\qquad {}^*\overline{Csu1}=Csr1$$

Therefore, only one clock pulse of the SR*b* clock pulse driver is initiated by the C*sr*1 C*su*1 logical combination. This single clock pulse may be designated as the presetting clock pulse, inasmuch as its sole function is to preset the R*b*14 flip-flop to the 0-state by cooperation with the output signal of OR-gate 355. When the forbidden digit combination 1111 is detected in the Central Processor, the system will halt. However, it is preferable that the system does halt upon detection of an error caused by entering data from a Character Reader. Therefore, it is necessary to prevent the digit configuration 1111 from entering the R*b*-register. The initial presetting of the R*b*14 flip-flop to the 0-state prevents a 1111 digit configuration in the R*b*-register. The data transmitted to the R*b*13–R*b*11 flip-flops during this presetting clock period is meaningless. In later clock periods, when the true contents of the R*a*4 flip-flops are transferred to the R*b*1 flip-flops, the 0-bit will be retained in the R*b*14 flip-flop if a forbidden digit is present in the R*a*4 flip-flops. OR-gate 380 will only present a binary-0 output signal and, consequently, AND-gate 361 will remain disabled and prevent the setting of the R*b*14 flip-flop to the 1-state. If, however, a proper digit is in the R*a*4 flip-flops, either (*a*) one of the R*a*43, R*a*42, or R*a*41 flip-flops will be in the 0-state so as to enable AND-gate 361, or (*b*) if all of the R*a*43, R*a*42, and R*a*41 flip-flops are in the 1-state, the R*a*44 flip-flop will be in the 0-state and, consequently, a correct representation of the digit in the R*a*4 flip-flops will be transmitted to the R*b*1 flip-flops. In summary, therefore, the presetting of the R*b*14 flip-flop to the 0-state provides, upon the subsequent transmittal of the contents of the R*a*4 flip-flops to the R*b*1 flip-flops, that all character digits will be transmitted correctly except the forbidden digit, which will be transmitted as the 0111 digit representing an error as described previously.

Following the initial presetting of the R*b*14 flip-flop after receipt of a character in the R*a*4 flip-flops, six SR*b* clock pulses are applied to the R*b*-register to shift to the right therein (FIG. 13) the digit contents of the R*a*4 flip-flops. The register transfers between adjacent ones of the R*b*1–R*b*6 digit positions of the R*b*-register are not shown, but the symbolic application of an SR*b* clock signal is to be presumed as shifting the contents one digit position to the right. Thus, the character digit in the R*a*4 flip-flops is transmitted into all digit positions of the R*b*-register except the most significant, or condition, digit position.

Following the presetting clock pulse of the SR*b* clock pulse driver the T*r*-counter of the shift timer (FIG. 15) controls the issuance of the subsequent SR*b* clock pulses. Immediately prior to the time when a character is read, the T*r*-counter is in its 0-state; i.e., all of the five flip-flops T*r*1–T*r*5 thereof are in their respective 0-states. Upon receipt of a character by the R*a*4 or R*a*3 flip-flops, the corresponding one of the C*sr*1 or C*sr*2 flip-flops is set to the 1-state, thereupon providing a 1-output signal from OR-gate 355 of the Read Buffer of FIG. 13. This 1-output signal, as has been described above, is applied to OR-gate 431 of the shift timer (FIG. 15) and also to OR-gate 445 to cause generation of the presetting SR*b* clock pulse. The output signal of OR-gate 431 sets the T*r*1 flip-flop to the 1-state and the shift timer enters the designated 1-state thereof. The T*r*-counter thereupon automatically counts through seven additional distinct states, returning to the 0-state from which it started. The eight different states of the T*r*-counter are illustrated in sequential order in the following table:

| State | Tr5 | Tr4 | Tr3 | Tr2 | Tr1 | Clock |
|---|---|---|---|---|---|---|
| 0 | 0 | 0 | 0 | 0 | 0 | }SR*b* |
| 1 | 0 | 0 | 0 | 0 | 1 | |
| 2 | 1 | 1 | 1 | 1 | 1 | SB*b* |
| 3 | 1 | 1 | 1 | 0 | 1 | SB*b* |
| 4 | 1 | 0 | 1 | 1 | 1 | SB*b* |
| 5 | 1 | 0 | 1 | 0 | 1 | SB*b* |
| 6 | 1 | 0 | 1 | 1 | 0 | SR*b* |
| 7 | 0 | 0 | 1 | 1 | 1 | SR*b* |
| 0 | 0 | 0 | 0 | 0 | 0 | |

In the rightmost column of the table, the time of generation of the SR*b* clock signals is denoted. The first SR*b* clock signal between the 0-state and the 1-state of the counter is the presetting clock pulse generated in response to the output signal of OR-gate 355 of the Read Buffer, the signal which causes the Tr-counter to enter the 1-state.

The logical circuits of FIG. 15 which cause the Tr-counter to enter its first state and then count automatically through seven additional states may be represented as:

$$(42)\quad {}^{*}Tr1=\overline{Tr1}\;Tr2+Csr1\;Csu1+Csr2\;Csu2$$
$${}^{*}\overline{Tr1}=Tr1\;Tr2\;\overline{Tr5}+\overline{Tr2}\;\overline{Tr4}\;Tr5$$
$${}^{*}Tr2=Tr1\;\overline{Tr2}$$
$${}^{*}\overline{Tr2}=Tr1\;Tr2$$
$${}^{*}Tr3=Tr1\;\overline{Tr3}$$
$${}^{*}\overline{Tr3}=Tr2\;\overline{Tr4}\;\overline{Tr5}$$
$${}^{*}Tr4=Tr1\;\overline{Tr2}\;\overline{Tr5}$$
$${}^{*}\overline{Tr4}=Tr1\;\overline{Tr2}\;Tr5$$
$${}^{*}Tr5=Tr1\;\overline{Tr2}\;\overline{Tr3}$$
$${}^{*}\overline{Tr5}=\overline{Tr1}\;\overline{Tr4}\;Tr5$$

In addition to the signal on line 383 which is applied to OR-gate 445 to generate the presetting G-SRb gating signal, the 1-output signal of the Tr3 flip-flop is applied to OR-gate 445. Therefore, at the end of each clock period in which the Tr3 counter is in the 1-state, a G-SRb gating signal and consequent SRb clock pulse is delivered. The Tr3 flip-flop is shown to be in its 1-state during the second through seventh states of the Tr-counter. Therefore, six consecutive SRb clock pulses are delivered by the SRb clock pulse driver. The six consecutive clock pulses are applied to the Rb-register (FIG. 13) and transfer the contents of the Ra4 flip-flops, providing the Csr1 flip-flop is in its 1-state, to all six least significant digit positions of the Rb-register. If the Csr2 flip-flop is in the 1-state, the contents of the Ra3 flip-flops are transferred to the six least significant digit positions of the Rb-register. Therefore, at the conclusion of the Tr-counter cycle, when the counter re-enters its 0-state, each of the six least significant digit positions of the Rb-register contain the character digit. The generation of the SRb clock signal may be represented as:

$$(43)\quad G\text{-}SRb=Csr1\;Csu1+Csr2\;Csu2+Tr3$$

As was pointed out previously, the mod-bits of each numeric word in Memory, and consequently of each word transferred thereto, must have the configuration required to make the modulo-3 of the entire seven digits of the word equal to 1. Since six like digits are entered into the Rb-register from Character Reader #1 or Character Reader #2, the modulo-3 of such six digits is always 0 regardless of the value of the digits. Therefore, the modulo-3 of the two mod-bits of the data word in the Rb-register must be 1, if the designator and sign bits are each 0. To satisfy such requirement, when data is to be transferred from a Character Reader to the Read Buffer, the sign and designator flip-flops of the Rb-register are each set to 0, the Rbm2 flip-flop is set to the 0-state, and the Rbm1 flip-flop is set to the 1-state, these flip-flops remaining in such states during the reading of one entire line of data from the document. Therefore, the condition digit position (most significant digit) of the Rb-register is set to the 0001 state during execution of the corresponding Instruction 65. The output of OR-gate 385 is applied to the respective 0-logic input leads of the Rbd, Rbs, and Rbm2 flip-flops and to the 1-logic input lead of the Rbm1 flip-flop. When an Instruction 65 causes issuance of the Rebd signal to provide for the reading of characters from Character Reader #1, this signal is applied on lead 184 to OR-gate 385 and causes the initial setting of the condition digit flip-flops as described. When as Instruction 65 causes the issuance of the Chad2 signal to provide for the reading of characters from Character Reader #2, this signal is applied on lead 186 to OR-gate 385 and similarly presets the condition digit flip-flops. The presetting of the condition digit flip-flops may be represented by:

$$(44)\quad {}^{*}\overline{Rbd}=Rebd+Chad2$$
$${}^{*}\overline{Rbs}=Rebd+Chad2$$
$${}^{*}\overline{Rbm2}=Rebd+Chad2$$
$${}^{*}Rbm1=Rebd+Chad2$$

*Transfer of character digit from two character readers*

There will be now described the mode of operation of the Read Buffer when both Character Readers #1 and #2 are concurrently supplying data thereto. An interlocking feature is provided to prevent the transfer of two different character digits into the Rb-register of the Read Buffer simultaneously. This interlocking feature is provided primarily by the Cop, Csr1, and Csr2 flip-flops. As was shown previously in connection with Equations 37 and 38, the Csr1 flip-flop is set to the 1-state upon the transfer of a character digit to the Ra4 flip-flops of the Read Buffer, providing the Csr2 flip-flop is not already in the 1-state, upon the Cop flip-flop entering the 1-state. Similarly, the Csr2 flip-flop is set to the 1-state when a character digit enters the Ra3 flip-flops, providing the Csr1 flip-flop is not already in the 1-state, upon the Cop flip-flop entering the 0-state. Equations 37 and 38 are repeated here for convenience:

$$(37)\quad {}^{*}Csr1=Cop\;Cha1\;Csu1\;\overline{Csr2}\;\overline{IYcp1}\;(\overline{Ra44}+\overline{Ra43}+\overline{Ra42}+\overline{Ra41})$$

$$(38)\quad {}^{*}Csr2=\overline{Cop}\;Cha2\;Csu2\;\overline{Csr1}\;\overline{IYcp2}\;(\overline{Ra34}+\overline{Ra33}+\overline{Ra32}+\overline{Ra31})$$

Each of flip-flops Csr1 and Csr2, when once set to the 1-state thereof, remains in that state until the corresponding character digit is transferred from the corresponding Ra4 or Ra3 flip-flops through the Rb-register to Memory. Only when the character digit is actually gated to the Memory is the corresponding Csr1 or Csr2 flip-flop reset.

Consider first the operation of the Read Buffer (FIG. 13) when a character digit is received from Character Reader #2 while a character from Character Reader #1 is in the Rb-register and has not yet been transferred to Memory.

It was earlier shown that the Csr1 flip-flop controls the gating of the character in the Ra4 flip-flops to the Rb-register and that the Csr2 flip-flop controls the gating of the character in the Ra3 flip-flops to the Rb-register. Therefore, when the digit from Character Reader #2 arrives, the Csr1 flip-flop is in the 1-state and disables setting of the Csr2 flip-flop to the 1-state. The path of data transfer between the Ra3 flip-flops and the Rb-register remains blocked by the absence of the 1-state of the Csr2 flip-flop. When, finally, the contents of the Rb-register are transferred to Memory, the Csr1 flip-flop is reset to the 0-state, thereby enabling setting of the Csr2 flip-flop. When the free-running Cop flip-flop next enters the 0-state, the Csr2 flip-flop will set to the 1-state and enable the transfer of the contents of the Ra3 flip-flops into the Rb-register.

Consider, next, the operation of the Read Buffer when characters are received simultaneously from both Character Reader #1 and #2. The respective character digits from Character Reader #1 and Character Reader #2 are each entered in the corresponding set of Ra4 and Ra3 flip-flops. The change to the 0-state of at least one of the flip-flops of the Ra4 group and at least one of the flip-flops of the Ra3 group immediately enables the setting of the respective Csr1 and Csr2 flip-flops. Inasmuch as both such flip-flops are in the 0-state, neither inhibits the setting of the other at this time. Consequently it is only the Cop free-running flip-flop that determines which character digit shall be first transmitted to the Rb-register. If, upon the simultaneous entry of the character digits into the Ra4 and Ra3 flip-flops, the next state of the Cop flip-flop is the 1-state, the Csr1 flip-flop will be set to the 1-state, thereby disabling setting of the Csr2 flip-flop and providing first transfer of the contents of the Ra4 flip-flops to the Rb-register and subsequently to Memory. If, on the other hand, such next state of the Cop flip-flop is the 0-state, the Csr2 flip-flop will set to the 1-state, thereby disabling setting of the Csr1 flip-flop and providing first transfer of the contents of the Ra3 flip-flops to the Rb-register. By such operation, the free-running Cop flip-flop and the Csr1 and Csr2 flip-flops provide an interlocking feature so that only one character digit may be transferred to the Rb-register even though both Character Readers are simultaneously providing character digits, and continue the interlock so long as the transferred character digit is in the Rb-register and has not yet further transferred to Memory.

*Transfer of data from read buffer to memory*

The operations in this section relate to the transfer of the contents of the Rb-register of the Read Buffer to Memory. At the time that a character digit is in the Rb-register and ready for transfer to Memory, certain flip-flops are in the 1-state, as described heretofore:

When the character digit has been supplied by Character Reader #1, the following flip-flops are in the 1-state: Cfs1, Cha1, Ckp1, and Csr1;

When the character digit has been supplied by Character Reader #2, the following flip-flops are in the 1-state: Cfs2, Cha2, Ckp2, and Csr2.

Character digits are received by the Rb-register while the Central Processor is executing its normal sequence of programmed operations. From time to time, the Central Processor will interrogate the Read Buffer to determine if a character digit is in the Rb-register and ready for transfer to Memory. Interrogation signals are provided during each operation executed by the Central Processor. These interrogation signals must be generated at a time when the Central Processor can tolerate the transfer of data from the Rb-register to Memory; i.e., when the Central Processor will not be communicating with the Memory. Accordingly, the interrogation signals are provided in two different situations: (*a*) in the first situation, an interrogation signal is generated during the execution of an instruction wherein access to the Memory by the Central Processor will not be required for a length of time sufficient for a transfer of the contents of the Jr-register to Memory to be completed; (*b*) in the second situation, an interrogation signal is generated near the conclusion of execution of an instruction so that, if data is found ready in the Rb-register, the Central Processor can discontinue executing the normal sequence of operations at the end of such instruction to admit data to Memory from the Rb-register. Inasmuch as the second situation is most common, it will be the situation described in the instant embodiment. For further details of the transfer of data from the Rb-register to the Memory in the first situation, reference should be made to the aforementioned U.S. Patent 3,077,984.

The interrogation signal is the 1-output signal of the Ti flip-flop of the Central Processor (FIG. 7) and interrogation is provided when such output signal represents a binary 1. The Ti flip-flop is set to the 1-state when OR-gate 202 applies a binary-1 signal thereto. OR-gate 202 receives input signals from two sources. One source 204, shown generally in FIG. 7, but in more detail in the aforementioned U.S. Patent 3,077,984, responds to the current instruction command number present in the C-register and to the sequencer output signals to provide a binary-1 output signal when the sequencer T-counter is in the $T=3$ state and the current instruction is near its conclusion. When source 204 provides such binary-1 output signal, the Ti flop-flop is set to the 1-state. AND-gate 203 is the second source from which OR-gate 202 receives input signals to set the Ti flip-flop. The instance in which the Ti flip-flop is set by signals from AND-gate 203 will be described later. The setting of the Ti flip-flop may be represented as:

(45) $$*Ti=\overline{C63}\,\overline{C62}\,\overline{Am}\,Ta3+\text{Signals at } T=3 \text{ of other commands}$$

Accordingly, the Ti flip-flop enters the 1-state when the T-counter is in the $T=4$ state near the conclusion of an instruction of the normal sequence being executed by the Central Processor. When the Ti flip-flop is its 1-state, the Csr1 and Csr2 flip-flops are interrogated to see if either one is in the 1-state, denoting that the Rb-register holds a data word ready for transfer to Memory. The Ti flip-flop remains in the 1-state for only one clock period, returning to the 0-state in the next clock period following that in which it was set to the 1-state, as follows:

(46) $$*\overline{Ti}=Ti$$

Accordingly, the interrogation signal is but one clock period in duration.

The 1-output interrogation signal of the Ti flip-flop is applied to one input lead of AND-gate 206 of the Central Processor control portion (FIG. 7). The other input lead of AND-gate 206 is enabled at this time by the 0-output signal of the Jm20 flip-flop, which is normally in the 0-state. Consequently, the interrogation signal causes AND-gate 206 to deliver a binary-1 output signal that is applied to AND-gates 205 and 207. AND-gate 205 also receives the output signal of OR-gate 235. OR-gate 235 receives the 1-output signals of the Csr1 and Csr2 flip-flops on respective leads 417 and 418. Consequently, AND-gate 205 provides an interrogation function upon receipt of a binary-1 signal from AND-gate 206, to determine whether a character digit is present in the Rb-register; and, if there is a character digit present in the Rb-register, either the Csr1 or the Csr2 flip-flop will supply a binary-1 signal through OR-gate 235 enabling AND-gate 205 to delivery a binary-1 output signal. The output signal of AND-gate 205 is designated as the Pur signal and may be represented as:

(47) $$Pur=Ti\,\overline{Jm20}\,(Csr1+Csr2)$$

Therefore, if the Pur signal becomes a binary 1 during execution of a normal instruction, it signals that the Rb-register contains a data word for transfer to Memory. Consequently, when such Pur signal becomes a binary 1, an operation is initiated to cause the Central Processor to discontinue executing the normal sequence of instructions at the end of the current instruction in order to transfer the contents of the Rb-register to Memory. The sequence of operations of the system following a successful interrogation ($Pur=1$) may be summarized by the following chart:

Rb-REGISTER TO MEMORY DATA TRANSFER—Clc1 OFF

| Clock period | Flip-flops | Signals | Functions |
|---|---|---|---|
| T=4 | Csr1, Ti | Pur, *Am, *Jm20, XAAr, *$\overline{Ti}$ | Pur sets A-reg. to 0004. XNA inhibited. |
| T=5 | Am, Jm20 | Mca | |
| T=6 | | | Address ($M_A$) at 0004 location in Memory to M-register. |
| T=7 | | | |
| T=8 | | End, *Clc1 | Programmed Operation terminates. |
| Ta1 | Clc1 | XMJ, Mcb, Cau | C-reg. forced to 51, 55, or 56. |
| Ta2 | | XMA, *$\overline{Jm20}$ | Original contents ($M_A$) of 0004 location restored unchanged. |
| Ta3 | | | New address ($M_A$) in A-reg. *Ti inhibited by Am. |
| Ta4 | | *Jr | |
| Ta5 | Jr | Mca | |
| Ta6 | | | Addressed Memory location ($M_A$) cleared. |
| Ta7 | | | |
| Ta8 | | End | |
| Ta1 | | *$\overline{Am}$, Cau, *$\overline{Csr1}$ Mca, Mwt | Mwt gates contents of Rb-reg. to M-reg. |
| Ta2 | | | M-reg. contents to addressed Memory location ($M_A$). |
| Ta3 | | *Ti | |
| Ta4 | Ti | *$\overline{Ti}$, *$\overline{Jr}$, XNA | Next-instruction address to A-register. |
| Ta5 | | Mca | |
| Ta6 | | | Next instruction from Core Memory to M-register. |
| Ta7 | | | |
| Ta8 | | End | |
| | | | Normal program sequence continues ↓ |

The operations diagrammed in the preceding chart are predicated on the assumption that when the Pur signal became a binary 1 to initiate such operations the Csr1 flip-flop was in the 1-state and the Clc1 flip-flop was in the 0-state. If, however, Character Reader #2 had a character digit in the Rb-register, so that the Csr2 flip-flop would have been in the 1-state, the operation would be similar to that tabulated, providing the corresponding Clc2 flip-flop were in the 0-state when the operation commenced. The significance of the Clc1 and Clc2 flip-flops will be described later.

The issuance of the Pur signal as a binary-1 signal from AND-gate 205 initiates several new signals at this time to cause the interruption of the program. Thus, the Pur signal, which is applied directly to the 1-logic input leads of the Am and Jm20 flip-flops, initiates setting of each of these flip-flops to the 1-state as follows:

(48) $$*Am=Pur$$

(49) $$*Jm20=Pur$$

The Pur signal is also applied to inverter 208, and the output signal of inverter 208 is applied to AND-gate 207. Thus, AND-gate 207 is disabled when the Pur signal becomes a binary 1, so that the output signal G-XNA thereof and the consequent clock pulse of the XNA clock pulse driver do not issue at this time. As has been shown heretofore in connection with the execution of Instructions 58 and 65, the shift signal XNA normally issues in the fifth clock period prior to the end of execution of a normal command in order to gate to the A-register from the N-register of the Central Processor the address of the next instruction of the normal sequential program to be executed. Instead, in this instance, the next-instruction address is not gated to the A-register, but is retained in the N-register. The inhibiting effect of the Pur signal on the generation of the XNA shift signal is illustrated in the preceding Equation 17.

Therefore, upon the issuance of the Pur signal, instead of the next-instruction address being transferred to the A-register, the contents of the A-register are forced by the Pur signal to the address of a Memory storage location which, in turn, holds the address of the Memory location wherein the next character from the Character Reader is to be inserted. Thus, in FIG. 6, the Pur signal supplied on lead 212 (FIG. 7) is applied directly to the 0-logic input leads of the A12 and A11 flip-flops and sets these two flip-flops to the 0-state. If Character Reader #1 supplied the character digit then present in the Rb-register, the consequent 1-output signal of the Csr1 flip-flop enables AND-gates 152 and 153. Therefore, the Pur signal which is also applied to AND-gates 152 and 153 causes issuance of a binary-1 output signal therefrom. Since the output lead of AND-gate 152 is connected to the 0-logic input lead of the A14 flip-flop and the output lead of AND-gate 153 is connected to the 1-logic input lead of the A13 flip-flop, binary-1 output signals from these two AND-gates cause the resetting of the A14 flip-flop and the setting of the A13 flip-flop.

Therefore, the Pur signal forces the digit 4 into the A1 flip-flops of the address register, if Character Reader #1 has a character in the Rb-register. If, however, the character in the Rb-register has been supplied by Character Reader #2, the consequent 1-output signal of the Csr2 flip-flop enables AND-gates 151 and 154. Therefore, in such instance, the Pur signal, which is also applied to AND-gates 151 and 154, causes the issuance of a binary-1 output signal therefrom. Since the output lead of AND-gate 151 is connected to the 1-logic input lead of the A14 flip-flop and the output lead of AND-gate 154 is connected to the 0-logic input lead of the A13 flip-flop, binary-1 output signals from these two AND-gates cause the setting of the A14 flip-flop and the resetting of the A13 flip-flop. Therefore, the P*ur* signal forces the digit 5 into the A1 flip-flops of the address register, if the character in the R*b*-register is provided by Character Reader #2. The P*ur* signal is also applied on lead 212 to all of the A4, A3, and A2 digit position flip-flops of the A-register (FIG. 4) and functions to clear, or reset to the 0-state, these twelve flip-flops. The effect of the P*ur* signal on the flip-flops of the A-register may be represented as:

(50)
$$*A14=Pur\ Csr2$$
$$*\overline{A14}=Pur\ Csr1$$
$$*A13=Pur\ Csr1$$
$$*\overline{A13}=Pur\ Csr2$$
$$*\overline{A12}=Pur$$
$$*\overline{A11}=Pur$$
$$\#\overline{A2(i)}=Pur$$
$$\#\overline{A3(i)}=Pur$$
$$\#\overline{A4(i)}=Pur$$

Therefore, upon the issuance of the P*ur* signal, the contents of the A1 register are set to 0004 if a character is being supplied from Character Reader #1 and to 0005 if a character is being supplied from Character Reader #2. The contents of the 0004 storage location in Memory represents the address of the location in Memory to receive the next character digit from Character Reader #1. Similarly, the contents of storage location 0005 in Memory represents the address of the storage location in Memory to receive the next character digit from Character Reader #2. The instant invention is not limited to the employment of these two specific locations to store the address locations for receipt of character digits from the Character Readers; instead, it is within the scope of this invention to employ any predetermined locations in Memory to hold the addresses of the next data words to be transferred from the R*b*-register.

Finally, the P*ur* signal is applied to OR-gate 214 and causes the issuance of a binary-1 output signal on lead 215 therefrom, this output signal representing the gating signal G-XAA*r* which is applied to the XAA*r* clock pulse driver. The issuance of the G-XAA*r* signal may be represented as:

(51) $$G\text{-}XAAr=Jr\ (T=2)+Pur$$

The XAA*r* clock pulse gates the contents of the A-register to the A*r*-register of the Central Processor (FIG. 4). The XAA*r* clock signal is effective during those instructions wherein the first situation above referred to prevails; that is, when the Central Processor may continue executing its normal sequence of instructions without requiring access to the Memory, so that transfer of the contents of the R*b*-register to the Memory may be effected without interruption of the normal program. It is desirable in such instructions to retain the initial address present in the A-register for employment after the R*b*-register contents have been transferred to the Memory. Therefore, this initial address is preserved by transfer to the A*r*-register at the same time that the contents of the A*r*-register are forced to the 0004 or 0005 representation.

In the clock period next following issuance of the P*ur* signal, the A*m* and J*m*20 flip-flops enter the 1-state and remain therein for several succeeding clock periods. At the same time, the M*ca* signal issues on lead 139 (FIG. 5), causing the Memory to execute Memory cycle-A and to transfer the contents of storage location 0004, designated by the A-register, to the M-register, where such contents are available at the end of Memory cycle-A.

The T-Counter continues through its $T=6$ and $T=7$ states and enters the $T=8$ state, wherein the E*nd* signal of the sequencer (FIG. 8) issues to denote the termination of the instruction being executed and the entry of the sequencer upon a new cycle, this new cycle being one in which an operation is commenced to transfer the contents of the R*b*-register to Memory. As pointed out previously, a new sequencer cycle is initiated by setting the T1 flip-flop to the 1-state when the E*nd* signal issues.

During the clock period when the E*nd* signal issues, the C*lc*1 flip-flop (FIG. 7) is set to the 1-state. AND-gate 236 applies the output signal thereof to the 1-logic input lead of the C*lc*1 flip-flop. One input lead of AND-gate 236 is enabled by the 0-output signal of the C*lc*1 flip-flop, which was assumed to be in the 0-state thereof at the beginning of the instant operation. A second input lead of AND-gate 236 is enabled by the coincidence of the 1-states of the A*m* and J*m*20 flip-flops, as represented by the binary-1 output signal of AND-gate 243, which receives the 1-output signals of these two flip-flops. A third input lead of AND-gate 236 is enabled by the 1-output signal of the C*sr*1 flip-flop delivered on lead 417. Thus, when the T-Counter enters the $T=8$ state, the fourth input lead of AND-gate 236 receives a binary-1 signal and the enabled AND-gate 234 causes the C*lc*1 flip-flop to set as follows:

(52) $$*Clc1=Csr1\ Am\ Jm20\ \overline{Clc1}\ (T=8)$$

In a similar manner, had the C*lc*2 flip-flop been in the 0-state and a character been received from Character Reader #2, so that the C*sr*2 flip-flop were in the 1-state, the C*lc*2 flip-flop would have been set to the 1-state when the signal E*nd* occurred, as follows:

(53) $$*Clc2=Csr2\ Am\ Jm20\ \overline{Clc2}\ (T=8)$$

The sequencer now enters the first clock period of the new cycle, designated T*a*1. Three significant signals issue; namely, the XMJ, M*cb* and C*au* signals. The XMJ shift signal transfers a representation of the contents of the M-register of Memory to the J-register of the Central Processor. However, the contents of the J-register are not employed in this operation, so this signal is ineffective. The generation of the XMJ clock signal is described in connection with previous Equation 9. The M*cb* signal is applied to the Memory to initiate Memory cycle-B, wherein the original contents of storage location 0004, which are now in the M-register, are restored to the 0004 location in the Core Memory. The generation of the M*cb* signal is described in connection with previous Equation 10. The C*au* signal is applied to the A-register and increases the numerical value of the address therein by the quantity 1. However, this modified quantity is not employed in the instant operation. The generation of the C*au* signal is described in connection with the preceding Equation 11.

Additionally, during the T*a*1 clock period, a signal is generated to force the command register to assume a configuration which will, for the duration of the instant operation, control the transfer of the contents of the R*b*-register to Memory. The generation of such signal is provided by AND-gate 133 (FIG. 5). AND-gate 133 delivers a binary-1 output signal when the 1-output signal of the T1 flip-flop, received on one input lead, represents a binary 1, the other input lead of AND-gate 133 being enabled by the 1-output signal of the J*m*20 flip-flop, the J*m*20 flip-flop being in the 1-state during this T*a*1 clock period. The output signal of AND-gate 133 is applied to the 1-logic input lead of the C64 flip-flop and to the 0-logic input leads of the C63, C62, and C61 flip-flops. Therefore, the digit 5 is forced into the C6 flip-flops by the binary-1 output signal of AND-gate 133. The output signal of AND-gate 133 is also applied to one input lead of AND-gate 134 and to the 0-logic input leads of the C53 and C52 flip-flops. The other input lead of AND-gate 134 receives the 0-output signal of the C51 flip-flop. The output lead of AND-gate 134 is connected to the 1-logic input lead of the C54 flip-flop. Therefore, the binary-1 output signal of AND-gate 133 forces the C5 flip-flops to represent the digit 1 if the C54 flip-flop was formerly in the 0-state and the C51 flip-flop was in the 1-state; the digit 5 if the C51 flip-flop was formerly in the 0-state; and the digit 6 if both the C54 and C51 flip-flops were formerly in the 1-state. Therefore, during T$a$1 the C-register is forced to store the code 51, 55 or 56 for the duration of the instant operation. The code insertion in the C-register at this time may be represented as:

(54)
$$*C64=Jm20\ T1$$
$$*\overline{C63}=Jm20\ T1$$
$$*\overline{C62}=Jm20\ T1$$
$$\overline{C61}=Jm20\ T1$$
$$*C54=Jm20\ T1\ \overline{C51}$$
$$*\overline{C53}=Jm20\ T1$$
$$\overline{C52}=Jm20\ T1$$

Since the C6 flip-flops now store the digit 5, the C63 and C62 flip-flops are both in the 0-state. Consequently, AND-gate 136 (FIG. 5), which receives on the two input leads thereof the 0-output signals of the C63 and C62 flip-flops, delivers a binary-1 output signal on output lead 141. It is this signal on lead 141 which is largely instrumental in controlling the sequence of steps executed during the instant operation.

During the next clock period (T$a$2), two significant signals issue; anmely, the XMA and $*\overline{Jm20}$ signals. The XMA shift signal is applied to register transfers 110 of FIG. 4 and gates the address portion of the contents of the M-register, which was obtained from the 0004 location in Memory, to the address portion of the I-register 102; i.e., the A-register. The XMA signal is delivered by the XMA clock pulse driver upon application of the G-XMA signal thereto. The generation of the G-XMA gating signal is shown in FIG. 7. The G-XMA signal issues on output lead 227 of AND-gate 226, upon the application to AND-gate 226 of the $T=2$ output signal of the T-counter, AND-gate 226 being enabled at this time by the 1-output signal of the J$m$20 flip-flop. The generation of the G-XMA signal may be represented as:

(55) $$G\text{-}XMA=Jm20\ (T=2)$$

The output signal delivered by AND-gate 211 (FIG. 7) is applied to the 0-logic input lead of the J$m$20 flip-flop. AND-gate 211 delivers a binary-1 output signal upon receipt of the $T=2$ output signal of the T-counter, AND-gate 211 being enabled at this time by the 1-output signal of the A$m$ flip-flop. The generation of the output signal of AND-gate 211 may be represented as:

(56) $$*\overline{Jm20}=Am\ (T=2)$$

Therefore, following the first T$a$2 clock period of the instant operation, the J$m$20 flip-flop has been reset, the A$m$ flip-flop remains set, the C-register contains the command 51, 55, or 56, and the A-register contains the address that was stored in Memory location 0004, this address representing the location in Memory wherein the data word in the R$b$-register is to be transferred.

During the next-occurring T$a$4 clock period, the *J$r$ signal issues to set the J$r$ flip-flop. The J$r$ flip-flop (FIG. 7) is set to the 1-state upon delivery of a binary-1 output signal from AND-gate 209. AND-gate 209 delivers a binary-1 output signal upon receipt of the $T=4$ output signal of the T-counter, AND-gate 209 being enabled at this time by the 1-output signal of the A$m$ flip-flop. The generation of the output signal of AND-gate 209 may be represented as:

(57) $$*Jr=Am\ (T=4)$$

During the first T$a$5 clock period, the M$ca$ signal issues (see preceding Equation 18). The M$ca$ signal initiates Memory cycle-A, wherein the contents of the address identified by the A-register contents are cleared and prepared to receive the data word in the R$b$-register.

When the sequence reaches the T$a$8 clock period, the E$nd$ signal issues, causing the sequencer to again repeat the T$a$ cycle. The signal E$nd$ is generated, as illustrated by the preceding Equation 1. As was pointed out previously, the contents of the command register provide a binary-1 signal on lead 141 to enable AND-gate 257 of the sequencer (FIG. 8). Therefore, when the T$a$8 flip-flop enters its 1-state, AND-gate 257 provides a binary-1 output signal to OR-gate 258, which in turn generates the E$nd$ signal.

During the second T$a$1 clock period of the instant operation, the following significant signals issue; namely, the $*\overline{Am}$, C$au$, $*\overline{Csr1}$, M$cb$, and M$wt$ signals. Although the C$au$ signal issues at this time, it is ineffective to influence the operation because the present contents of the A-register which are incremented thereby are not further employed. The A$m$ flip-flop is set to the 0-state upon delivery of binary-1 output signal from AND-gate 201 (FIG. 7). AND-gate 201 delivers a binary-1 output signal upon receipt of the $T=1$ signal of the T-counter, AND-gate 201 being enabled at this time by the 0-output signal of the J$m$20 flip-flop, which was earlier restored to the 0-state. Thus, the resetting of the A$m$ flip-flop may be represented as:

(58) $$*\overline{Am}=\overline{Jm20}\ (T=1)$$

The M$wt$ signal is applied to the M-register and input logic circuit 302 of the Memory (FIG. 10) and transfers into the M-register flip-flops the contents of the R$b$-register. The M$wt$ signal is generated by AND-gate 218 and supplied on output lead 219 of the control portion of the Central Processor (FIG. 7). AND-gate 218 delivers a binary-1 output signal upon application thereto of the $T=1$ output signal of the T-counter, AND-gate 218 being enabled at this time by the 1-output signal of the J$r$ flip-flop. The generation of the M$wt$ signal may be represented as:

(59) $$Mwt=Jr\ (T=1)$$

FIG. 10$a$ illustrates in detail the manner in which the M$wt$ signal gates the contents of one flip-flop of the R$b$-register into one flip-flop of the M-register. The 1-output signal of the J$r$ flip-flop is applied to and enables AND-gates 314 and 315. AND-gate 314 receives the 1-output signal of the R$b$31 flip-flop of the R$b$-register and AND-gate 315 receives the 0-output signal of the R$b$31 flip-flop. Therefore, upon the application of the M$wt$ signal during the second T$a$1 clock period of the instant operation, AND-gates 314 and 315 provide output signals representing the state of the R$b$31 flip-flop. These output signals are transmitted through respective OR-gates 312 and 313 to the respective 1-logic input lead and 0-logic input lead of the M31 flip-flop and function to set the M31 flip-flop to the state occupied by the R$b$31 flip-flop. This transfer of the contents of the R$b$-register to the M-register has been represented by the preceding Equation 8. Thus, during the second T$a$1 clock period of the instant operation, signals are generated to transfer the contents of the R$b$-register to the M-register. The Mcb signal is again generated at this time to initiate Memory cycle-B, which transfers into the addressed Memory location these new contents of the M-register.

Additionally, the $*\overline{Csr1}$ signal issues during this second Ta1 clock period. This signal functions to reset the Csr1 flip-flop, thereby providing the Ra3 flip-flops access to the Rb-register, if a digit has been transferred to the Ra3 flip-flops from Character Reader #2. The Csr1 flip-flop as noted is not returned to the 0-state until the contents of the Rb-register have been transferred to Memory, so as to prevent destruction of the contents of the Rb-register prior to this time. The Csr1 flip-flop (FIG. 14) is reset to the 1-state upon receipt of a binary-1 signal on lead 220 from the Central Processor (FIG. 7). Lead 220 is an output lead of AND-gate 218, which delivers a binary-1 output signal upon receipt of the $T=1$ signal from the T-counter, AND-gate 218 at this time being enabled by the 1-output signal of the Jr flip-flop. The output signal of AND-gate 218 may be represented as:

(60) $$*\overline{Csr1}=Jr\ (T=1)$$

The major object of the instant operation has now been executed and only certain housekeeping functions remain to be performed to enable the Central Processor to resume operating from the point in the program where it was interrupted. Thus, in the next-occurring Ta2 clock period, the clock signals XAAr and XArA issue. The shift signal XArA is applied to register transfers 108 of FIG. 4 and gates the address stored in the Ar-register 101 to the A-register. This address had been previously stored in the Ar-register when the Pur signal issued to provide means whereby the Central Processor could regain control at the proper point in certain instructions. The XArA signal is delivered by the XArA clock pulse driver upon application of the G-XArA signal thereto. The generation of the G-XArA gating signal is shown in FIG. 7. The G-XArA signal issues on output lead 217 of AND-gate 216 upon the application to AND-gate 216 of the $T=2$ signal of the T-counter, AND-gate 216 being enabled at this time by the 1-output signal of the Jr flip-flop. The generation of the G-XArA signal may be represented as:

(61) $$G\text{-}XArA=Jr\ (T=2)$$

The XAAr signal, which is also generated at this time, has no effect on the future operation of the system. The generation of this signal has been represented previously by Equation 51.

In the second Ta3 clock period of the instant operation, the *Ti signal is generated to set the Ti flip-flop. The resulting binary 1 output signal from the Ti flip-flop enables the issuance of the XNA clock signal, which, in turn, permits the Central Processor to continue its interrupted program. However, in those instances wherein the program had not been interrupted; i.e., in the first situation described earlier, the above-mentioned signal XArA provides the only required address in the A-register for the Central Processor to continue executing the instruction. The *Ti signal is generated upon delivery of a binary-1 output signal from AND-gate 203 which, in turn, transmits this binary-1 signal through OR-gate 202 to the 1-logic input terminal of the Ti flip-flop (FIG. 7). AND-gate 203 delivers a binary-1 output signal, at this time, upon receipt by an input lead thereof of the Ta3 signal from the sequencer, a second input lead of AND-gate 203 being enabled by the binary-1 signal provided on output lead 141 from the C-register (FIG. 5) and a third input lead being enabled by the 0-output signal of the Am flip-flop. The generation of the *Ti signal has been previously represented by the first expression in Equation 45.

In the next-occurring clock period; namely, the second Ta4 clock period, the $*\overline{Jr}$ and XNA signals issue. The $*\overline{Jr}$ signal resets the Jr flip-flop and is provided by AND-gate 210 (FIG. 7). AND-gate 210 receives the 1-output signal of the Ti flip-flop on one input lead and delivers a binary-1 output signal during the single clock period that the Ti flip-flop is in the 1-state, AND-gate 210 being enabled at this time by the 1-output signal of the Jr flip-flop. The generation of the output signal of AND-gate 210 may be represented as:

(62) $$*\overline{Jr}=Ti\ Jr$$

The XNA shift signal is applied to register transfers 111 (FIG. 4) and gates the address of the next-instruction in the normal program sequence from the N-register to the A-register of the Central Processor. The XNA clock pulse driver upon application of the G-XNA signal thereto. The generation of the G-XNA gating signal is shown in FIG. 7. The G-XNA signal issues on output lead 244 of AND-gate 207. One input lead of AND-gate 207 is enabled at this time by the binary-1 signal delivered by inverter 208, inasmuch as the input signal to inverter 208 represents a binary-0 at this time. The other input lead of AND-gate 207 receives a binary-1 signal from AND-gate 206, which is enabled at this time by the 0-output signal of the Jm20 flip-flop, and is caused to deliver a binary-1 output signal by the 1-output signal of the Ti flip-flop. The generation of the G-XNA signal has been represented previously by Equation 17.

In the next Ta5 clock period, the Mca signal issues to initiate another Memory cycle-A to bring the next instruction in the program sequence from the addressed Memory location identified by the A-register to the M-register.

The End signal is again generated at the next Ta8 clock period, providing the normal sequence of instructions had been interrupted. The sequencer returns to its normal first clock period and the next programmed instruction is executed.

However, had a character digit been waiting in the Ra3 flip-flops of the Read Buffer (FIG. 13) for transfer to the Rb-register during the immediately preceding Ta4 clock period when the Ti flip-flop was in its 1-state, the signal Pur would have again issued, the program would have remained interrupted, and a second operation of the type described would have been executed to transfer the new character digit to Memory.

In summary, therefore, it was assumed that the Clc1 flip-flop was in the 0-state at the commencement of the operation described. During such operation, the Clc1 flip-flop was transferred to the 1-state, the A-register was forced to represent the 0004 configuration, the address contents of the 0004 location in Memory were transferred to the A-register, and the data word in the Rb-register was transferred to the location in Memory designated by such A-register contents. At the conclusion of the operation, the contents of the 0004 Memory location had been restored unchanged and the Clc1 flip-flop remained in the 1-state. Similarly, had the operation been executed for a character digit from Character Reader #2 and had the Clc2 flip-flop been in the 0-state at the commencement of the data transfer operation, the A-register would have been forced to the 0005 configuration and the contents of the Rb-register would have been stored in the address designated by the 0005 location. Again, the contents of the 0005 location would have been restored unchanged and at the conclusion of the operation the Clc2 flip-flop would have been in the 1-state.

Consider, now, how the preceding operation would have been executed had the Clc1 flip-flop been in the 1-state at the commencement of the operation; that is, when the Pur signal issued. The following chart shows the differences between the new operation and the preceding operations.

Rb-REGISTER TO MEMORY DATA TRANSFER—Clc1 ON

| Clock period | Flip-flops | Signals | Functions |
|---|---|---|---|
| T=4 | Csr1, Ti, Clc1 | *Pur, *Am, *Jm20, XAAr, *$\overline{Ti}$ | Pur sets A-reg. to 0004 XNA inhibited. |
| T=5 | Am, Jm20 | Mca | |
| T=6 | | | Address ($M_A$) at 0004 location in Memory to M-reg. |
| T=7 | | *Atm | |
| T=8 | AtC | End, *$\overline{Clc1}$ | Programmed operation terminates. |
| T=1 | | XMJ, Mcb, Cau | C-reg. forced to 51, 55, or 56. |
| Ta2 | | XMA, *$\overline{Jm20}$ | Original contents ($M_A$) of 0004 location incremented by 2 and restored ($M_A+2$). |
| Ta3 | | Cau | New address ($M_A$) in A-reg. *Ti inhibited by Am. |
| Ta4 | | *$\overline{Atm}$, *Jr | Address ($M_A$) in A-reg. incremented by 1 to ($M_A+1$). |
| Ta5 | Jr | Mca | |
| Ta6 | | | Addressed Memory location ($M_A+1$) cleared. |
| Ta7 | | | |
| Ta8 | | End | |
| Ta1 | | *$\overline{Am}$, Cau, *$\overline{Csr1}$ Mca, Mwt | Mwt gates contents of Rb-register to M-register. |
| Ta2 | | XAAr, XArA | M-reg. contents to addressed Memory location ($M_A+1$). |
| Ta3 | | *Ti | |
| Ta4 | Ti | *$\overline{Ti}$, *$\overline{Jr}$, XNA | Next-instruction address to A-register. |
| Ta5 | | Mca | |
| Ta6 | | | Next instruction from Core Memory to M-register. |
| Ta7 | | | |
| Ta8 | | End | |
| | | | Normal program sequence continues. |

As before, the Pur signal issues in the fifth clock period preceding the end of the normal instruction sequence being executed, this Pur signal causing the setting of the Am and Jm20 flip-flops and forcing the A-register contents to the 0004 configuration. However, three clock periods later, or when the T-counter is in the $T=7$ state, the signal *Atm issues to set the Atm flip-flop (FIG. 7). The output signal of OR-gate 240 is applied to the 1-logic input lead of the Atm flip-flop. The output signal of OR-gate 240 represents a binary 1 upon receipt of a binary-1 output signal from AND-gate 241. AND-gate 241 delivers a binary 1 output signal when the $T=7$ output signal of the sequencer is applied to one input lead of AND-gate 241; a second input lead of AND-gate 241 being enabled by the 1-output signal of the Clc1 flip-flop; a third input lead being enabled by the 1-output signal of the Csr1 flip-flop, provided on lead 417; and a fourth input lead being enabled by a 1-output signal delivered from AND-gate 243. AND-gate 243 delivers a binary 1 output signal at this time since both input leads receive binary 1 input signals from the respective 1-output leads of the Am and Jm20 flip-flops. The generation of the *Atm signal may be represented as:

(63) *Atm=Csr1 Clc1 Am Jm20 ($T=7$)
+Csr2 Clc2 Am Jm20 ($T=7$)

It is the function of the Atm signal to increment the contents of the 0004 location in Memory so that later character digits provided by Character Reader #1 may occupy sequential locations in the Memory.

In the clock period after the *Atm signal issues to reset the Clc1 flip-flop. This signal, designated as the *$\overline{Clc1}$ signal, is provided by AND-gate 237 of FIG. 7. AND-gate 237 delivers an output signal representing a binary 1 upon receipt of the $T=8$ output signal of the T-counter on one input lead, a second input lead of AND-gate 237 being enabled at this time by the 1-output signal of the Clc1 flip-flop, a third input lead being enabled by the 1-output signal of the Csr1 flip-flop, and a fourth input lead being enabled by the 1-output signal of AND-gate 243. The generation of the *$\overline{Clc1}$ signal may be represented as:

(64) *$\overline{Clc1}$=Csr1 Am Jm20 Clc1 ($T=8$)

The signal Mcb issues during the Ta1 clock period, the first clock period of the new operation, and initiates a Memory cycle-B, wherein the contents of the M-register in Memory are restored to location 0004. However, at this time, the 1-output signal of the Atm flip-flop represents a binary 1. This Atm signal which is applied to the Memory (FIG. 10), now functions to enable 2-adder 306 and mod-bit adder 307 to increment the value of the address transferred back into the Core Memory location 0004 by the value 2. Therefore, the address stored in the 0004 location at the end of this Memory cycle-B will differ by 2 from the address initially therein. Consequently, at a later time when the next character digit is read from Character Reader #1, it will be stored in this new location designated in the 0004 address which, as will be shown below, is the next sequential location to that in which the present contents of the Rb-register will be stored.

The original contents of the 0004 location in Memory enter the A-register during the next Ta2 clock period. In the following clock period, the Cau signal issues. The Cau signal is applied to the A-register (FIG. 4) and functions to increment by the value 1 the contents therein.

Therefore, at the conclusion of the instant clock period, the address in the A-register will identify a location in Memory one-removed from the location identified by the original contents of the 0004 location in Memory. Thus, the instant word in the Rb-register will be stored in the next-sequential location in Memory with respect to the location in which the preceding character digit was stored. The generation of the Cau signal at this time has been previously represented by the first expression of Equation 11, the Cau signal in this instance being initiated by AND-gate 230 (FIG. 7).

In the next clock period; namely, the first Ta4 clock period, the $^*\overline{Atm}$ signal issues to reset the Atm flip-flop. The 0-logic input lead of the Atm flip-flop receives the $T=4$ output signal of the T-counter (FIG. 7). The resetting of the Atm flip-flop may be represented as:

$$(65)\qquad {}^*\overline{Atm}=(T=4)$$

The remainder of the instant operation proceeds in the manner described previously. In summary, the Clc1 flip-flop was assumed to have been in the 1-state at the commencement of the instant operation. The A-register was forced to the 0004 configuration, the address contents of the 0004 Memory location were transferred to the A-register, these contents were incremented by 2 before being restored once again to the 0004 location in Memory, the new contents of the A-register were incremented by 1, and the data word in the Rb-register was transferred to the Memory location represented by the modified A-register contents. The Clc1 flip-flop was reset during the operation.

In a similar manner, had the Clc2 flip-flop been on when a word was received from Character Reader #2, the contents of the 0005 location in Memory would have been incremented by 2 upon restoration and the contents of the A-register would have been incremented by 1 prior to transfer of the data word in the Rb-register to Memory. Therefore, the Clc2 flip-flop performs the same function for Character Reader #2 that the Clc1 flip-flop performs for Character Reader #1, each of these two flip-flops assuring that data will be transferred from the corresponding Character Reader to successive Memory locations of a corresponding group of Memory locations. Therefore, the Clc1 and Clc2 flip-flops are employed to designate alternate operations for the corresponding Character Reader wherein a data word is transferred from the Rb-register to Memory. Consider the following example. Assume that Clc1 flip-flop is off and the address contents of the 0004 Memory location are 1010. When the first character digit is received from Character Reader #1 it will be transferred to the 1010 location in the Core Memory, the 1010 address will be restored in the 0004 location and the Clc1 flip-flop will be set during the operation. When the second character digit is received from Character Reader #1 it will be transferred to the 1011 Core Memory location, because the address contents of the A-register are incremented by 1 by the action of the Clc1 flip-flop which is on at this time. When the contents of the 0004 location are restored to the Core Memory during this second operation, the address portion is incremented by 2 and is restored as 1012. The Clc1 flip-flop is cleared. Therefore, when a third character digit is received from Character Reader #1 it is transferred to the 1012 location in the Core Memory.

CONCLUSION OF DOCUMENT READING OPERATION

The Ra4 flip-flops are disabled from receiving further data from the Character Reader when the corresponding check presence flip-flop Ckp of Sorter Control Unit #1 (FIG. 18) is returned to its 0-state at the end of the single document read. The Csy2 signal, which issues by the Sorter approximately 80 milliseconds after the leading edge of the document passes the photocell of the Character Reader, enables resetting the Ckp flip-flop.

The Ckp flip-flop is reset when the output signal of AND-gate 540 becomes a binary 1. Such signal issues as a binary 1 upon application of the Csy1 signal to AND-gate 540, which is enabled at this time by signals from the respective output leads of the Yor and Yro one-shots, both one-shots being in the stable state at this time. The $^*\overline{Ckp}$ signal may be represented as:

$$(66)\qquad {}^*\overline{Ckp}=Csy2\ \overline{Yor}\ \overline{Yro}$$

Upon the resetting of the Ckp flip-flop, the Eoc1 flip-flop of the Read Buffer (FIG. 14) is set to its 1-state by the output signal of AND-gate 403.

AND-gate 403 delivers an output signal representing a binary 1 when following receipt of a binary 1 from the 0-output lead of the Ckp flip-flop on lead 536, the Cop flip-flop enters the 0-state, the 0-output signal of the free-running Cop flip-flop also being coupled to AND-gate 403. AND-gate 403 is enabled on a third input lead thereof by the 1-output signal of the Cfs1 flip-flop and on a fourth input lead by the 0-output signal of the *Eoc1 flip-flop. The #Eoc1 signal may be represented as:

$$(67)\qquad \#Eoc1=\overline{Ckp1}\ Cfs1\ \overline{Eoc1}\ \overline{Cop}$$

The Eoc1 signal then resets the Reb, Cha1 and Cfs1 flip-flops to the 0-state. The 1-output signal of the Eoc1 flip-flop is applied to and causes delivery of a binary 1 output signal from AND-gates 402 and 405. AND-gate 402 is enabled at this time by receipt of a binary 1 signal on a second input lead thereof from the 1-output lead of the Cfs1 flip-flop. A third input lead of AND-gate 402 receives the 1-output signal of the Cop flip-flop. Therefore since the Eoc1 flip-flop is set to the 1-state when the Cop flip-flop is in the 0-state, AND-gate 402 will deliver a binary 1 in the next clock period. The output signal of AND-gate 402 may be represented as:

$$(68)\qquad {}^*\overline{Cfs1}=Eoc1\ Cfs1\ Cop$$

and resets the Cfs1 flip-flop.

AND-gate 405 delivers a binary 1 output signal upon receipt of the 1-output signal from the Eoc1 flip-flop, AND-gate 405 being enabled at this time by receipt of the 1-output signal of the Cha1 flip-flop on one input lead and by receipt of the 1-output signal of the Cfs1 flip-flop on another input lead. The output signal of AND-gate 405 is applied to and resets the Reb and Cha1 flip-flops. These resetting signals may be represented as:

$$(69)\qquad {}^*\overline{Reb}=Cha1\ Cfs1\ Eoc1$$

$$(70)\qquad {}^*\overline{Cha1}=Cha1\ Cfs1\ Eoc1$$

The Eoc flip-flop immediately resets itself in the clock period following that in which it was set, by the output of AND-gate 404, which may be represented as:

$$(71)\qquad {}^*\overline{Eoc1}=Eoc1\ Cop$$

With the Cha1 flip-flop in its 0-state no further data can be gated in the Ra4 flip-flops. Similarly when the Cha2 flip-flop returns to its 0-state no further data can be gated into the Ra3 flip-flops.

Data may not again be read from a document into the Read Buffer until execution of another Instruction 65 which sets the corresponding Cha1 or Cha2 flip-flop. Thus, an Instruction 65 affects the reading of one line of data from a document of the corresponding Sorter.

*Execution of instruction 57*

This instruction controls the transmission of a digit from Memory to Sorter Control Unit #1 or Sorter Control #2, such digit designating the pocket of the corresponding Sorter wherein a document is to be inserted.

Execution of this instruction is initiated during execution of a program of sequential instructions by the Central Processor, wherein the Memory address of the particular Instruction 57 to be executed becomes the next-instruction address in the A-register as a previous instruction is being completed. A Memory cycle-A is completed during the last portion of this previous instruction and when the signal *End* occurs this new Instruction 57 occupies the M-register of the Memory. The sequencer then enters the first clock period of its cycle, wherein Instruction 57 is executed.

During the first clock period of Instruction 57, three signals issue; namely, the XMJ, *Mcb*, and *Cau* signals. The XMJ shift signal gates the new instruction word from the M-register of the Memory to the J-register 103 of the Central Processor. The *Mcb* signal initiates Memory cycle-B, wherein the representation of Instruction 57, which was transferred from a storage location in the Core Memory to the M-register during the previous Memory cycle-A, is restored to the same storage location in the Core Memory. The *Cau* signal increases the numerical value of the address in the A-register by the quantity 1 in order to provide the address for the next-sequential instruction to be derived from the Memory when execution of the present Instruction 57 is completed. Each of the XMJ, *Mcb*, and *Cau* signals is caused to issue by the 1-output signal of the T1 flip-flop, as described in connection with the preceding Equations 9, 10, and 11.

During the second clock period of Instruction 57, the XJI and XAN signals issue. The XJI signal gates the new instruction word from the J-register 103 to the I-register 102 of the Central Processor. The XAN signal gates the address of the next-sequential instruction to be executed by the Central Processor from the A-register to the N-register 104 of the Central Processor. Each of the XJI and XAN signals is caused to issue by the T*a*2 signal, as described in connection with the preceding Equations 7 and 12.

At the conclusion of this second clock period of Instruction 57 the command register contains command 57 and, therefore, command decoder 126 of FIG. 5 delivers a binary 1 on output lead 128 to control the operation of the Central Processor during the remainder of the execution period of Instruction 57. The A-register portion of I-register 102 will now contain the data configuration Y00X, which represents the four digits stored in the respective A4 to A1 digit positions of the A-register. The digit in the A4 flip-flops, denoted by the symbol Y, determines the particular one of Sorter #1 and Sorter #2 to receive the pocket decision signal. If the A41 flip-flop is in the 0-state, Sorter #1 receives the pocket decision signal and, if the A41 flip-flop is in the 1-state, Sorter #2 receives the pocket decision signal. The pocket decision signal digit in the A1 flip-flops, denoted by the symbol X, is a representation of the particular pocket to receive a document. The digits 0 to 9 in the A1 flip-flops, represented by the four bit code of Table I, control the selection of the respective 0–9 pockets of the Sorter to be controlled. For example, if pocket #1 is to be selected, the contents of A1 are 0001. If the asterisk (*) digit is present in the A1 flip-flops, the corresponding 1110 code selects the Special Sort pocket.

During the third clock period of Instruction 57, the four signals P*s*14–P*s*11 or the four signals P*s*24–P*s*21 will issue, according to the state of the A41 flip-flop of the A-register. The four signals which so issue control the resetting of the respective ones of the *Sou* flip-flops of the Sorter Control Unit selected by the A41 flip-flop. Thus, if the A41 flip-flop is in the 0-state, the S*ou*4–S*ou*1 flip-flops of Sorter Control Unit #1 of FIG. 17 are reset in accordance with the contents of the respective A14–A11 flip-flops. If the A41 flip-flop is in the 1-state, the S*ou*4–S*ou*1 flip-flops of Sorter Control Unit #2 are reset in accordance with the contents of the respective A14–A11 flip-flops.

The P*s*14–P*s*11 signals are delivered on respective ones of leads 165, 166, 167, and 168 of the Central Processor (FIG. 6) to the respective 0-logic input leads of the S*ou*4–S*ou*1 flip-flops of Sorter Control Unit #1 (FIG. 17). The P*s*14–P*s*11 signals are the respective output signals of AND-gates 157, 159, 161, and 163. The 0-output signal of the A41 flip-flop is coupled to each of AND-gates 157, 159, 161, and 163 and serves to enable these AND-gates when the A41 flip-flop is in the 0-state. Additionally, these four AND-gates are enabled by a binary 1 delivered on lead 128 when Instruction 57 is in the C-register. AND-gates 157, 159, 161, and 163 are also enabled by the respective ones of the A14, A13, A12, and A11 flip-flops which are in the 0-state. Therefore, upon issuance of the T*a*3 signal during execution of Instruction 57, such T*a*3 signal being applied to all of AND-gates 157, 159, 161, and 163, those AND-gates for which the corresponding ones of the A14, A13, A12, and A11 flip-flops are in the 0-state will deliver an output signal, representing a binary 1, provided the A41 flip-flop is in the 0-state. The generation of the P*s*14–P*s*11 signals may be represented as:

(72)
$$Ps14=(57)\ \overline{A41}\ Ta3\ \overline{A14}$$
$$Ps13=(57)\ \overline{A41}\ Ta3\ \overline{A13}$$
$$Ps12=(57)\ \overline{A41}\ Ta3\ \overline{A12}$$
$$Ps11=(57)\ \overline{A41}\ Ta3\ \overline{A11}$$

Similarly, the P*s*24–P*s*21 output signals are the respective output signals of AND-gates 156, 158, 160 and 162. Upon the issuance of the T*a*3 signal during execution of Instruction 57, those of AND-gates 156, 158, 160, and 162 for which the corresponding ones of the A14, A13, A12 and A11 flip-flops are in the 0-state, will deliver a binary 1 output signal, provided the A41 flip-flop is in the 1-state. The generation of the P*s*24–P*s*21 signals may be represented as:

(73)
$$Ps24=(57)\ A41\ Ta3\ \overline{A14}$$
$$Ps23=(57)\ A41\ Ta3\ \overline{A13}$$
$$Ps22=(57)\ A41\ Ta3\ \overline{A12}$$
$$Ps21=(57)\ A41\ Ta3\ \overline{A11}$$

The P*s*14–P*s*11 signals are applied to the 0-logic input leads of the S*ou* flip-flops of Sorter Control Unit #1 (FIG. 17), the S*ou* flip-flops having been set to the 1-state immediately prior to the issuance of the P*s*(*ij*) signals. All such S*ou* flip-flops will be reset, providing the corresponding P*s*1(*i*) signal represents a binary 1; i.e., if the corresponding A1 flip-flop is in the 0-state. The resetting of the S*ou* flip-flops of Sorter Control Unit #1 may be represented as:

(74)
$$*Sou(i)=Ps1(i)$$

where (*i*) represents corresponding ones of the S*ou* flip-flops and the P*s*14–P*s*11 signals. In a similar manner, the P*s*2(*i*) signals are applied directly to reset the S*ou* flip-flops of Sorter Control Unit #2.

Following receipt of the respective P*s*(*ij*) signals, *the* S*ou* flip-flops control the selection of the proper Sorter pocket when activated by the read out signal $\overline{Yro}$ of the Sorter Control Unit. Consider the previous example: If pocket #1 is to be selected, the digit contents of the A1 flip-flops are 0001. Therefore, the signals P*s*1(*i*) which are consequently transmitted to Sorter Control Unit #1 are 1110. These P*s*1(*i*) signals, in turn, reset the S*ou*4–S*ou*1 flip-flops to the respective 0001 states. With the S*ou* flip-flops in the 0001 state, a significant output signal is available on only the D*ec*1 line from the digit decoder 515. When the $\overline{Yro}$ read out signal enters its 0-state, the resulting signal on the D*ec*1 line controls the opening of the deflector to Sorter Pocket #1 for receipt of the document.

If an asterisk (*) is stored in the A1 flip-flops (as 1110), an output signal is generated on the D*ec*–*ss* line of the Sorter Control Unit, this output signal, in turn, directly opening the Special Sort pocket. The Reject signal is stored as a period (.) in the A1 flip-flops and provides no output from any Sorter decision line, thereby causing the document to enter the Reject pocket.

Digit decoder 515 generates appropriate pocket decision signals in response to the contents of the S*ou* flip-flops (FIG. 17), these decision signals having significance only when one represents a binary 0. The generation of the decision signals by digit decoder 515 may be represented as:

$$(75)\quad \begin{aligned}
Dec\text{-}ss&=Sou1+\overline{Sou2}+\overline{Sou3}+\overline{Sou4}+\overline{Yro}\\
Dec0&=Sou1+Sou2+Sou3+Sou4+\overline{Yro}\\
Dec1&=\overline{Sou1}+Sou2+Sou3+Sou4+\overline{Yro}\\
Dec2&=Sou1+\overline{Sou2}+Sou3+Sou4+\overline{Yro}\\
Dec3&=\overline{Sou1}+\overline{Sou2}+Sou3+Sou4+\overline{Yro}\\
Dec4&=Sou1+Sou2+\overline{Sou3}+Sou4+\overline{Yro}\\
Dec5&=Sou1+Sou2+Sou3+\overline{Sou4}+\overline{Yro}\\
Dec6&=\overline{Sou1}+Sou2+Sou3+\overline{Sou4}+\overline{Yro}\\
Dec7&=Sou1+\overline{Sou2}+Sou3+\overline{Sou4}+\overline{Yro}\\
Dec8&=\overline{Sou1}+\overline{Sou2}+Sou3+\overline{Sou4}+\overline{Yro}\\
Dec9&=Sou1+Sou2+\overline{Sou3}+\overline{Sou4}+\overline{Yro}\\
Npd&=\overline{Sou1}+\overline{Sou2}+\overline{Sou3}+\overline{Sou4}+\overline{Yro}
\end{aligned}$$

The N*pd* signal indicates no pocket has been selected and such signal is supplied to the Central Processor as an alarm.

During the fourth clock period of Instruction 57, the XNA signal issues. The XNA signal gates the next-instruction address from the N-register 104 to the A-register. The XNA signal is caused to issue by the 1-output signal of the T*i* flip-flop, as described in connection with the preceding Equation 17.

During the fifth clock period of Instruction 57, the M*ca* signal issues. The M*ca* signal initiates Memory cycle-A, wherein the next instruction, the address of which at this time is in the A-register of the Central Processor, is transferred from the addressed storage location in the Core Memory to the M-register. The M*ca* signal is caused to issue by the $T=5$ signal of the T-counter, as described in connection with preceding Equation 18.

The sequencer continues counting until the eighth clock period of Instruction 57 is reached, whereupon the E*nd* signal issues. The E*nd* signal is applied to the T1 flip-flop of the sequencer (FIG. 8) to cause a new sequencer cycle to start and the consequent execution of the next instruction, the address of such next instruction being in the M-register at the close of the instant Instruction 57. The generation of the E*nd* signal has been represented previously by Equation 1.

Therefore, Instruction 57 terminates after eight clock periods and the next instruction commences. During execution of Instruction 57, the contents of the A1 flip-flops of the A-register of the Central Processor are transmitted to Sorter Control Unit #1 or Sorter Control Unit #2 to control the insertion of a document in a corresponding pocket of the respective one of Sorter #1 or Sorter #2.

DOCUMENT READING AND SORTING

As has been described previously, the system of FIG. 1 is adapted to read data borne by documents, to process this data, and as a result of this processing to sort the documents into selected pockets of the Sorters. This reading, processsing, and sorting sequence requires several distinct operations by the system. Some of these operations have been described heretofore. Thus, the preceding sections described the structure and functions of the various components. These functions, when combined, constitute a portion of the operations of the reading, processing and sorting sequence. The section "Execution of Instruction 58" described the cooperation of the Central Processor, a Sorter Control Unit, and the corresponding Sorter in starting and stopping check feeding by such Sorter. The section "Execution of Instruction 65" described the functioning of a Sorter, the corresponding Character Reader, the corresponding Sorter Control Unit and the Read Buffer in directing the reading of one line of data from a document. The section "Execution of Instruction 57" described the operation of the Central Processor, a Sorter Control Unit, and the corresponding Sorter in directing a document into a selected Sorter pocket. The sections "Entry of Data into Read Buffer" and "Transfer of Data from Read Buffer to Memory" described the operations of a Character Reader, corresponding Sorter Control Unit, and the Read Buffer in transferring to Memory the individual digits read from a line of data on a document. The instant section is concerned with the combination of all of these operations to read and subsequently to sort documents.

The following program of instructions illustrates one scheme by which documents may be read and sorted by the system:

Inst. 58: Start Feeding Checks—Sorter #1
Inst. 58: Start Feeding Checks—Sorter #2
Inst. 65: Read Character Reader #1
Inst. 65: Read Character Reader #2
Inst. 57: Select Sorter #1 Pocket (N)
Inst. 57: Select Sorter #2 Pocket (N)
Inst. 65: Read Character Reader #1
Inst. 65: Read Character Reader #2
Inst. 57: Select Sorter #1 Pocket (N)
Inst. 57: Select Sorter #2 Pocket (N)
Continue with Instruction 65, 57 pairs until stack of documents has been sorted for each sorter.
Inst. 58: Stop Feeding Checks—Sorter #1
Inst. 58: Stop Feeding Checks—Sorter #2

Although it is not illustrated in the above program, many instructions may be executed by the Central Processor, in addition to the intervening Instructions 57, between successive Instructions 65. This intervening program is permissible because of the relatively long duration required to read a character on the document and present it in the Read Buffer for transfer to Memory, a duration in which the Central Processor and Memory are free to perform other operations.

Execution of the first Instruction 58 commands Sorter #1 to start feeding documents. Sorter #1 thereupon commences feeding single documents in sequence to the automatic reading apparatus thereof. Similarly the second Instruction 58 commands Sorter #2 to start feeding documents. An Instruction 65 is then executed to prepare the Read Buffer to accept one line of data from the first document transported past the automatic reading apparatus of Sorter #1 and to transmit this data to the Memory. A similar Instruction 65 is executed for Sorter #2. Following execution of thee instructions 65, transducers 470 scan each magnetized character on the line of information borne by the next document arriving at the automatic reading apparatus of each sorter. As each character is scanned, a characteristic waveshape is generated by transducer 470 and transmitted to the corresponding Character Reader 13. In response to this characteristic waveshape, the Character Reader provides a signal on a corresponding output line. This Character Reader output signal is encoded by the corresponding Sorter Control Unit of FIG. 17 and a corresponding four bit digit is transmitted to the Read Buffer. The Read Buffer is triggered into a Read Buffer operation upon detection of the character by the automatic reading apparatus and thereupon accepts the corresponding four bit digit delivered by the Sorter Control Unit, entering the digit into all six numeric positions of the R*b*-register in the manner described previously. At this time, the Read Buffer signals the Central Processor to enter the contents of the R*b*-register into Memory. The Central Processor thereupon interrupts its program, which it has been executing, following execution of the corresponding Instruction 65, in order to store the contents of the R*b*-register in the next memory location of the group of locations allocated to the Character Reader supplying the character. The next character is then read from the same document and a similar process is executed to store the corresponding four bit digit in Memory. Each time a character is read from a document and stored in the Read Buffer, a Read Buffer operation is executed to store the corresponding digit in the allocated Memory group.

Following storage in Memory of the character in the field position on which the particular document is to be sorted, the Central Processor analyzes this character. As a result of this analysis a corresponding Instruction 57 may be executed to transmit to the corresponding Sorter Control Unit the digit for the Sorter pocket wherein the document is to be inserted. However, this Instruction 57 need not be executed until the full line of data has been read from a document. Following transmittal of the pocket decision digit to the Sorter Control Unit, the corresponding pocket deflector of the Sorter will be opened immediately before the respective document arrives.

Immediately after the first document leaves the automatic reading apparatus of a Sorter, a corresponding second Instruction 65 will be executed to prepare the Read Buffer to accept one line of data from the second document arriving at the automatic reading apparatus of the same Sorter. The programmed sequence continues, an Instruction 65 being executed for each document of each Sorter to be read and an Instruction 57 being executed after data read from the document is processed and the proper Sorter pocket determined. Thus, a sequence of documents is read by the automatic reading apparatus of each sorter, the data read is processed by the system, and as a result of the processing, the document is directed to a pocket of the Sorter.

*Document reading operation*

There has heretofore been described in the sections "Entry of Data into Read Buffer" and "Transfer of Data from Read Buffer to Memory" the details of the operation of the Character Reader, Sorter Control Unit, and Read Buffer in transferring to Memory the individual characters read from the field of a document. There will be described herein the operation of a Sorter and Sorter Control Unit in timing and controlling the reading of such a field of characters. The ensuing description will be complemented by reference to the waveforms of FIG. 19.

Following execution of the appropriate Instruction 58, the Sorter of FIG. 16 commences feeding single documents in sequence to the automatic reading apparatus thereof. In the automatic reading apparatus, the photocell 468 senses the reference edge 25 of the document and in response thereto provides the photocell pulse, shown in the first waveform of FIG. 19. The photocell pulses are designated by number, to correspond to the reference edges of the first, second, third and fourth documents arriving at the photocell. After being sensed by photocell 468, the documents pass magnet 469, where the magnetizable characters of the field thereon are magnetized prior to being read. The documents then pass transducer 470, which senses the magnetic field of each character in the field, and thereupon delivers a characteristic waveshape for each magnetized character. Character Reader 13 analyzes each waveshape, and if it is recognizable as being derived from one of the characters to be identified by the Character Reader, a corresponding output signal is provided on one of the output lines thereof. This Character Reader output signal is encoded by the corresponding Sorter Control Unit of FIG. 17 into the complementary four-bit code and transmitted to the Read Buffer. The above-described operations will occur following execution of an Instruction 58, whether or not a corresponding Instruction 65 has been executed to prepare the Read Buffer to accept the line of data from one document. If an Instruction 65 has not been executed, the corresponding $Cha1$ or $Cha2$ flip-flop is not in the 1-state, and the $Ra4$ and $Ra3$ flip-flops of the Read Buffer cannot receive the output data provided by the Sorter Control Units. On the other hand, if an appropriate Instruction 65 for document reading has been executed, the corresponding $Cha1$ or $Cha2$ flip-flop in the Read Buffer is set, and the Read Buffer accepts each four-bit digit as it is transmitted by the corresponding Sorter Control Unit.

The photocell pulse provided by the reference edge of a document triggers the Sorter one-shot 474, which remains in its unstable state for 10 msec. When one-shot 474 returns to its stable state, the $Csy1$ signal is delivered thereby. The $Csy1$ pulse triggers the 70 msec. one-shot 475 and also triggers the 20-microsecond one-shot $Yck$ in the Sorter Control Unit through AND-gate 526; as follows:

(76) $$*Yck=Csy1\ \overline{Yor}$$

When the $Yck$ one-shot is in its unstable state, the $Ckp$ flip-flop is set through inverter 527; as follows:

(77) $$*Ckp=\overline{1Yck}$$

The approximately 10 msec. between the photocell pulse and the $Csy1$ pulse insures that the $Ckp$ flip-flop is set immediately before the document field is scanned by transducer 470. Therefore, the interval when the $Ckp$ flip-flop is in its 1-state is an indication of the time when the field is being scanned by the transducer. The field is opposite transducer 470 for approximately 36 msec. after the $Ckp$ flip-flop has been set. This is illustrated in the waveform for $Ckp$. Thus, 10 msec. after the first photocell pulse issues, data from the first document is transferred to the Read Buffer, and subsequently to the Central Processor, for a duration of approximately 36 msec.

The unstable state of the $Yck$ one-shot also causes the triggering of the $Yor$ one-shot in the corresponding Sorter Control Unit through the inverter 527; as follows:

(78) $$*Yor=\overline{1Yck}$$

The $Yor$ one-shot remains in its unstable state for 59 msec., and thereby prevents the clearing of the corresponding $Sou$ flip-flops (FIG. 17) during that time by providing a binary 0 signal on lead 537. During the first 52 msec. of this 59 msec., the $Sou$ flip-flops are available to accept a pocket decision digit.

When the one-shot 475 of the Sorter returns to its stable state 70 msec. after the $Ckp$ flip-flop has been set, the $Csy2$ signal is delivered. The $Csy2$ signal triggers the 62 msec. one-shot 476 and also resets the $Ckp$ flip-flop through AND-gate 540; as follows:

(79) $$*\overline{Ckp}=Csy2\ \overline{Yor}\ \overline{Yro}$$

When the $Ckp$ flip-flop is reset, it initiates the setting of the corresponding $Eoc$ flip-flop of the Read Buffer. The $Eoc$ flip-flop then resets the $Cha$ flip-flop to terminate acceptance by the Read Buffer of the data from the corresponding Sorter Control Unit.

After the second document is sensed and photocell pulse 2 issues, a sequence of events occurs, similar to that described above, provided another Instruction 65 for the same Character Reader is executed before the first character is read from this second document. During the first 62 msec. following the occurrence of photocell pulse 2, one-shot 476 of the Sorter is in its unstable state. When one-shot 476 returns to its stable state, the $Csy3$ signal is delivered. In the 62 msec. interval between the issuance of the $Csy2$ signal and the following $Csy3$ signal, the corresponding $Sou$ flip-flops cannot be cleared, and are available to receive the appropriate pocket decision digit for sorting the first document. The $Csy3$ signal then triggers the 15 msec. $Yro$ one-shot; as follows:

(80) $$*Yrp=Csy3$$

The *Yro* one-shot in its unstable state provides a binary 0 signal on lead 538 and gates the pocket decision for the first document from the Sorter Control Unit to the Sorter, as indicated by the previous Equation 75. During the period when the *Yro* one-shot is in its unstable state, the *Yor* one-shot returns to its stable state. The *Yro* one-shot then returns to its stable state 3 msec. before the *Ckp* flip-flop is reset. During this 3 msec. after the *Yro* one-shot returns to its stable state, the *Sou* flip-flops are cleared by a signal provided by AND-gate 520 (FIG. 17); as follows:

(81) $$*Sou(i)=Ckp1\ \overline{Yor}\ \overline{Yro}$$

The *$Sou(i)$ waveform illustrates the interval when the *Sou*-register is reset.

The waveforms for *Chad* and *Cha* illustrate that if an Instruction 65 for document reading is executed prior to occurrence of the corresponding Sorter *Csy*1 signal, the data from the entire field will be transferred to the Read Buffer from the document.

The above document reading operation may be summarized as follows: Starting from 10 msec. after the reference edge of a first document is sensed, data is transmitted from the document to Memory. This data transmission continues for approximately 36 msec. A second document follows the first document by 80 msec. During the first 62 msec. following detection of the second document, a pocket decision for the first document may be transmitted to the *Sou* flip-flops. In the next 15 msec. this pocket decision is transmitted to the Sorter, and in the following 3 msec. the *Sou* flip-flops are cleared to receive the pocket decision for the second document. This reading operation is executed independently for both Sorters.

As was pointed out previously, if the forbidden digit or no pocket decision was transmitted from the Central Processor by the time the *Yro* one-shot is triggered, the no-pocket decision signal, N*pd*, is generated to notify the Central Processor.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

We claim:

1. A data processing system comprising:
a plurality of data sources, each of said data sources supplying a data unit at intervals;
a signal generator for each of said sources for providing a signal when the respective one of said sources is ready to supply a data unit;
a data storage unit for storing a plurality of data items in a corresponding plurality of storage locations, wherein a storage location is allocated to each of said sources for storing an identification data item identifying a respective storage location for receiving a data unit supplied by the corresponding source;
a first register for storing a representation of an identification data item;
a second register for receiving a representation of a data item and for transmitting said representation to said first register when received thereby;
means responsive to any one of said signals for transferring to said second register a representation of the identification data item in the one of said storage locations allocated to the data source corresponding to said one signal;
means responsive to the contents of said first register and enabled following transmission of one of said representations to said first register for transmitting the data unit supplied by the corresponding data source to the storage location identified by said one representation;
means for modifying the identification item in said second register to identify a different storage location, said means for modifying being operable following the transmission of a representation of the contents of said second register to said first register; and
means for transferring the modified contents of said second register to said one storage location.

2. A data processing system comprising:
a plurality of data sources, each of said data sources supplying a data unit at intervals;
a signal generator for each of said sources for providing a signal when the respective one of said sources is ready to supply a data unit;
a data storage unit for storing a plurality of data items in a corresponding plurality of storage locations, wherein a storage location is allocated to each of said sources for storing an identification data item identifying a respective storage location for receiving a data unit supplied by the corresponding source;
a first register for storing a representation of an identification data item;
a second register for receiving a representation of a data item and for transmitting said representation to said first register when received thereby;
means responsive to any one of said signals for modifying the contents of said first register to identify the one of said storage locations allocated to the data source corresponding to said one signal;
means responsive to the modified contents of said first register for transferring to said second register a representation of the identification item in the storage location identified by said modified contents;
means responsive to the contents of said first register and enabled following transmission of one of said representations to said first register for transmitting the data unit supplied by the corresponding data source to the storage location identified by said one representation;
means for modifying the identification item in said second register to identify a different storage location following the transmission of a representation of the contents of said second register to said first register; and
means for transferring the modified contents of said second register to said one storage location.

3. A data processing system comprising:
a plurality of data sources, each of said data sources supplying a data unit at intervals;
a signal generator for each of said sources for providing a signal when the respective one of said sources is ready to supply a data unit;
a data storage unit for storing a plurality of data items in a corresponding plurality of storage locations, wherein a first group of storage locations is adapted to store storage location identification items and a second group of storage locations is allocated to each of said sources for storing data units supplied thereby, and wherein each of the storage locations of said first group is allocated to a corresponding one of said sources for storing an identification item identifying a storage location in a respective one of said second groups for receiving a data unit supplied by the corresponding source;
a first register for storing a representation of an identification item;
a second register for receiving a representation of a data item and for transmitting said representation to said first register when received thereby;
means responsive to any one of said signals for modifying the contents of said first register to identify the one of said storage locations of said first group allocated to the data source corresponding to said one signal;

means responsive to the modified contents of said first register for transferring to said second register a representation of the identification item in the storage location identified by said modified contents;

means responsive to the contents of said first register and enabled following transmission of one of said representations to said first register for transmitting the data unit supplied by the corresponding data source to the storage location of said second group identified by said one representation;

means for modifying the identification item in said second register to identify a different storage location in the corresponding second group following the transmission of a representation of the contents thereof to said first register; and means for transferring the modified contents of said second register to said one storage location.

4. A data processing system comprising:

a plurality of data handlers, each of said data handlers handling a data unit at intervals;

a signal generator for each of said handlers for providing a signal when the respective one of said handlers is ready to handle a data unit;

a data storage unit for storing a plurality of data items in a corresponding plurality of storage locations, wherein a first group of storage locations is adapted to store storage location identification items and a second group of storage locations is allocated to each of said handlers for storing data units supplied thereby, wherein each of the storage locations of said first group is allocated to a respective one of said handlers for storing an identification item identifying a storage location in a respective one of said second groups for storing a data unit to be handled by the corresponding handler, and wherein the storage locations in each of said second groups are sequentially accessible;

a register for storing a representation of an identification item;

transmitting means for receiving a representation of a data item and for transmitting a representation to said register when received thereby;

means responsive to any one of said signals for transferring to said transmitting means a representation of the identification item in the one of said storage locations of said first group allocated to the data handler corresponding to said one signal;

a flip-flop for each of said handlers;

means for each of said handlers for setting each of said flip-flops to one state thereof in response to alternate ones of the corresponding ones of said signals;

means for each of said handlers for setting each of said flip-flops to the other state thereof in response to the remaining ones of the corresponding ones of said signals;

means enabled following transmission of one of said representations to said register and to said one state of the corresponding one of said flip-flops and responsive to the contents of said register for transmitting a data unit between the corresponding data handler and the storage location of said second group identified by said one representation;

means enabled following transmission of one of said representations to said register and to said other state of the corresponding one of said flip-flops and responsive to the contents of said register for transmitting a data unit between the corresponding data handler and the storage location of said second group next sequentially accessible to the storage location identified by said one representation; and means responsive to said other state of the corresponding one of said flip-flops for modifying the identification item in said one storage location to identify a storage location in the corresponding second group twice-removed from the storage location identified by the unmodified identification item, following the transfer of a representation of the contents of said one storage location to said transmitting means.

5. A data processing system comprising:

a plurality of data sources, each of said data sources supplying a data unit at intervals;

a signal generator for each of said sources for providing a signal when the respective one of said sources is ready to supply a data unit;

a data storage unit for storing a plurality of data items in a corresponding plurality of storage locations, wherein a first group of storage locations is adapted to store storage location identification items and a second group of storage locations is allocated to each of said sources for storing data units supplied thereby, wherein each of the storage locations of said first group is allocated to a respective one of said sources for storing an identification item identifying a storage location in a respective one of said second groups for receiving a data unit supplied by the corresponding source, and wherein the storage locations in each of said second groups are sequentially accessible;

a register for storing a representation of an identification item;

transmitting means for receiving a representation of a data item and for transmitting a representation to said register when received thereby;

means responsive to any one of said signals for transferring to said transmitting means a representation of the identification item in the one of said storage locations of said first group allocated to the data source corresponding to said one signal;

a flip-flop for each of said sources;

means for each of said sources for setting each of said flip-flops to one state thereof in response to alternate ones of the corresponding ones of said signals;

means for each of said sources for setting each of said flip-flops to the other state thereof in response to the remaining ones of the corresponding ones of said signals;

means enabled following transmission of one of said representations to said register and to said one state of the corresponding one of said flip-flops and responsive to the contents of said register for transmitting the data unit supplied by the corresponding data source to the storage location of said second group identified by said one representation;

means enabled following transmission of one of said representations to said register and to said other state of the corresponding one of said flip-flops and responsive to the contents of said register for transmitting the data unit supplied by the corresponding data source to the storage location of said second group next sequentially accessible to the storage location identified by said one representation; and means responsive to said other state of the corresponding one of said flip-flops for modifying the identification item in said one storage location to identify a storage location in the corresponding second group twice-removed from the storage location identified by the unmodified identification item, following the transfer of a representation of the contents of said one storage location to said transmitting means.

6. A data processing system comprising:

a data storage unit for storing a plurality of data items in a corresponding plurality of storage locations, wherein a first group of storage locations is adapted to store storage location identification items and a second group of storage locations is allocated to each storage location of said first group, wherein each of the storage locations of said first group stores an identification item identifying a storage location in the respective one of said second groups, and wherein the storage locations in each of said second groups are sequentially accessible;

a register for storing a representation of an identification item;

transmitting means for receiving a representation of a data item and for transmitting a representation to said register when received thereby;

a signal generator for each storage location of said first group for generating a respective series of signals;

means responsive to any one of said signals for transferring to said transmitting means a representation of the identification item in the corresponding one of said storage locations of said first group;

a flip-flop for each storage location of said first group;

means responsive to alternate ones of the respective ones of said signals for setting each of said flip-flops to one state thereof;

means responsive to the remaining ones of the respective ones of said signals for setting each of said flip-flops to the other state thereof;

means enabled following transmission of one of said representations to said register and to said one state of the corresponding one of said flip-flops and responsive to the contents of said register for executing an operation on the contents of the storage location of said second group identified by said one representation;

means enabled following transmission of one of said representations to said register and to said other state of the corresponding one of said flip-flops and responsive to the contents of said register for executing an operation on the contents of the storage location of said second group next sequentially accessible to the storage location identified by said one representation; and means responsive to said other state of the corresponding one of said flip-flops for modifying the identification item in said one storage location to identify a storage location in the corresponding second group twice-removed from the storage location identified by the unmodified identification item, following the transfer of a representation of the contents of said one storage location to said transmitting means.

References Cited by the Examiner

UNITED STATES PATENTS 3,029,414 4/62 Schrimpf ---------- 340—172.5

MALCOLM A. MORRISON, *Primary Examiner.*